US010505995B2

(12) United States Patent
Atarius et al.

(10) Patent No.: US 10,505,995 B2
(45) Date of Patent: Dec. 10, 2019

(54) WIRELESS DEVICE MEDIA CONTROL SESSION

(71) Applicant: Ofinno Technologies, LLC, Herndon, VA (US)

(72) Inventors: Roozbeh Atarius, Herndon, VA (US); Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 351 days.

(21) Appl. No.: 15/632,695

(22) Filed: Jun. 26, 2017

(65) Prior Publication Data
US 2017/0374109 A1    Dec. 28, 2017

Related U.S. Application Data

(60) Provisional application No. 62/354,725, filed on Jun. 25, 2016.

(51) Int. Cl.
*H04L 29/06* (2006.01)
*H04W 60/04* (2009.01)
(Continued)

(52) U.S. Cl.
CPC ...... *H04L 65/1069* (2013.01); *H04L 65/1006* (2013.01); *H04L 65/1016* (2013.01);
(Continued)

(58) Field of Classification Search
CPC ............. H04L 65/1006; H04L 65/1016; H04L 65/1066; H04L 65/1073; H04L 5/14; H04L 67/16; H04L 65/1069; H04J 11/0069
See application file for complete search history.

(56) References Cited

U.S. PATENT DOCUMENTS 7,149,293 B1 * 12/2006 Coppage ............... H04M 15/00
379/114.2
7,313,825 B2 * 12/2007 Redlich ............ C07K 14/70575
709/229
(Continued)

OTHER PUBLICATIONS

3GPP TS 24.334 V13.2.0 (Dec. 2015), Technical Specification, 3rd Generation Partnership Project; Technical Specification Group Core Network and Terminals; Proximity-services (ProSe) User Equipment (UE) to ProSefunction protocol aspects; Stage 3, (Release 13), Valbonne, France.
(Continued)

*Primary Examiner* — Sargon N Nano
(74) *Attorney, Agent, or Firm* — David Grossman; Kavon Nasabzadeh; Philip Smith

(57) ABSTRACT

A wireless device transmits, to a second wireless device via an internet protocol multimedia subsystem (IMS) network entity, a session initiation protocol (SIP) invitation. The SIP invitation may comprise a session description protocol (SDP). The SDP may comprise a media type and one or more attributes. The media type may identify a protocol for controlling operational orders. The controlling operational orders may comprise at least: mechanical operational orders; and electrical operational orders. The one or more attributes may identify a format of the protocol to establish a SIP session. The wireless device may receive, from the second wireless device via the IMS network entity, a SIP confirmation for the SIP session. The wireless device may control the second wireless device employing the controlling operational orders identified by the media type.

16 Claims, 30 Drawing Sheets

(51) Int. Cl.
    *H04W 4/02*     (2018.01)
    *H04W 4/10*     (2009.01)
    *H04L 29/08*     (2006.01)
    *H04W 8/00*     (2009.01)
    *H04W 80/06*     (2009.01)
    *H04W 12/08*     (2009.01)
    *H04W 88/04*     (2009.01)

(52) U.S. Cl.
    CPC .......... *H04L 65/1073* (2013.01); *H04L 67/16* (2013.01); *H04W 4/023* (2013.01); *H04W 4/10* (2013.01); *H04W 8/005* (2013.01); *H04W 60/04* (2013.01); *H04W 12/08* (2013.01); *H04W 80/06* (2013.01); *H04W 88/04* (2013.01)

(56) References Cited

U.S. PATENT DOCUMENTS

| | | | | |
|---|---|---|---|---|
| 7,561,695 | B2* | 7/2009 | Koike | G06Q 20/341 380/277 |
| 7,768,548 | B2* | 8/2010 | Silvernail | G07C 5/0891 348/117 |
| 8,155,642 | B2* | 4/2012 | Russell | G01S 5/0252 455/432.1 |
| 8,548,381 | B2* | 10/2013 | Dua | H04M 1/7253 455/41.2 |
| 8,589,994 | B2* | 11/2013 | Monroe | G08B 13/19641 340/945 |
| 9,054,780 | B2* | 6/2015 | Wilson | H04W 52/146 |
| 9,144,094 | B2* | 9/2015 | Bhamidipati | H04N 21/42207 |
| 9,271,184 | B2* | 2/2016 | Raleigh | H04L 41/0893 |
| 9,731,208 | B2* | 8/2017 | Bradbury | A63F 13/02 |
| 2008/0043648 | A1* | 2/2008 | Buga | H04L 41/046 370/310 |
| 2010/0046401 | A1* | 2/2010 | Wright | H04L 47/15 370/260 |
| 2010/0246436 | A1* | 9/2010 | Yang | H04L 41/0883 370/254 |
| 2015/0365963 | A1* | 12/2015 | Won | H04W 28/0268 370/329 |
| 2016/0358432 | A1* | 12/2016 | Branscomb | G08B 13/1965 |
| 2017/0134444 | A1* | 5/2017 | Buckley | H04L 65/1069 |
| 2018/0041353 | A1* | 2/2018 | Lefebre | H04L 12/1845 |
| 2018/0192258 | A1* | 7/2018 | Vempati | H04W 4/08 |

OTHER PUBLICATIONS

3GPP TS 24.379 V1.2.1 (Feb. 2016), Technical Specification, 3rd Generation Partnership Project; Technical Specification Group Core Networks and Terminals; Mission Critical Push to Talk (MCPTT) call controlProtocol specification (Release 13).
3GPP TS 24.380 V1.2.1 (Feb. 2016), Technical Specification, 3rd Generation Partnership Project; Technical Specification Group Core Network and Terminals, Mission Critical Push to Talk (MCPTT) media plane control;Protocol specification, (Release 13).
3GPP TS 24.383 V0.5.0 (Feb. 2016), Technical specification, 3rd Generation Partnership Project; Technical Specification Group Core Network and Terminals; Mission Critical Push to Talk (MCPTT) Management Object(MO), (Release 13).
The Internet Engineering Task Force (IETF), RFC 4566, SDP: Session Description Protocol, (Jul. 2006).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| application-      | application-      | application-          |
| dependent         | dependent         | dependent             |
| identity          | length            | data                  |
+-+-+-+-+-+-+-+-+-+-+-+-+-+-+-+-+-+-+-+-+-+-+-+-+-+-+-+-+-+-+-+-+
:                                                               :
+-+-+-+-+-+-+-+-+-+-+-+-+-+-+-+-+-+-+-+-+-+-+-+-+-+-+-+-+-+-+-+-+
```

FIG. 23A

| Field Name    | Field ID  | Description                            |
|---------------|-----------|----------------------------------------|
| Angle         | 00000000  | The angle for turns                    |
| Time Stamp    | 00000001  | Current Time                           |
| Time Interval | 00000010  | Time interval for requested operation  |
| Priority      | 00000011  | Priority of Operation                  |
| Media Stream  | 00000100  | Sending Media                          |

FIG. 23B

```
    0                   1                   2                   3
    0 1 2 3 4 5 6 7 8   0                   1                   2                   3                   4
    +-+-+-+-+-+-+-+-+  -+-+-+-+-+-+-+-+-+  -+-+-+-+-+-+-+-+-+  -+-+-+-+-+-+-+-+-+  -+-+-+-+-+-+-+-+-+
    |  application-  |                   0
    |    dependent   |
    |     identity   |
    +-+-+-+-+-+-+-+-+  -+-+-+-+-+-+-+-+-+                     1
    |  application-  |                   2
    |    dependent   |
    |     length     |
    +-+-+-+-+-+-+-+-+  -+-+-+-+-+-+-+-+-+                     3
    |  application-  |                   4
    |    dependent   |
    |      data      |
    :        ...     :
    :        ...     :
    +-+-+-+-+-+-+-+-+  -+-+-+-+-+-+-+-+-+                     N
```

FIG. 27B

```
    0 1 2 3 4 5 6 7 8   0                   1                   2                   3                   4
    +-+-+-+-+-+-+-+-+  -+-+-+-+-+-+-+-+-+  -+-+-+-+-+-+-+-+-+  -+-+-+-+-+-+-+-+-+  -+-+-+-+-+-+-+-+-+
    |   PT=APP=xxx   |                   0
    +-+-+-+-+-+-+-+-+                     1
    |    subtype     |
    +-+-+-+-+-+-+-+-+                     2
    |     Length     |                   3
    +-+-+-+-+-+-+-+-+                     4
```

WIRELESS DEVICE MEDIA CONTROL SESSION

CROSS-REFERENCE TO RELATED APPLICATIONS

This application claims the benefit of U.S. Provisional Application No. 62/354,725, filed Jun. 25, 2016, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 23A is a diagram illustrating an example packet format as per an aspect of an embodiment of the present disclosure.

FIG. 23B is a table of example MBOP messages as per an aspect of an embodiment of the present disclosure.

FIG. 27A and FIG. 27B are diagrams illustrating example packet formats as per an aspect of an embodiment of the present disclosure.

DETAILED DESCRIPTION OF EMBODIMENTS

Figure 1:
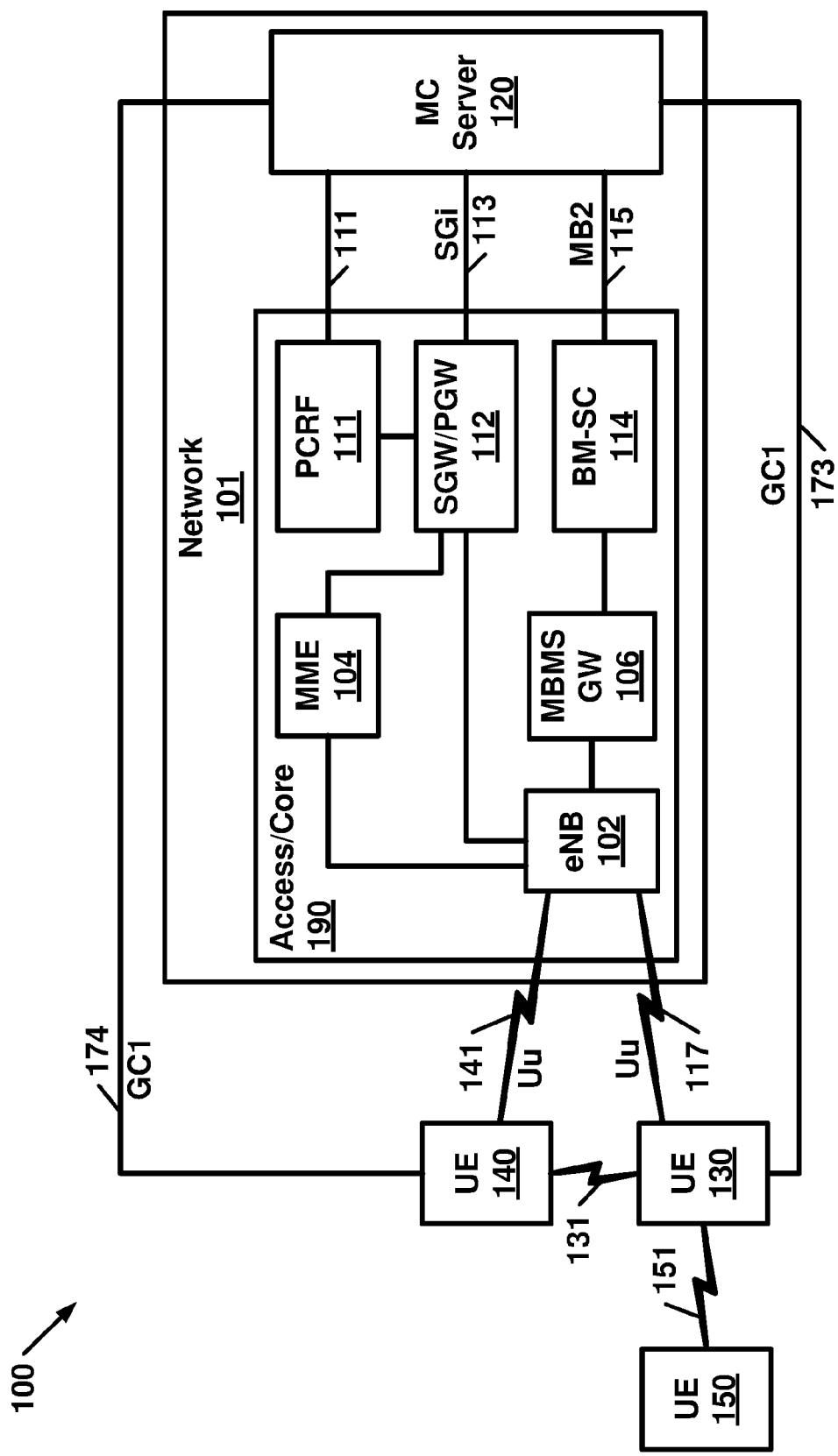
FIG. 1 illustrates a block diagram of an example system 100 according to various embodiments.

Example embodiments are generally directed to critical communication service (e.g., MCPTT/MCVIDEO/MC-DATA/VIDEO) that may involve use of wireless mobile telecommunication cellular and/or wireless mobile broadband technologies. Wireless mobile broadband technologies may include wireless technologies suitable for use with wireless devices and/or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny, and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/

GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3 GPP Rel. 8, 9, 10 or 11 of LTE/System Architecture Evolution (SAE), and so forth. The examples are not limited in this context. In this disclosure, the term "critical" is being employed as a term of art as disclosed, for example, in various communication specifications and is therefore not intended to otherwise limit the scope of the claims.

By way of example and not limitation, various examples may be described with specific reference to various 3 GPP radio access network (RAN) standards, such as the 3 GPP Universal Terrestrial Radio Access Network (UTRAN), the 3 GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as, for example, the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3 GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, MCPTT/MCVIDEO/MCDATA/VIDEO may support an enhanced PTT service, suitable for mission critical scenarios and may be based upon 3GPP EPS services. MCPTT/MCVIDEO/MCDATA/VIDEO may typically be a session initiation protocol (SIP) based service that may be provided via a centralized MCPTT/MCVIDEO/MCDATA/VIDEO server residing in a network (e.g., a 3GPP EPS network). The MCPTT/MCVIDEO/MCDATA/VIDEO server may be an IP Multimedia Subsystem (IMS) application server, but the MCPTT/MCVIDEO/MCDATA/VIDEO server may also be a non-IMS based SIP server. User equipment (UEs) may directly attach to the network to receive critical communication services from an MCPTT/MCVIDEO/MCDATA/VIDEO server. Some UEs may also utilize Proximity Services (ProSe) capabilities to indirectly attach to the network through a relay UE. UEs utilizing ProSe capabilities may be outside of a coverage area of the network and may be referred to as remote UEs.

FIG. 1 illustrates a block diagram of an example system 100 according to various embodiments. According to an embodiment, elements of system 100 may be arranged for providing critical communication services to one or more UEs (e.g. UE 130, UE 140 and UE 150). These critical communication services may comprise mission critical (MCPTT/MCVIDEO/MCDATA/VIDEO) services as specified in, for example, 3GPP technical specification (TS) 22.179, entitled "Technical Specification Group Services and System Aspects; Mission Critical (MCPTT/MCVIDEO/ MCDATA/VIDEO) over LTE, Stage 1", Release 13, V13.0.1, published in January of 2015, and/or previous or subsequent releases or versions (hereinafter referred to as 3GPP TS 22.179). For example, as shown in FIG. 1, a network 101 may include an MCPTT/MCVIDEO/MCDATA/VIDEO server 120 that may serve as centralized server to enable network 101 to provide a SIP-based critical communication service to UEs 130, 140 or 150. MCPTT/MCVIDEO/MCDATA/VIDEO server 120 may be arranged as, for example, an IMS application server or a non-IMS based SIP server.

According to an embodiment, access/core 190 may comprise elements of network 101 typically associated with 3GPP E-UTRAN access and 3GPP E-UTRAN core elements. For example, a UE such as UE 130 may gain access to network 101 via Uu 117 coupled to evolved Node B (eNB) 102. Also, as shown in FIG. 1, MCPTT/MCVIDEO/MCDATA/VIDEO server 120 may couple to various access/core 190 elements. For example, MCPTT/MCVIDEO/MCDATA/VIDEO server 120 may couple to a policy and charging rules function (PCRF) 111 via 111. Link 111 may represent an Rx interface reference point. MCPTT/MCVIDEO/MCDATA/VIDEO server 120 may also couple to a serving gateway/packet data gateway (SGW/PWG) 112 via SGi 113. SGi 113 may represent an SGi interface reference point. (According to various embodiments, an interface may comprise and/or be a reference point). MCPTT/MCVIDEO/MCDATA/VIDEO server 120 may also couple to a broadcast/multicast-service center (BM-SC) 114 via MB2 115. MB2 115 may represent an MB2 reference point.

Mobile management entity (MME) 104 and multimedia broadcast/multicast service gateway (MBMS GW) 106 may provide core 3 GPP E-UTRAN services to MCPTT/MCVIDEO/MCDATA/VIDEO server 120 and/or UEs 130, 140 and 150 to facilitate network 101 in providing critical communication services.

According to an embodiment, UE 130 may attach directly to MCPTT/MCVIDEO/MCDATA/VIDEO server 120. UE 130 may comprise an MCPTT/MCVIDEO/MCDATA/VIDEO client that may be arranged as a SIP-based MCPTT/MCVIDEO/MCDATA/VIDEO client for communication with MCPTT/MCVIDEO/MCDATA/VIDEO server 120. MCPTT/MCVIDEO/MCDATA/VIDEO server 120 may be arranged as a type of group communication service application server (GCS AS) and GC1 173 may represent a GC1 reference point through which MCPTT/MCVIDEO/MCDATA/VIDEO server 120 couples with MCPTT/MCVIDEO/MCDATA/VIDEO client at UE 130.

According to an embodiment, UEs out of network coverage of network 101 may still be able to obtain critical communication service by coupling through UEs serving as UE-to-network relays such as UE 130. For example, UE 150 may be able to indirectly couple to MCPTT/MCVIDEO/MCDATA/VIDEO server 120 via a first link 151 between UE 150 and UE 130 and through a second link (GC1 173) between UE 130 and MCPTT/MCVIDEO/MCDATA/VIDEO server 120.

According to an embodiment, UE 130 acting as an UE-to-network relay may relay traffic from MCPTT/MCVIDEO/MCDATA/VIDEO server 120 for authorized UEs and/or authorized groups of UEs (e.g., belonging to an MCPTT/MCVIDEO/MCDATA/VIDEO group). UE 130 may act as an UE-to-network relay for groups of which it is not a member. As such, a relay UE, such as UE 130, may comprise logic and/or features to enable the relay UE to act as a node between an MCPTT/MCVIDEO/MCDATA/VIDEO server and a remote UE such as UE 150 via link 151.

According to an embodiment, critical communication content may be delivered to directly coupled UEs such as UEs 130 or 140 in either a unicast mode (e.g., via EPS bearers) and/or in multicast mode (e.g., via evolved MBMS (eMBMS) bearers). Use of eMBMS bearers may be justified in cases where a sufficient number of UEs are physically located within a same coverage area or cell. When the number of UEs in a cell is low, unicast delivery via EPS may be more efficient compared to eMBMS or multicast delivery. MCPTT/MCVIDEO/MCDATA/VIDEO server 120 may comprise logic and/or features capable of monitoring the number of UEs in a cell and then adjust a delivery mode accordingly.

According to an embodiment, as part of ProSe capabilities, UE 130 and UE 150 may establish a direct link 151. UE 130 may couple to MCPTT/MCVIDEO/MCDATA/VIDEO server 120 through GC1 173. Alternatively, UE 150 may couple to MCPTT/MCVIDEO/MCDATA/VIDEO server 120 via: (1) link 151 between UE 150 and UE 130; (2) link 131 between UE 130 and UE 140; and (3) GC1 174 between UE 140 to MCPTT/MCVIDEO/MCDATA/VIDEO Server 120. Establishment of the direct link may comprise relay discovery, mutual authentication and IP address assignment. Establishment of the direct link may comprise UE 130 and UE 150 setting up a wireless local area network (WLAN) direct connection. The WLAN direct connection may be arranged to operate according to Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). According to an embodiment, following the same logic as mentioned above for MCPTT/MCVIDEO/MCDATA/VIDEO server 120 selecting a unicast or multicast delivery mode, logic and/or features of a relay UE such as UE 130 and/or 140 may choose a unicast or multicast delivery mode to relay information (e.g., critical communication content) to one or more remote UEs such as UE 150 and/or each other.

A direct link between UEs 140 and 130 may be established via, for example, a PC5 interface (e.g. 131). The PC5 interface may be selectively chosen to communicate information. It may be possible to use unicast delivery via the LTE-Uu interface.

Concepts expressed herein may be implemented in connection with cellular telephones and/or other types of User Equipment (UE) used on communication networks, and particularly wireless communication networks. Described below are one or more example communication networks and related equipment within which at least some of the aspects of the herein described concepts may be implemented.

Figure 2:
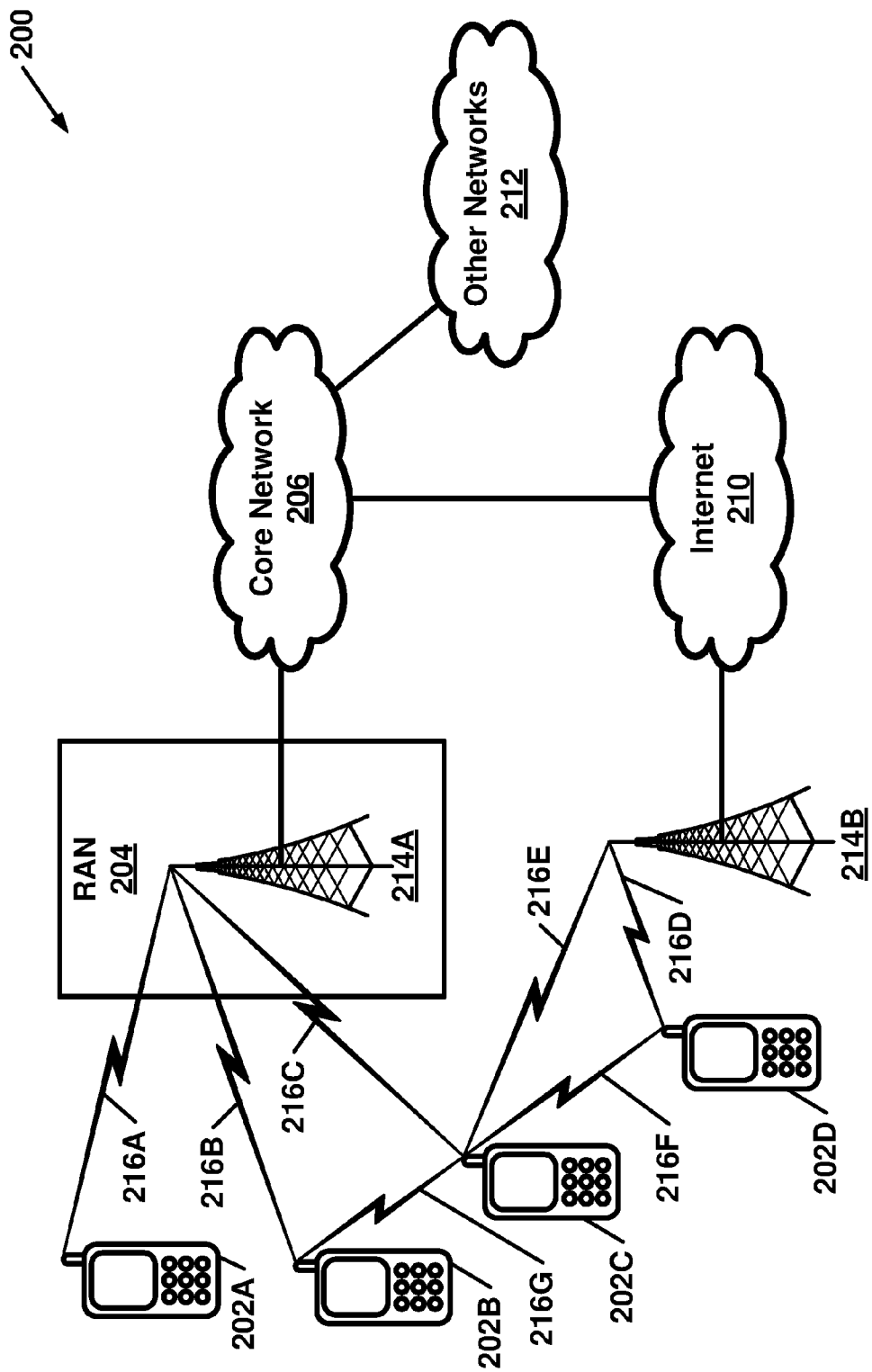
FIG. 2 is a system diagram of an example communications system in which one or more disclosed embodiments may be implemented.

FIG. 2 is a diagram of an example communications system 200 in which one or more disclosed embodiments may be implemented. The communications system 200 may comprise a multiple access system configured to provide content, such as voice, data, video, messaging, broadcast, etc., to multiple wireless users. The communications system 200 may enable multiple wireless users to access such content through the sharing of system resources, including, for example, wireless bandwidth. For example, communications systems 200 may employ one or more channel access processes, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 2, the communications system 200 may comprise wireless transmit/receive units (WTRUs) 202A, 202B, 202C, 202D, a radio access network (RAN) 204, a core network 206, the Internet 210, and/or other networks 212. It will be appreciated that the disclosed embodiments contemplate various numbers of WTRUs, base stations, networks, and/or network elements. Each of the WTRUs 202A, 202B, 202C, 202D may be configured to operate and/or communicate in a wireless environment. By way of example, WTRUs 202A, 202B, 202C, 202D may be configured to transmit and/or receive wireless signals and may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, combinations thereof, and/or the like.

The communications systems 200 may also comprise a base station 214A and/or base station 214B. Each of the base stations 214A, 214B may be a type of device configured to wirelessly interface with at least one of the WTRUs 202A, 202B, 202C, 202D to facilitate access to one or more communication networks, such as core network 206, Internet 210 and/or networks 212. By way of example, base stations 214A and/or 214B may comprise a base transceiver station (BTS), a Node-B, an eNode B, a Home Node B, a Home eNode B, a site controller, an access point (AP), a wireless router, combinations thereof, and/or the like. While base stations 214A and 214B are each depicted as a single element, it will be appreciated that base stations 214A and 214B may comprise various numbers of interconnected base stations and/or network elements.

As illustrated, base station 214A may be a part of the RAN 204, which may also comprise other base stations and/or network elements (not shown), such as, for example, a base station controller (BSC), a radio network controller (RNC), relay nodes, combinations thereof, and/or the like. Base station 214A and/or the base station 214B may be configured to transmit and/or receive wireless signals within a particular geographic region, which may be referred to as a cell (not shown). The cell may be further divided into cell sectors. For example, the cell associated with the base station 214A may be divided into three sectors. Thus, according to an embodiment, base station 214A may comprise three transceivers, i.e., one for each sector of the cell. According to an embodiment, base station 214A may employ multiple-input multiple output (MIMO) technology and, therefore, may utilize multiple transceivers for each sector of the cell.

Base stations 214A and/or 214B may communicate with one or more of the WTRUs (e.g. 202A, 202B, 202C, and 202D) over an air interface (e.g. 216A, 216B, (216C and/or 216E), and 216D, respectively), which may comprise a wireless communication link (e.g., radio frequency (RF), microwave, infrared (IR), ultraviolet (UV), visible light, etc.). An air interface (e.g. 216A, 216B, 216C, 216D, 216E, 216F and 216G) may be established employing a suitable radio access technology (RAT).

More specifically, as noted above, communications system 200 may comprise a multiple access system and may employ one or more channel access schemes, such as CDMA, TDMA, FDMA, OFDMA, SC-FDMA, combinations thereof, and/or the like. For example, base station 214A in the RAN 204 and WTRUs 202A, 202B, and 202C may implement a radio technology such as Universal Mobile Telecommunications System (UMTS) Terrestrial Radio Access (UTRA), which may establish air interface (e.g. 202A, 202B, and 202C) employing wideband CDMA (WCDMA). WCDMA may comprise communication protocols such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

According to an embodiment, base station 214A and WTRUs 202A, 202B, 202C may implement a radio technology such as Evolved UMTS Terrestrial Radio Access (E-UTRA), which may establish air interface (e.g. 216A, 216B, and 216C, respectively) employing Long Term Evolution (LTE) and/or LTE-Advanced (LTE-A).

According to an embodiment, base station 214A and WTRUs 202A, 202B, 202C may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), combinations thereof, and/or the like.

Base station 214B in FIG. 2 may comprise a wireless router, Home Node B, Home eNode B, or an access point, for example, and may utilize a RAT for facilitating wireless connectivity in a localized area, such as a place of business, a home, a vehicle, a campus, combinations thereof, and/or the like. According to an embodiment, base station 214B and WTRUs 202C, 202D may implement a radio technology such as IEEE 802.11 to establish a wireless local area network (WLAN). According to an embodiment, base station 214B and WTRUs 202C and 202D may implement a radio technology such as IEEE 802.15 to establish a wireless personal area network (WPAN). According to an embodiment, base station 214B and WTRUs 202C and 202D may utilize a cellular-based RAT (e.g., WCDMA, CDMA2000, GSM, LTE, LTE-A, etc.) to establish a picocell or femtocell. As shown in FIG. 2, base station 214B may have a direct connection to the Internet 210. Thus, base station 214B may not be required to access the Internet 210 via the core network 206.

The RAN 204 may be in communication with the core network 206, which may be a type of network configured to provide voice, data, applications, and/or voice over internet protocol (VoIP) services to one or more of the WTRUs 202A, 202B, 202C, and 202D. For example, core network 206 may provide call control, billing services, mobile location-based services, pre-paid calling, Internet connectivity, video distribution, etc., and/or perform high-level security functions, such as user authentication. Although not shown in FIG. 2, it anticipated that according to an embodiment, RAN 204 and/or core network 206 may be in direct or indirect communication with other RANs that employ the same RAT as the RAN 204 or a different RAT. For example, in addition to being connected to the RAN 204, which may utilize an E-UTRA radio technology, the core network 206 may also be in communication with another RAN (not shown).

Core network 206 may serve as a gateway for the WTRUs 202A, 202B, 202C and/or 202D to access the PSTN 208, the Internet 210 and/or other networks 212. The Internet 210 may comprise a global system of interconnected computer networks and devices that use common communication protocols, such as the transmission control protocol (TCP), user datagram protocol (UDP) and the internet protocol (IP) in the TCP/IP internet protocol suite. Other networks 212 may comprise wired and/or wireless communications networks owned and/or operated by other service providers. For example, the networks 212 may comprise another core network connected to one or more RANs, which may employ the same RAT as the RAN 204 or a different RAT.

Some or all of the WTRUs 202A, 202B, 202C, and 202D in the communications system 200 may comprise multi-mode capabilities (i.e., the WTRUs 202A, 202B, 202C, and 202D may comprise multiple transceivers for communicating with different wireless networks over different wireless links). For example, example WTRU 300 shown in FIG. 3 may be configured to communicate with base station 214A, which may employ a cellular-based radio technology, and with the base station 214B, which may employ an IEEE 802 radio technology.

Figure 3:
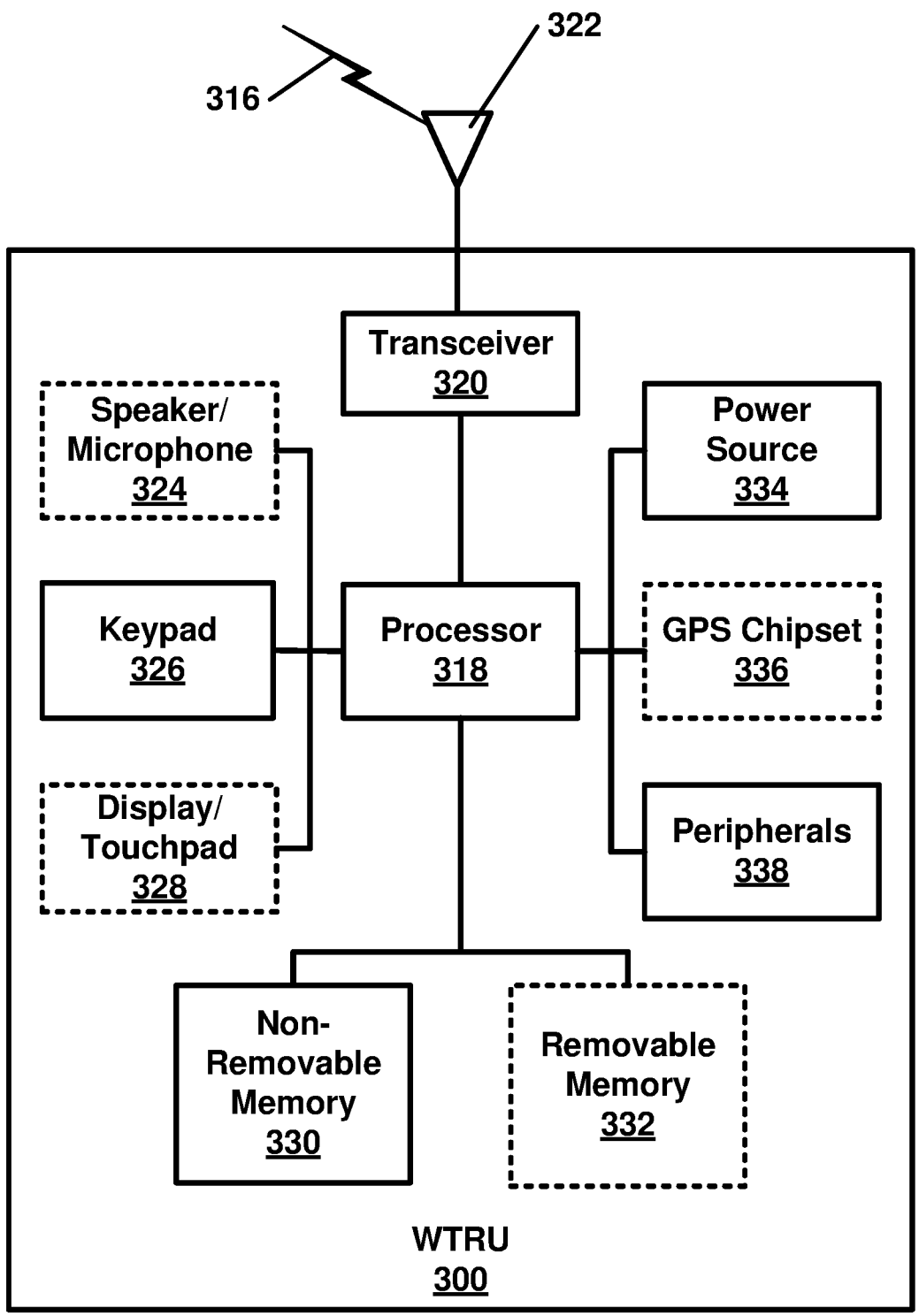
FIG. 3 is a system diagram of an example wireless transmit/receive unit (WTRU) as per an aspect of an embodiment of the present invention.

FIG. 3 is a system diagram of an example WTRU 300. As shown in FIG. 3, example WTRU 300 may comprise a processor 318, a transceiver 320, a transmit/receive element 322, a speaker/microphone 324, a keypad 326, a display/touchpad 328, non-removable memory 330, removable memory 332, a power source 334, a global positioning system (GPS) chipset 336, and other peripherals 338. It will be appreciated that the WTRU 300 may comprise a sub-combination of the foregoing elements while remaining consistent with an embodiment. For example, an WRTU 300 embodiment may be implemented without one or more of the dashed elements 324, 328, 336 and/or 332.

The processor 318 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 318 may perform signal coding, data processing, power control, input/output processing and/or other functionality that enables example WTRU 300 to operate in a wireless environment. Processor 318 may be coupled to the transceiver 320, which may be coupled to the transmit/receive element 322. While FIG. 3 depicts elements such as, for example, processor 318 and transceiver 320 as separate components, it will be appreciated that the elements such as processor 318 and the transceiver 320 may be integrated together in an electronic package and/or chip. While FIG. 3 depicts elements such as, for example, processor 318 and transceiver 320 as individual components, it will be appreciated that the elements such as processor 318 and the transceiver 320 may be implemented as a collection of other elements.

The transmit/receive element 322 may be configured to transmit signals to, or receive signals from, a base station (e.g., the base station 214A) over the air interface 316. For example, in an embodiment, the transmit/receive element 322 may be an antenna configured to transmit and/or receive RF signals. According to an embodiment, the transmit/receive element 322 may be an emitter/detector configured to transmit and/or receive IR, UV, or visible light signals, for example. According to an embodiment, the transmit/receive element 322 may be configured to transmit and receive both RF and light signals. It will be appreciated that the transmit/receive element 322 may be configured to transmit and/or receive any combination of wireless signals.

In addition, although the transmit/receive element 322 is depicted in FIG. 3 as a single element, example WTRU 300 may comprise any number of transmit/receive elements 322. More specifically, example WTRU 300 may employ MIMO technology. Thus, according to an embodiment, example WTRU 300 may comprise two or more transmit/receive elements 322 (e.g., multiple antennas) for transmitting and receiving wireless signals over the air interface 316.

Transceiver 320 may be configured to modulate signals that are to be transmitted by transmit/receive element 322 and to demodulate signals received by transmit/receive element 322. As noted above, example WTRU 300 may have multi-mode capabilities. Thus, the transceiver 320 may comprise multiple transceivers for enabling example WTRU 300 to communicate via multiple RATs, such as E-UTRA and IEEE 802.11, for example.

Processor 318 of example WTRU 300 may be coupled to, and may receive user input data from, for example, the speaker/microphone 324, the keypad 326 and/or the display/touchpad 328 (e.g., a liquid crystal display (LCD) display unit or organic light-emitting diode (OLED) display unit). Processor 318 may output user data to, for example, the speaker/microphone 324, the keypad 326 and/or the display/touchpad 328. Processor 318 may access information from, and store data in, a type of suitable memory, such as the non-removable memory 330 and/or the removable memory 332. The non-removable memory 330 may comprise random-access memory (RAM), read-only memory (ROM), a hard disk, and/or other type of memory storage device. The removable memory 332 may comprise a subscriber identity module (SIM) card, a memory stick, a secure digital (SD) memory card, and/or the like. According to an embodiment, processor 318 may access information from, and store data in, memory that is not physically located on example WTRU 300, such as on a server or a home computer (not shown).

Processor 318 may receive power from the power source 334, and may be configured to distribute and/or control the power to the other components in example WTRU 300. Power source 334 may be a suitable device for powering example WTRU 300. For example, power source 334 may comprise one or more dry cell batteries (e.g., nickel-cadmium (NiCd), nickel-zinc (NiZn), nickel metal hydride (NiMH), lithium-ion (Li-ion), etc.), solar cells, fuel cells, combinations thereof, and/or the like.

Processor 318 may also be coupled to GPS chipset 336, which may be configured to provide location information (e.g., longitude and latitude) regarding the current location of example WTRU 300. In addition to, and/or in lieu of, the information from the GPS chipset 336, example WTRU 300 may receive location information over the air interface 316 from a base station (e.g., base stations 214A, 214B) and/or determine a location based on the timing of the signals being received from two or more nearby base stations. It will be appreciated that the WTRU 300 may acquire location information by way of other suitable location-determination process(es) while remaining consistent with an embodiment.

Processor 318 may further be coupled to other peripherals 338, which may comprise one or more software and/or hardware modules that provide additional features, functionality, and/or wired or wireless connectivity. For example, peripherals 338 may comprise, for example, an accelerometer, an e-compass, a satellite transceiver, a digital camera (for photographs or video), a universal serial bus (USB) port, a vibration device, a television transceiver, a hands free headset, a Bluetooth™ module, a frequency modulated (FM) radio unit, a digital music player, a media player, a video game player module, an Internet browser, a combination thereof, and/or the like.

Figure 4:
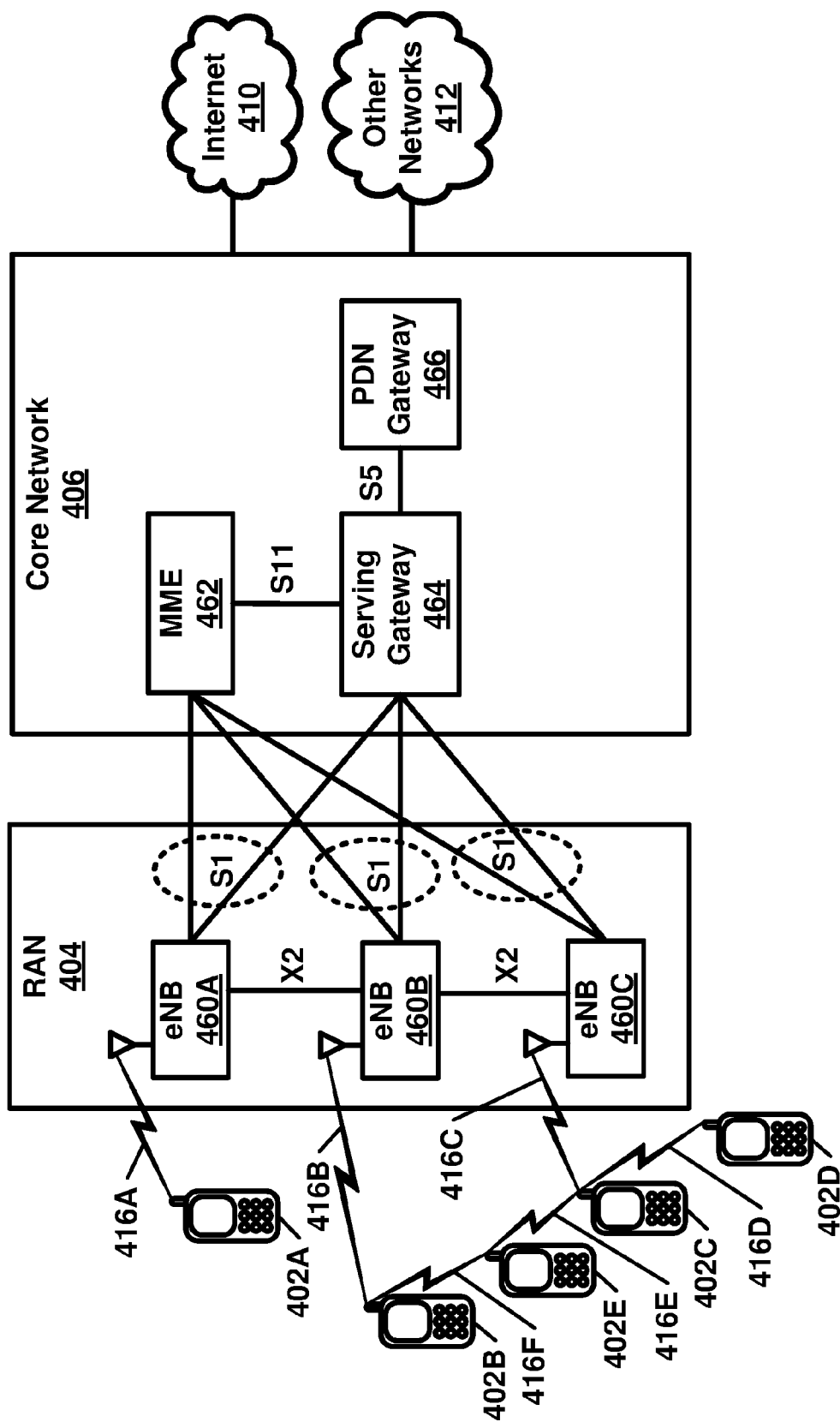
FIG. 4 is a system diagram of an example radio access network and core network as per an aspect of an embodiment of the present invention.

FIG. 4 is a system diagram of an example communications system comprising an example RAN 404 and an example core network 406. This example communications system is disclosed for example purposes. Variations in communications systems may be implemented within the scope of the embodiment. In this example embodiment, RAN 404 may employ an E-UTRA radio technology to communicate with the WTRUs 402A, 402B and/or 402C over air interfaces 416A, 416b and/or 416C respectively. RAN 404 may be in communication with the core network 406.

Example RAN 404 may comprise eNBs 460A, 460B and/or 460C, though it will be appreciated that the RAN 404 may comprise various numbered of eNBs while remaining consistent with an embodiment. The eNBs 460A, 460B and/or 460C may each comprise one or more transceivers for communicating with the WTRUs 402A, 402B and/or 402C over air interface 416A, 416B and/or 416C respectively. In an embodiment, the eNBs 460A, 460B and/or 460C may implement MIMO technology. Thus, the eNB 460A, for example, may use multiple antennas to transmit wireless signals to, and receive wireless signals from, example WTRUs 402A.

Some WTRUs may be configured to communicate with each other directly. For example, as illustrated, WTRU 402E may be configured to communicate with example WTRU 402B and/or example WTRU 402C over the air interfaces 416F and/or 416E, respectively. Similarly, example WTRU 402D may be configured to communicate with example WTRU 402C over the air interfaces 416D.

Each of the eNBs 460A, 460B, and/or 460C may be associated with a particular cell (not shown) and may be configured to handle radio resource management decisions, handover decisions, scheduling of users in the uplink and/or downlink, and the like. As shown in FIG. 4, the eNBs 460A, 460B and/or 460C may communicate with one another over, for example: an X2 interface, a reference point, and/or the like.

Example core network 406 shown in FIG. 4 may comprise a mobility management gateway (MME) 462, a serving gateway 464, a packet data network (PDN) gateway 466, and/or the like. While each of the foregoing elements are depicted as part of the core network 406, it will be appreciated that various elements operating in a core network (e.g. 406) may be owned and/or operated by an entity other than the core network operator.

The MME 462 may be connected to each of the eNBs 460A, 460B, 460C in RAN 404 via an S1 interface, a reference point, and/or the like and may serve as a control node. For example, the MME 462 may be responsible for authenticating users of the WTRUs 402A, 402B, 402C, 402D and/or 402E, bearer activation/deactivation, selecting a particular serving gateway during an initial attach of the WTRUs 402A, 402B, 402C, 402D and/or 402E, and/or the like. The MME 462 may also provide a control plane function for switching between the RAN 404 and other RANs (not shown) that employ other radio technologies, such as, for example, GSM and/or WCDMA.

Serving gateway 464 may be connected to each of the eNode Bs 460A, 460B and/or 460C in the RAN 404 via an S1 interface, a reference point, and/or the like. The serving gateway 464 may generally route and forward user data packets to and from the WTRUs 402 *a*, 402B and/or 402C. The serving gateway 464 may also perform other functions, such as anchoring user planes during inter-eNode B handovers, triggering paging when downlink data is available for the WTRUs 402A, 402B and/or 402C, managing and storing contexts of the WTRUs 402A, 402B and/or 402C, and/or the like.

The serving gateway 464 may also be connected to the PDN gateway 466, which may provide the WTRUs 402a, 402B and/or 402C with access to packet-switched networks, such as the Internet 410, to facilitate communications between the WTRUs 402A, 402B and/or 402C and IP-enabled devices.

Example core network 406 may facilitate communications with other networks. For example, core network 406 may provide the WTRUs 402A, 402B and 402C with access to circuit-switched networks to facilitate communications between the WTRUs 402A, 402B, 402C and traditional land-line communications devices. For example, the core network 406 may comprise, and/or may communicate with, an IP gateway (e.g., an IP multimedia subsystem (IMS) server) that serves as an interface between the core network 406 and a PSTN. In addition, the core network 406 may provide the WTRUs 402A, 402B, 402C with access to the networks 412, which may comprise other wired or wireless networks that are owned and/or operated by other service providers.

Figure 5:
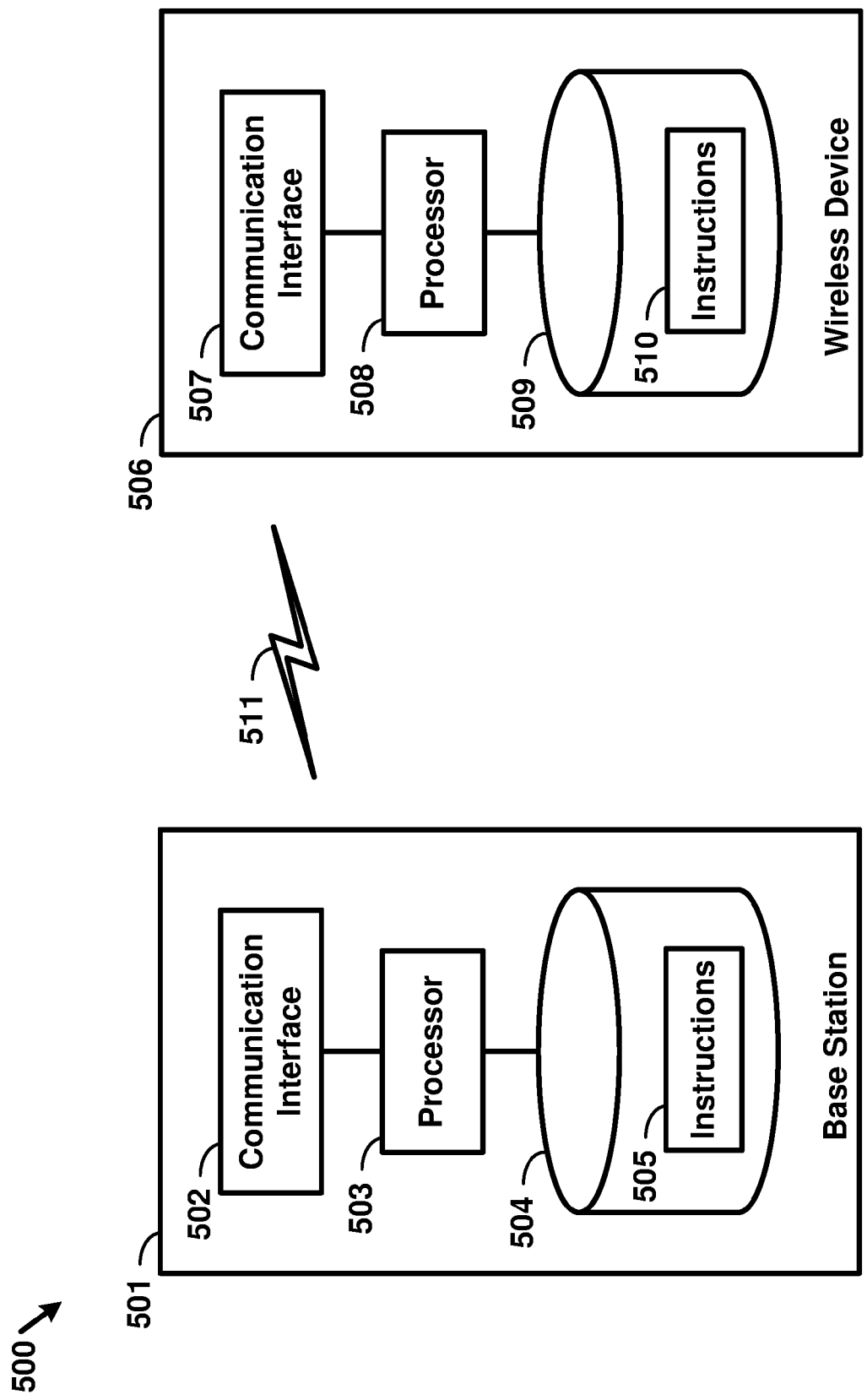
FIG. 5 is a block diagram of a base station and a wireless device as per an aspect of an embodiment of the present invention.

FIG. 5 is an example block diagram of a base station 501 and a wireless device 506, as per an aspect of an embodiment of the present invention. A communication network 500 may comprise at least one base station 501 and at least one wireless device 506. The base station 501 may comprise at least one communication interface 502, at least one processor 503, and at least one set of program code instructions 505 stored in non-transitory memory 504 and executable by the at least one processor 503. The wireless device 506 may comprise at least one communication interface 507, at least one processor 508, and at least one set of program code instructions 510 stored in non-transitory memory 509 and executable by the at least one processor 508. Communication interface 502 in base station 501 may be configured to engage in communication with communication interface 507 in wireless device 506 via a communication path that comprises at least one wireless link 511. Wireless link 511 may be a bi-directional link. Communication interface 507 in wireless device 506 may also be configured to engage in a communication with communication interface 502 in base station 501. Base station 501 and wireless device 506 may be configured to send and receive data over wireless link 511 using multiple frequency carriers. According to some of the various aspects of embodiments, transceiver(s) may be employed. A transceiver is a device that comprises both a transmitter and receiver. Transceivers may be employed in devices such as wireless devices, base stations, relay nodes, and/or the like.

An interface may be a hardware interface, a firmware interface, a software interface, and/or a combination thereof. The hardware interface may comprise connectors, wires, electronic devices such as drivers, amplifiers, and/or the like. A software interface may comprise code stored in a memory device to implement protocol(s), protocol layers, communication drivers, device drivers, combinations thereof, and/or the like. A firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may comprise a multitude of base stations, providing a user plane PDCP/RLC/MAC/PHY and control plane (RRC) protocol terminations towards the wireless device. The base station(s) may be interconnected with other base station(s) (e.g. employing an X2 interface, reference point, and/or the like). The base stations may also be connected employing, for example, an S1 interface to an EPC. For example, the base stations may be interconnected to the MME employing the S1-MME interface, reference point, and/or the like and to the Serving Gateway (S-G) employing the S1-U reference point. The S1 interface, reference point, and/or the like may support a many-to-many relation between MMEs/Serving Gateways and base stations. A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In an embodiment, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

In order to set an MCPTT call, the MCPTT UEs affiliated to MCPTT groups may first discover each other. This discovery may be a restricted discovery since MCPTT is a public safety feature. In the restricted discovery, the discoverer UEs and discoveree UEs may be authorized by being pre-provisioned with one or more parameters for the discovery procedure.

Examples for ProSe direct discovery methods are Model A and Model B. Model A may include the following examples two roles for the ProSe-enabled UEs that are participating in ProSe Direct Discovery: Announcing UE and Monitoring UE. Announcing UE may comprise the UE announcing certain information that may be used by UEs in proximity that have permission to discover. Monitoring UE may comprise the UE that monitors certain information of interest being in proximity of announcing UEs.

In Model A the announcing UE may broadcast discovery messages at discovery intervals (e.g. pre-defined intervals) and the monitoring UEs that are interested in these messages may read them and may process them. In an example, this model may be equivalent to "I am here" since the announcing UE may broadcast information about itself e.g. its restricted ProSe application code in the discovery message.

The UE may act as "announcing UE" in the carrier frequency signaled by the serving PLMN when using Model A mode. The UE may act as a "monitoring" UE in the resources of the serving PLMN and Local PLMNs, when using Model A mode. When inter-PLMN discovery transmission is supported, the carrier frequency may be operated by a PLMN other than the serving PLMN. Open and/or restricted discovery types may be supported by Model A.

Model B, when restricted discovery type is used, may include the following examples two roles for the ProSe-enabled UEs that are participating in ProSe Direct Discovery: Discoverer UE, and Discoveree UE. Discoverer UE may comprise the UE transmitting a request containing certain information about what it is interested to discover. Discoveree UE may comprise the UE receiving the request message responding with some information related to the discoverer's request. In an example, it may be equivalent to "who is there/are you there." The discoverer UE may send information about other UEs that may like to receive responses from, e.g. the information may be about a ProSe application identity corresponding to a group and the members of the group may respond.

When using Model B discovery, the discoverer UE and discoveree UE may announce in the carrier frequency signaled by the serving PLMN. When inter-PLMN discovery transmission is supported, the carrier frequency may be operated by a PLMN other than the serving PLMN. The discoverer UE and discoveree UE may be allowed to monitor in the serving PLMN and Local PLMNs when authorized. In an example embodiment, only restricted discovery type may support by Model B. In an example application, the public safety discovery may be considered restricted. The monitoring UE/discoverer UE may need to have authorization (such as through pre-provisioned parameters) to perform discovery of the appropriate service(s).

The public safety discovery may be considered restricted and depending on Model A or Model B, it may use ProSe restricted code for Model A, it may use ProSe query code/ ProSe response code respectively for Model B.

These code parameters may be n bits, e.g. 64 bits, and may be part of ProSe Application Code. They may correspond to one or more restricted ProSe application user ID(s) (RPAUID). The ProSe application user ID may be allocated and bound to ProSe discovery UE ID (PDUID) by the ProSe application server.

Figure 6:
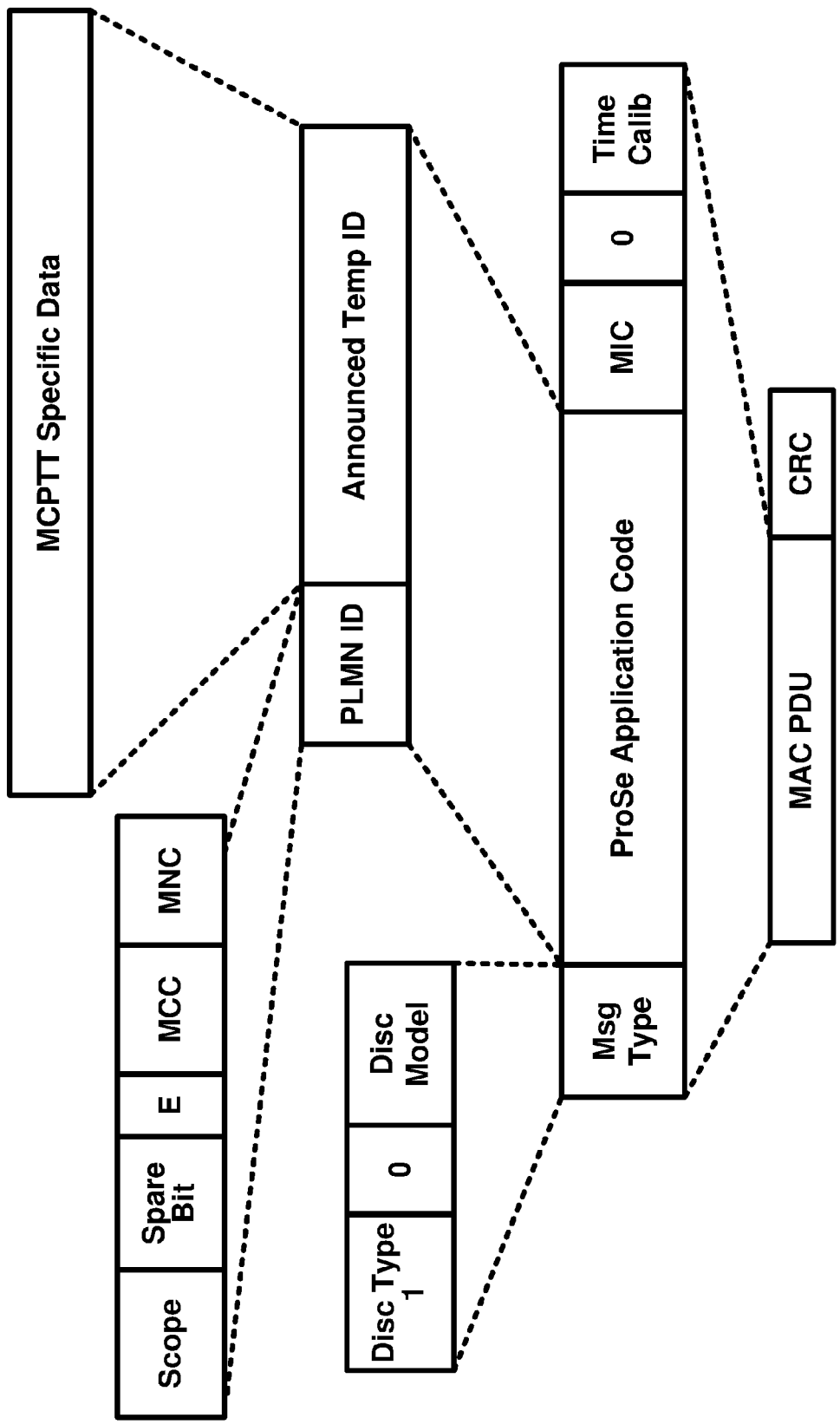
FIG. 6 is a diagram of an example ProSe Discovery message as per an aspect of an embodiment of the present invention.

FIG. 6 is an example of the ProSe Discovery message which is employed for discovery procedures in Model A and Model B.

In Model A, the announcing MCPTT UE may use ProSe restricted code and if the application-controlled extension is used, it may use ProSe restricted code prefix and ProSe restricted code suffix(es) to announce its identity over the PC5 interface. The monitoring MCPTT UE may use discovery filter which may be provided by the HPLMN ProSe function comprising the ProSe restricted code (or ProSe restricted code prefix with ProSe Restricted Code suffix pool if restricted direct discovery with application-controlled extension was requested by the announcing MCPTT UE) to monitor the announcing MCPTT UE for a duration of time.

Model A may compromise a procedure for the announcing MCPTT UE and a procedure for the monitoring MCPTT UE. It may include a matching procedure for the case when the monitoring MCPTT UE receives ProSe restricted code over the air that matches the discovery filter provided by the HPLMN ProSe function to the monitoring MCPTT UE in the discovery response message, however the corresponding restricted ProSe application UE identity (RPAUID) does not have valid validity timer.

Figure 7:
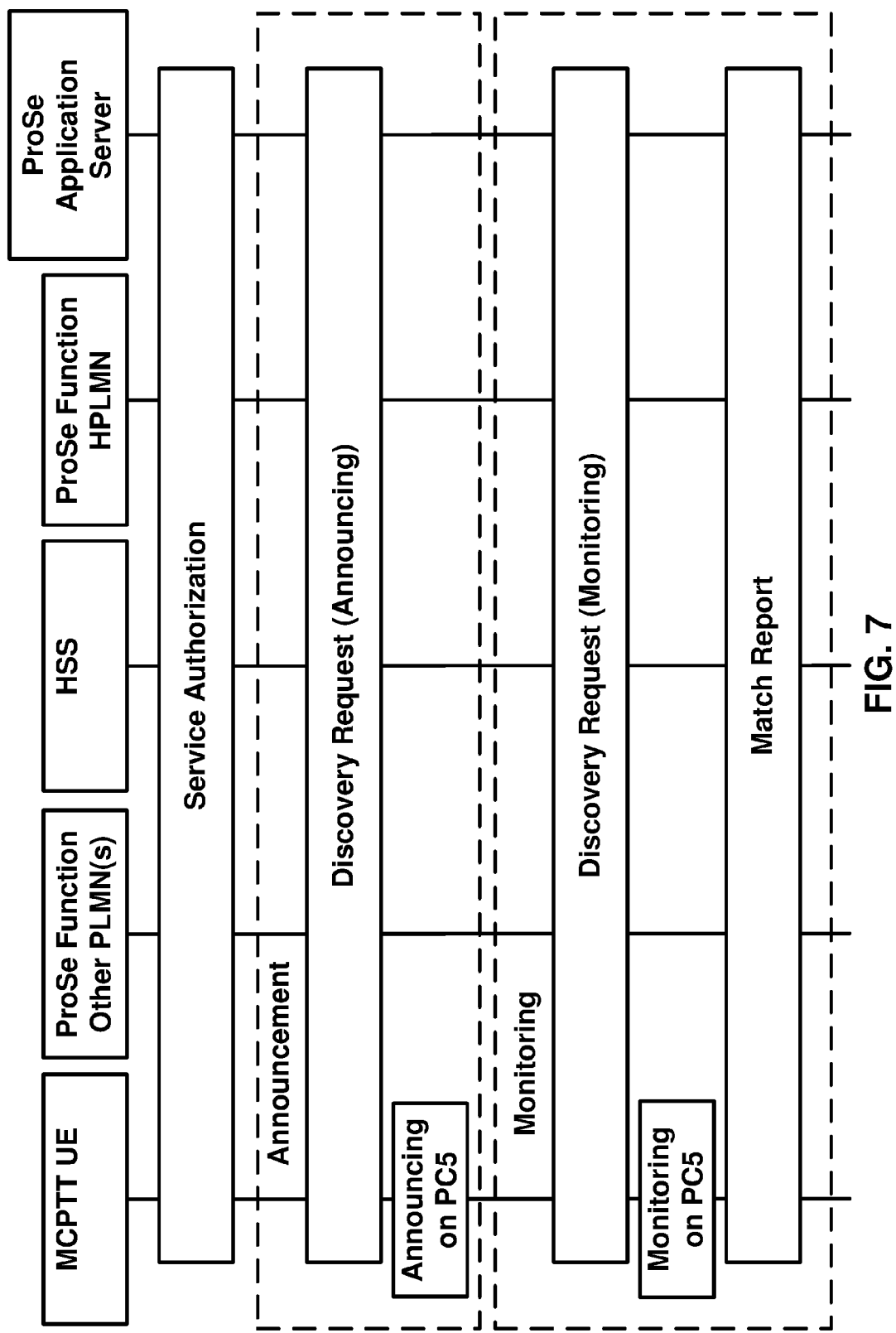
FIG. 7 is a flow diagram showing an example procedure for Model A discovery as per an aspect of an embodiment of the present invention.

FIG. 7 illustrates an example flow diagram showing the procedure for Model A discovery. An example procedure for Model A discovery may include authorization, announcement, and monitoring.

Authorization where the MCPTT UE may get authorized for restricted ProSe direct discovery. In an example, MCPTT may be public safety and the ProSe direct discovery may be restricted.

Announcement, where the announcing MCPTT UE may request for discovery and may receive the ProSe restricted code (or ProSe restricted code prefix and ProSe restricted code suffix(es) to announce itself, if the application-controlled extension is used). The announcing MCPTT UE may announce the ProSe restricted code (or ProSe restricted code prefix and ProSe restricted code suffix(es) to announce itself, if the application-controlled extension is used).

Monitoring, where the monitoring MCPTT UE may request for discovery and may receive the ProSe Filter comprising the ProSe Restricted Code (or ProSe Restricted Code Prefix and ProSe Restricted Code Suffix(es) to announce itself, if the application-controlled extension is used). The monitoring MCPTT UE may monitor for the ProSe restricted code (or ProSe restricted code prefix and ProSe restricted code suffix(es) to announce itself, if the application-controlled extension is used). The monitoring UE may match-report if having monitored ProSe restricted code (or ProSe restricted code prefix and ProSe restricted code suffix(es) to announce itself, if the application-controlled extension is used) with corresponding PRAUID with no valid validity timer.

Figure 8:
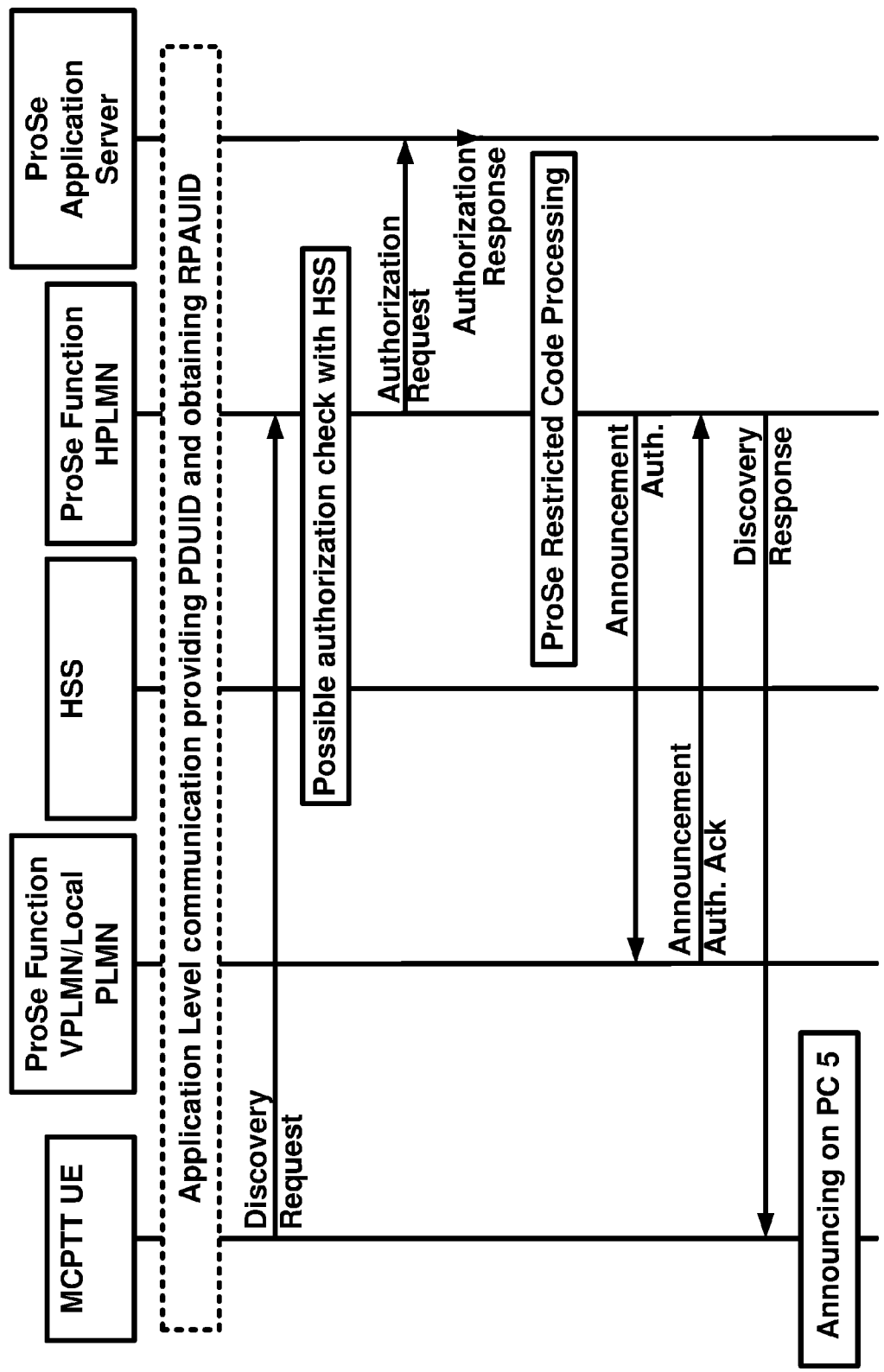
FIG. 8 is a flow diagram illustrating an example procedure for the announcing MCPTT (mission critical push-to-talk) UE (user equipment) as per an aspect of an embodiment of the present invention.

FIG. 8 illustrates an example flow diagram showing example procedures for the announcing MCPTT UE. The procedure for the announcing MCPTT UE may comprise the application client in the MCPTT UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCPTT UE. MCPTT UE may use RPAUID instead of PDUID since MCPTT is a public safety feature. The MCPTT UE may construct a discovery request message containing RPAUID, UE identity set to international mobile subscriber identity (IMSI), command=announce, discovery type set to restricted discovery, application ID set to unique identifier of the MCPTT application ID, discovery entry ID indicating if this is a new request, optional requested discovery timer set to validity timer associated with the expected ProSe restricted code from the HPLMN ProSe Function (if it is set to zero, the MCPTT UE is requesting to remove the discovery entity ID and release the associated resources), (if application-controlled extension is used) application level container containing the request and the relevant information, announcing type such as "on demand" for the indicated application, and the PLMN ID of the carrier frequency in announcing PLMN ID if the serving PLMN signaled carrier frequency is not operated by HPLMN or VPLMN and if inter-PLMN ProSe discovery transmission is supported. MCPTT UE may send the discovery request message to HPLMN ProSe function. The HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may send an authorization request containing RPAUID and request type set to "restricted discovery/announce" towards the ProSe application server. The authorization request may contain allowed number of suffixes if restricted Direct Discovery with application-controlled extension is used. The request type may be set to "restricted discovery with application-controlled extension/announce". The ProSe application server may answer by an authorization response containing PDUID(s) corresponding the RPAUID stored in the ProSe application server and response type set to "restricted discover/announce ack". The authorization response may include ProSe restricted code suffix pool with allocated suffixes by the ProSe Application if restricted direct discovery with application-controlled extension is used. The response type may be set to "restricted discovery with application-controlled extension/announce ack". The HPLMN ProSe function may assign a ProSe restricted code corresponding to the RPAUID in the discovery request and an associated validity timer which identifies the duration of validity of the ProSe restricted code. MCPTT UE may use this ProSe restricted code within this validity duration if PLMN is not changed. If restricted direct discovery with application-controlled is used, then HPLMN ProSe functions may assign ProSe restricted code prefix instead of ProSe restricted code. If discovery request message indicates "on demand" announcing and the "on demand" announcing is authorized and enabled based on application ID and operator's policy, the HPLMN ProSe function may store RPAUID, PreSe restriced code (or ProSe restricted code prefix) with the associated validity timer, and enabled indicator in the user context. "On demand" announcing is only activated based on an ongoing monitoring request, otherwise, the following steps are not executed.

If the Discovery request is authorized, the HPLMN ProSe Function may construct an announce authorization message containing RPAUID, MCPTT application ID, ProSe restricted code (or ProSe restricted code prefix with ProSe restricted code suffix pool if restricted direct discovery with application-controlled extension is used) set to assigned code for this request, UE ID set to IMSI or mobile station identifier number (MSISDN), discovery entry ID, and validity timer. The HPLMN ProSe function may update the existing announcing MCPTT UE's discovery entry with the new ProSe restricted code (or the ProSe restricted code prefix with ProSe restricted code suffix pool if restricted direct discovery with application-controlled extension is used) and the new validity timer by using the MCPTT UE's corresponding discovery entry ID included in the discovery request message. If the discovery request message included the discovery timer set to zero for a discovery entity ID, then the HPLMN ProSe function may inform the VPLMN ProSe function to remove resources for that discovery entry ID by setting the timer to zero. The HPLMN ProSe function may send the announce authorization message towards the VPLMN ProSe Function. The VPLMN ProSe function may acknowledge the HPLMN ProSe function that it authorizes the MCPTT UE to perform restricted discovery announcing if the announce authorization message contain a new discovery entery ID. If the discovery entery ID already exists, the VPLMN ProSe function may acknowledge the update as requested.

If the announcing is not "on-demand", the HPLMN ProSe function may construct a discovery respond message with ProSe restricted code (or ProSe restricted code prefix with ProSe restricted code suffix pool if restricted direct discovery with application-controlled extension is used), validity timer, and discovery entity ID. If the announcing is "on-demand" and is authorized and enabled, the HPLMN ProSe function may construct the discovery respond message with a validity timer, announcing enabled indicator, and discovery entity ID. The validity timer may be set to zero if it is zero in discovery request message originated by the MCPTT UE. The HPLMN ProSe function may send the discovery respond message towards the MCPTT UE. MCPTT UE may start announcing the provided ProSe restricted code. if restricted direct discovery with application-controlled extension is used, the MCPTT UE may append a ProSe restricted code suffix from the received ProSe restricted code suffix pool to the ProSe Restricted Code Prefix to form a ProSe Restricted Code. The MCPTT UE may use different suffixes from the provided ProSe restricted code suffix pool to form and announce different ProSe restricted codes without having to contact the HPLMN ProSe function as long as the validity timer permits. If "on-demand" announcing is used and the HPLMN ProSe function has not provided ProSe restricted code (or ProSe restricted code prefix with ProSe restricted code suffix pool if restricted direct discovery with application-controlled extension is used), the MCPTT UE may wait for an announcing alert request message from the HPLMN ProSe function before announcing on PC5 interface.

Figure 9:
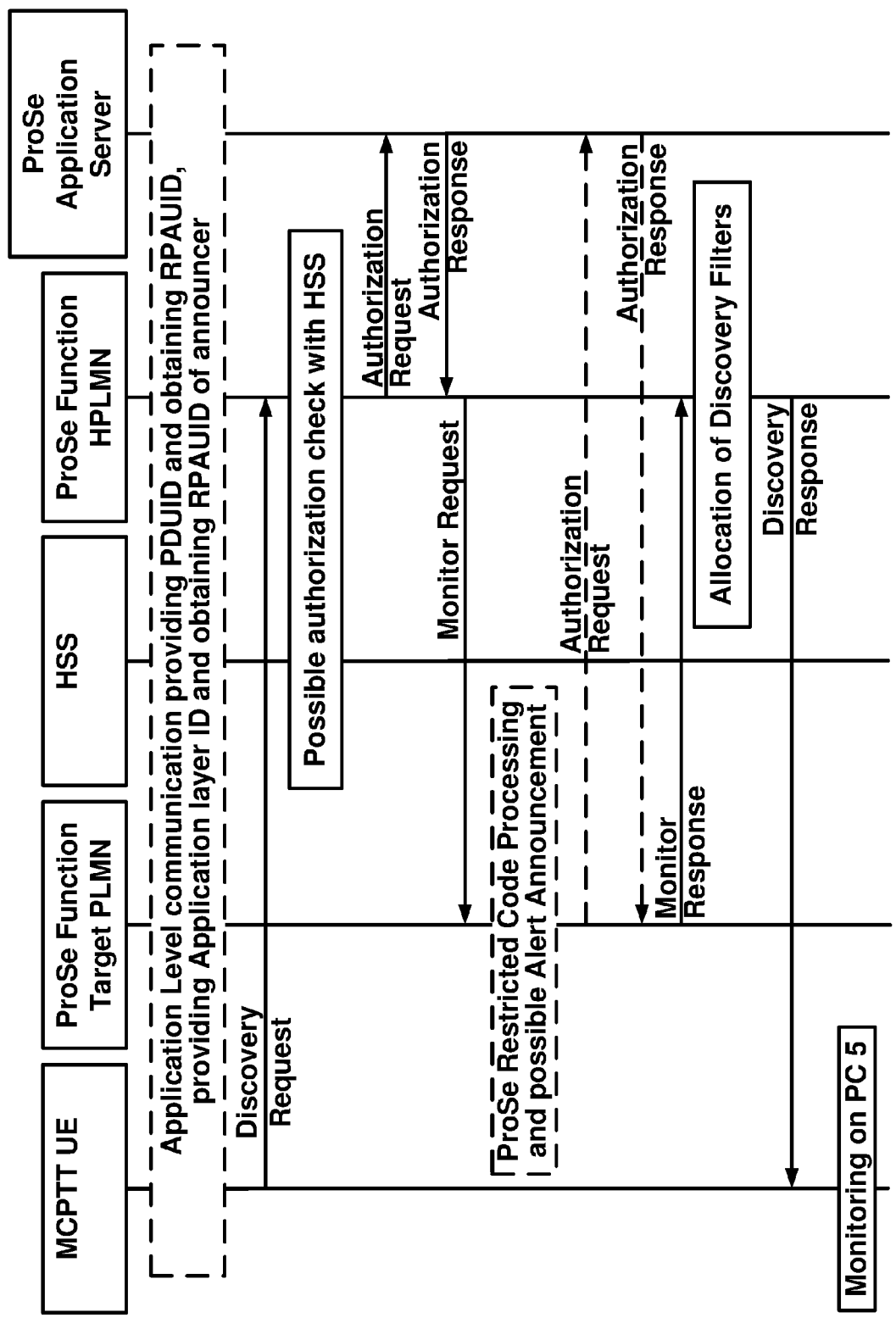
FIG. 9 is a flow diagram illustrating an example process for monitoring an MCPTT UE as per an aspect of an embodiment of the present invention.

FIG. 9 shows example procedures for the monitoring MCPTT UE. The procedure for monitoring MCPTT UE may comprise the application client in the MCPTT UE may retrieve the ProSe discovery UE identity (PDUID) and may provide it to the ProSe application server. The ProSe application server may allocate a restricted ProSe application UE identity (RPAUID) for that PDUID, may store the binding between the PDUID and the RPAUID and may return the RPAUID to the application client in the MCPTT UE. The MCPTT UE may obtain RPAUIDs of those MCPTT target users from the ProSe Application Server passed in an application level container. RPAUID instead of PDUID is used since MCPTT is a public safety feature. In order to get the discovery filter, the monitoring MCPTT UE may construct a discovery request message comprising RPAUID set to the monitoring MCPTT UE identity, UE identity set to IMSI, command=monitor, discovery type, application ID set to unique identifier for the application that triggered discovery procedure, application level container compromising the Target RPAUIDs that the MCPTT UE is to monitor, discovery entry ID showing the discovery identity that it is a new discovery or an existing one, and the optional requested discovery timer. The requested discovery timer may be set to zero to indicate HPLMN to delete the discovery filter(s) for that discovery entry ID. The application level container may include some information about ProSe restricted code suffix such as group or user specific information if direct discovery with application-controlled extension is used. The MCPTT UE may send the discovery request message towards HPLMN ProSe function.

The HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS provides also MSISDN of the MCPTT UE and PLMN ID of where the MCPTT UE is registered. The HPLMN ProSe function may send an authorization request containing RPAUID and request type set to "restricted discovery/monitor" towards the ProSe application server. If restricted direct discovery with application-controlled extension is used, the request type is then set to "restricted discovery with application-controlled extension/ monitor". The ProSe application server constructs an authorization response comprising target PDUIDs and corresponding Target RPAUID that the RPAUID in the authorization request may monitor, PDUID of the requesting MCPTT UE, and response type set to "restricted discovery/ monitor ack" (or to "restricted discovery with application-controlled extension/monitor ack" if restricted direct discovery with application-controlled extension is used). The ProSe application server may send the authorization response towards the HPLMN ProSe function.

The HPLMN ProSe function may construct a monitor request message comprising RPAUID of monitoring MCPTT UE, UE identity set to IMSI or MSISDN, Target PDUID and corresponding target RPAUID, application ID set to unique identifier for application that triggered the discovery procedure, and discovery entry ID to identify the discovery entry being new or an existing one. The HPLMN ProSe function may send the monitor request towards the target PLMN ProSe function which belongs to the monitoring MCPTT UE. If the discovery entry ID is an existing one, the target PLMN ProSe function may modify the existing discovery procedure with the parameters included in the monitor request message.

The target PLMN ProSe function may retrieve the ProSe restricted code (or the ProSe restricted code prefix if the restricted direct discovery with application-controlled extension is used) corresponding to the targeted PDUID, targeted RPAUID, and application ID. If in the context of the announcing MCPTT UE, the announcing enabled indicator is stored, the target PLMN ProSe function may construct an announcing alert request message comprising RPAUID indicating which monitoring MCPTT UE is interested in the targeted MCPTT UE announcement, application ID set to unique identifier for the application that triggered discovery procedure, ProSe restricted code which was retrieved from the context of the targeted announcing MCPTT UE (or ProSe restricted code prefix with ProSe restricted code suffix pool if restricted direct discovery with application-controlled extension was requested by the announcing MCPTT UE), and discovery entry ID to indicate it is a new discovery entity or an existing one. The target PLMN PRoSe function may send the message towards the targeted MCPTT UE and upon receipt of the announce alert response message from that MCPTT announcing UE, the ProSe function removes the announcing enabled indication associated to the ProSe restricted code (or ProSe restricted code prefix with ProSe restricted code suffix pool if restricted direct discovery with application-controlled extension was requested by the announcing MCPTT UE) from the Announcing MCPTT UE context. The MCPTT UE may now start announcing the ProSe restricted code (or ProSe restricted code prefix with ProSe restricted code suffix pool if restricted direct discovery with application-controlled extension was requested by the announcing MCPTT UE).

The target ProSe function may construct an authorization request message comprising RPAUID set to that of the monitoring MCPTT UE, Request Type set to "restricted discovery/permission", and target RPAUID set to that of the announcing MCPTT UE. The target ProSe function may send the authorization request message towards the ProSe application server.

The ProSe application server may acknowledge the target ProSe function by constructing an authorization response message comprising PDUID of the announcing MCPTT UE which is to be monitored and response type set to "restricted discovery/permission ack" and by sending it towards the target PLMN ProSe function.

The target ProSe function constructs a monitor response message compromising ProSe restricted code (or ProSe restricted code prefix with ProSe restricted code suffix pool if restricted direct discovery with application-controlled extension was requested by the announcing MCPTT UE) and the corresponding validity timer. The target ProSe function may send the monitor response message towards the HPLMN ProSe function.

From the ProSe application server, the HPLMN ProSe function has now retrieved the ProSe restricted code (or ProSe restricted code prefix with ProSe restricted code suffix pool if restricted direct discovery with application-controlled extension was requested by the announcing MCPTT UE) and the corresponding validity timer for each pair of target PDUID-target RPAUID bound with application ID and stored as the user content of the monitoring MCPTT UE. The HPLMN ProSe function based on the ProSe restricted code (or ProSe restricted code prefix with ProSe restricted code suffix pool if restricted direct discovery with application-controlled extension was requested by the announcing MCPTT UE) and the corresponding validity timer, allocates a discovery filter with corresponding time-to-live (TTL).

The HPLMN ProSe function may construct a discovery response message comprising target RPAUID(s) and the corresponding discovery filter(s) that comprises ProSe restricted code (or ProSe restricted code prefix with ProSe restricted code suffix pool if restricted direct discovery with application-controlled extension was requested by the announcing MCPTT UE) to be monitored and the corresponding TTL showing how long the filter is valid. If the requested discovery timer in discovery request message sent by MCPTT monitoring UE was set to zero, the TTL in the discovery response message may be set to zero. The discovery response message also comprises discovery entry ID to identify the discovery entity. The HPLMN ProSe function may send the discovery response message towards the monitoring MCPTT UE.

The MCPTT UE uses the discovery filter to monitor the announcing MCPTT UE.

Figure 10:
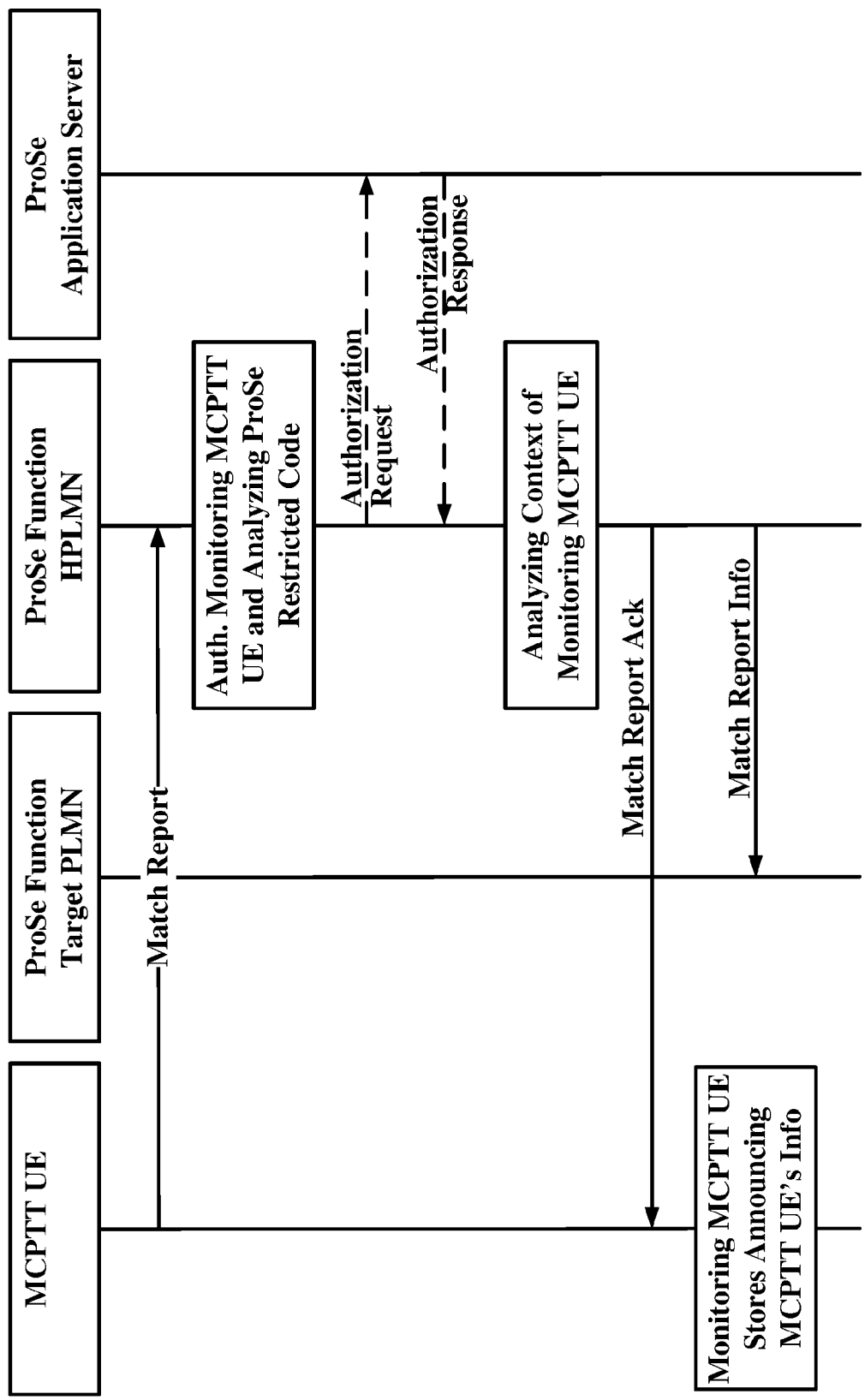
FIG. 10 is a flow diagram illustrating an example procedure in the matched report announcing and/or monitoring as per an aspect of an embodiment of the present invention.

FIG. 10 illustrates a flow diagram showing procedures in the matched report. The procedure for match report for announcing/monitoring is if the monitoring MCPTT UE has over the air received a ProSe restricted code (or the ProSe restricted code prefix and the ProSe restricted code suffix if the restricted direct discovery with application-controlled extension is used) is matching the discovery filter obtained in the discovery response message from the HPLMN ProSe function but the announcing MCPTT UE does not have an RPAUID with a valid TTL, the monitoring MCPTT UE may construct a match report message comprising its own RPAUID, its IMSI or MSISDN as UE identity, discovery type set to "restricted discovery", application ID set to unique identifier for the application that triggered the monitoring request, the over the air received ProSe restricted code, optional metadata requested, and announcing PLMN ID of the PLMN where the announcing MCPTT UE was monitored. The monitoring MCPTT UE transmits the match report message towards the HPLMN ProSe function.

The HPLMN ProSe function may verify if the monitoring MCPTT UE may perform restricted discovery and may analyze ProSe restricted code (or the ProSe restricted code prefix and the ProSe restricted code suffix if the restricted direct discovery with application-controlled extension is used). The HPLMN ProSe function may identify the announcing MCPTT UE's RPAUID in the context of the monitoring MCPTT UE.

If metadata requested was included to the originated match report message by the monitoring MCPTT UE, the HPLMN ProSe function may locate the ProSe application server from the application ID and may construct an authorization request message comprising monitoring MCPTT UE's RPAUID, announcing MCPTT UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising monitoring MCPTT UE's PDUID, announcing MCPTT UE's PDUID, response type set to "restricted discovery/match ack", and metadata corresponding to the Announcing MCPTT UE.

The HPLMN ProSe function may verify that the PDUID belongs to the monitoring MCPTT UE and the announcing MCPTT UE's PDUID are the same as the announcing MCPTT UE's PDUID that is stored in the context of the Monitoring MCPTT UE.

The HPLMN ProSe function may construct a match report ack comprising application ID set to unique identifier for the application that triggered the monitoring request, announcing MCPTT UE's RPAUID, validity timer, and optionally meta data.

The monitoring MCPTT UE may store the mapping between the ProSe restricted code (or the ProSe restricted code prefix and the ProSe restricted code suffix if the restricted direct discovery with application-controlled extension is used), announcing MCPTT UE's PRAUID, the application ID unique identifier of the application that triggered the monitoring procedure, and the related validity timer.

The HPLMN ProSe function may construct a Match Report Info message comprising Monitoring MCPTT UE's RPAUID, announcing MCPTT UE's RPAUID, announcing MCPTT UE's identity set to IMSI or MSISDN for charging purposes, ProSe restricted code (or the ProSe restricted code prefix and the ProSe restricted code suffix if the restricted direct discovery with application-controlled extension is used), and discovery type set to "restricted discovery". The HPLMN ProSe function may send the match report info message towards the announcing MCPTT UE's PLMN ProSe function and the ProSe function of the PLMN where the announcing MCPTT UE may be roaming in.

In Model B, the discoverer MCPTT UE may use ProSe query code to find the discoveree MCPTT UE. The discoveree MCPTT UE may use ProSe response code to identify itself. The ProSe response code is sent by the discoveree MCPTT UE over the air upon receiving a ProSe query code matching any discovery query filter(s). The discoverer MCPTT UE discovers then the discoveree MCPTT UE by matching the ProSe response code to any discovery response filter(s). The ProSe query code, and the discovery response filter(s) are allocated by HPLMN ProSe function to the discoverer MCPTT UE. The ProSe response code and discovery query filter(s) are allocated by the HPLMN ProSe function to the discoveree MCPTT UE.

Model B compromises procedure for the discoveree MCPTT UE and procedure for the discoverer MCPTT UE procedure. It may include matching procedure for the case when the discoverer MCPTT UE receives ProSe response code over the air that matches the discovery filter provided by the HPLMN ProSe function to the discoveree MCPTT UE in the discovery response message, however the corresponding RPAUID does not have valid validity timer. Model B is always for restricted discovery.

Figure 11:
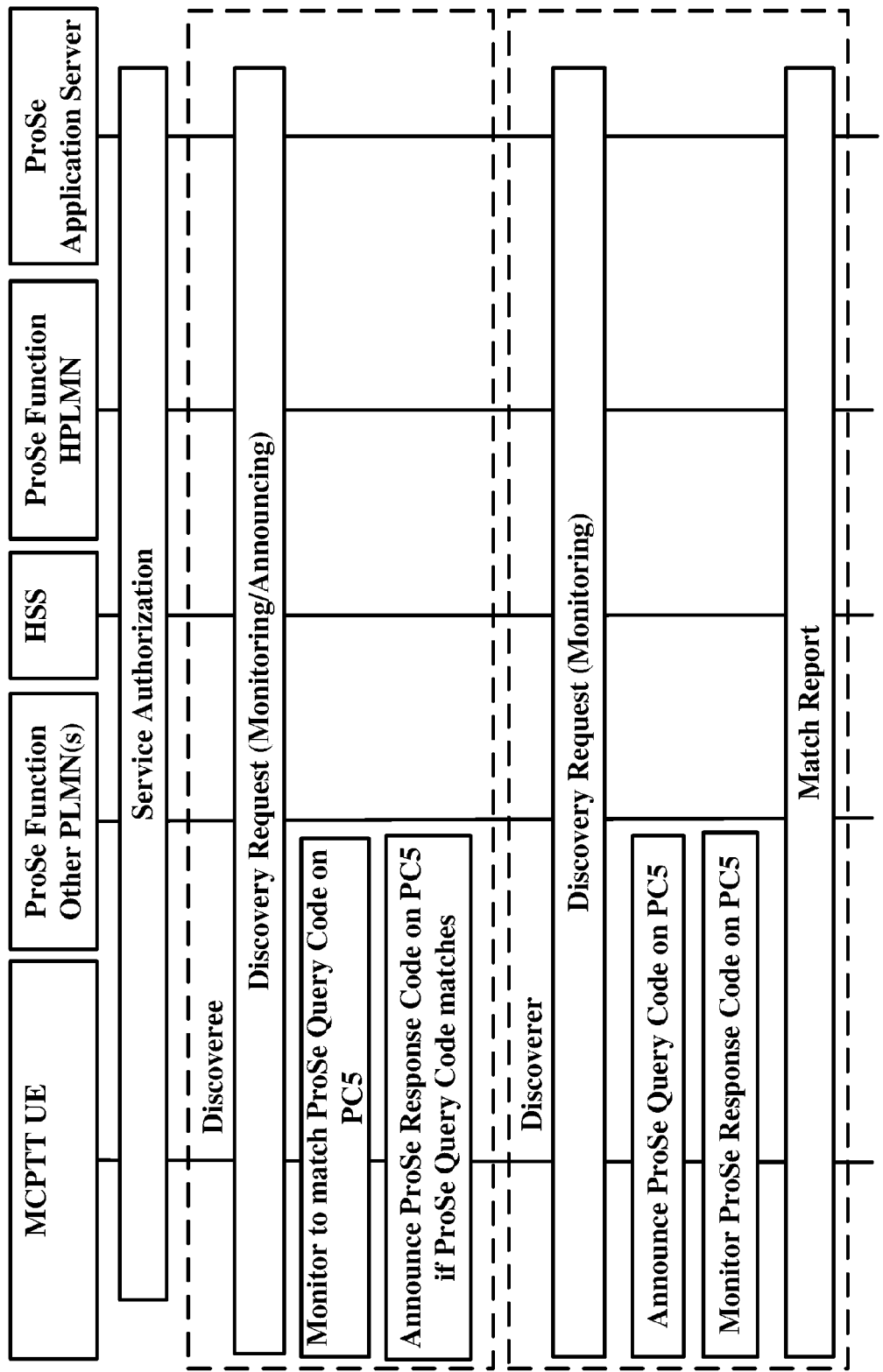
FIG. 11 is a flow diagram illustrating an example procedure for Model B discovery as per an aspect of an embodiment of the present invention.

FIG. 11 illustrates a diagram showing the procedures for Model B discovery. The procedure for Model B discovery comprises authorization, discoveree procedure, and discoverer procedure. Authorization, where the MCPTT UE may get authorized for restricted ProSe direct discovery. In an example, MCPTT may be public safety and the ProSe direct discovery may be restricted.

Discoveree procedure, where the discoveree MCPTT UE may request for discovery and may receive the ProSe response code and associated discovery query filter(s). The discoveree MCPTT UE may employ the discovery filter(s) to monitor ProSe query code on PC5. The discoveree MCPTT UE may announce the ProSe response code if receiving a ProSe query code over the air which matches any of discovery filter(s).

Discoverer procedure, where the discoverer MCPTT UE may request for discovery and may receive the ProSe query code and associated discovery response filter(s). The discoverer MCPTT UE may announce the ProSe query code on PC5 interface. The discoverer MCPTT UE may monitor ProSe response code on PC5 interface that may match any of the discovery response filter(s). The discoverer UE may match-report if having discovered ProSe response code with corresponding PRAUID with no valid validity timer. The discoveree, discoverer, and match-report procedures are explained below.

Figure 12:
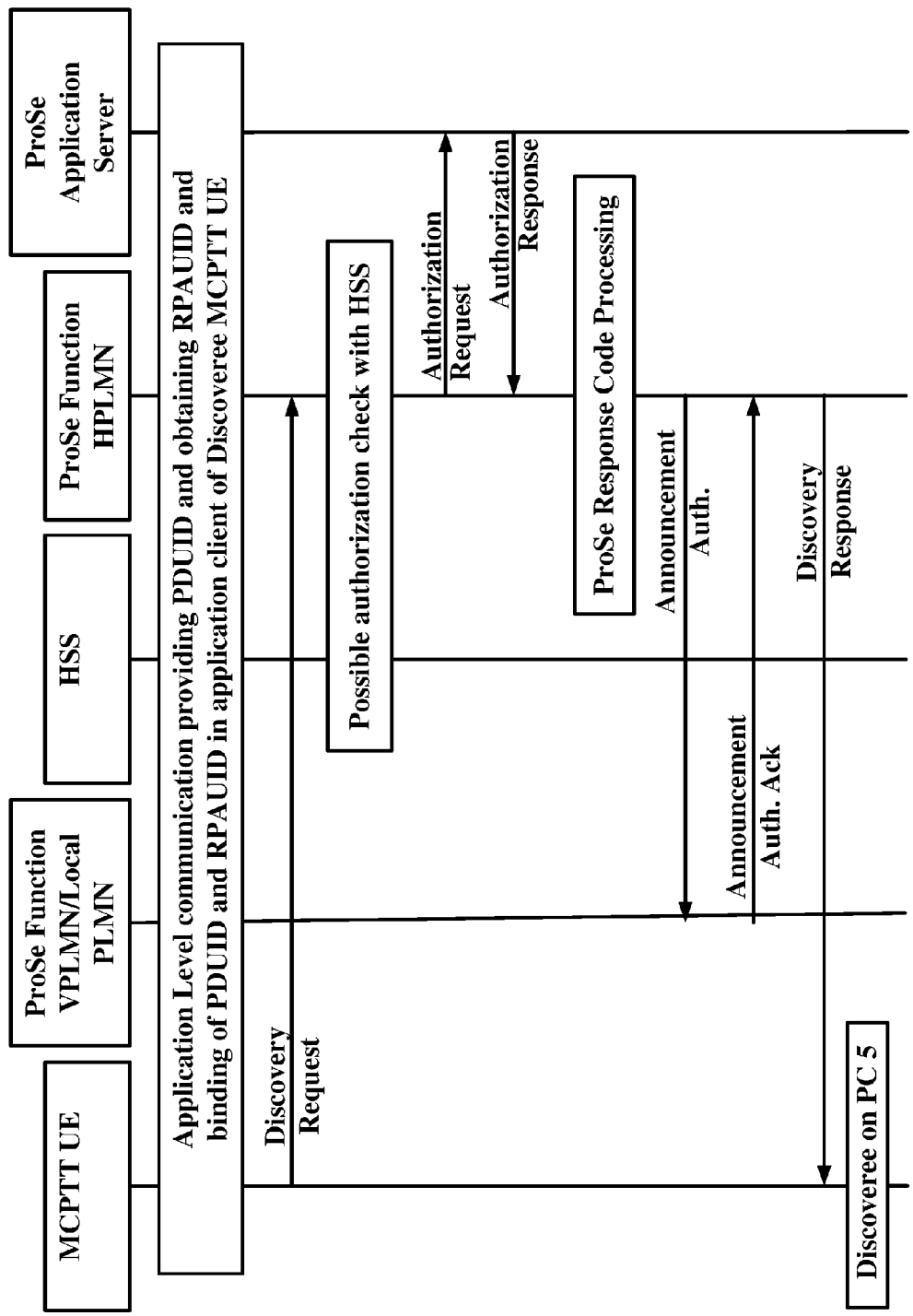
FIG. 12 is a flow diagram illustrating an example procedure for a discoveree MCPTT UE as per an aspect of an embodiment of the present invention.

FIG. 12 illustrates a flow diagram showing the procedures for the discoveree MCPTT UE. The procedure for discoveree MCPTT UE may comprise the application client in the MCPTT UE retrieving the ProSe discovery UE identity (PDUID) and providing it to the ProSe application server. The ProSe application server may allocate a restricted ProSe application UE identity (RPAUID) for that PDUID, may store the binding between the PDUID and the RPAUID and may return the RPAUID to the application client in the MCPTT UE. The application client in the MCPTT UE may store the binding between the RPAUID and its own PDUID and may use those RPAUID to perform discoveree request procedure.

The discoveree MCPTT UE may establish a connection to a HPLMN ProSe function and may construct a discovery request message comprising RPAUID set to what the MCPTT UE will announce, UE identity set to IMSI, command indicating this is for discoveree UE, discovery type set to "restricted discovery", discovery model indicating Model B, application ID set to unique identifier for the application that triggered discovery procedure, discovery entry ID showing the discovery identity that it is a new discovery or an existing one, and PLMN ID of the carrier frequency in announcing PLMN ID if the serving PLMN signaled carrier frequency is not operated by HPLMN or VPLMN and if inter-PLMN ProSe discovery transmission is supported. MCPTT UE may send the discovery request message to HPLMN ProSe function.

HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may locate the ProSe application server based on the application ID in the discovery request message and may send an authorization request containing RPAUID and request type set to "restricted discovery/response" towards the ProSe application server.

The ProSe application server may answer by an authorization response containing PDUID(s) corresponding the RPAUID stored in the ProSe application server and response type set to "restricted discover/response ack."

The HPLMN ProSe function may verify that at least of one of the PDUID(s) may belong to the discovree MCPTT UE. The HPLMN ProSe function may assign a ProSe response code and ProSe query code with the associated discovery query filter(s). The ProSe response code corresponds to the RPAUID in the discovery request and the HPLMN ProSe function may assign an associated validity timer for the ProSe response code and ProSe query code with the associated discovery query filter(s). The validity timer identifies the duration of validity of the ProSe response code and ProSe query code with the associated discovery query filter(s). The discoveree MCPTT UE may use this ProSe response code within this validity duration if PLMN is not changed. The HPLMN ProSe function may store ProSe response code with its associated validity timer and ProSe query code with associated discovery query filter(s) in the context of the MCPTT user.

If the discovery request is authorized, HPLMN ProSe function may construct announce authorization message containing RPAUID, MCPTT application ID, ProSe response set to assigned code for this request, UE ID set to IMSI or MSISDN, discovery entry ID to identify the discovery entry, and validity timer indicating how long the ProSe response code will be valid. The HPLMN ProSe function may send the announce authorization message towards the VPLMN ProSe function.

The VPLMN ProSe function may acknowledge the HPLMN ProSe function that it authorizes the MCPTT UE to perform restricted discovery announcing if the announce authorization message contain a new discovery entry ID. If the discovery entry ID already exists, the VPLMN ProSe function may acknowledge the update as requested i.e. updating the discoveree MCPTT UE's discovery entry by the new ProSe response code and its associated validity timer.

The HPLMN ProSe function may construct a discovery response message with discovery type set to Model B, ProSe response code, discovery query filter(s) suited for certain ProSe Query code, validity timer associated to ProSe response code and the discovery query filter(s), and discovery entity ID to identify the discovery identity. The MCPTT discoveree UE may use the discovery query filter(s) (which may be multiple) to determine which ProSe query code triggers that the MCPTT discoveree UE announces the assigned ProSe response code. The HPLMN ProSe function may send the discovery response message towards MCPTT discoveree UE.

The MCPTT discoveree UE may use the discovery query filter(s) which many be multiple to determine which ProSe query code triggers that the MCPTT discoveree UE announces the assigned ProSe response code. If the validity timer expires, the MCPTT discoveree ue may send a new discovery request message towards the HPLMN ProSe function.

Figure 13:
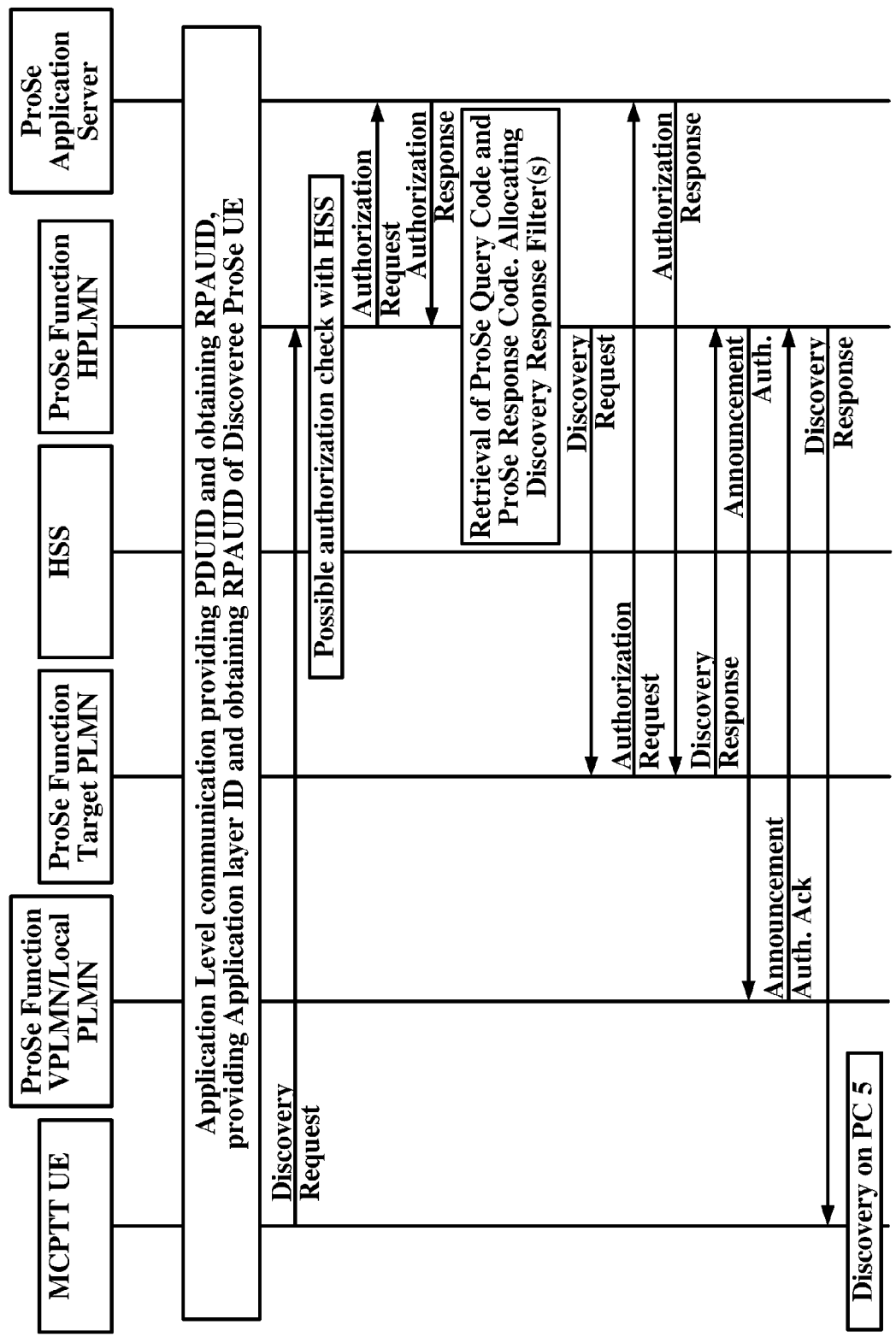
FIG. 13 is a flow diagram illustrating an example procedure for a discoverer MCPTT UE as per an aspect of an embodiment of the present invention.

FIG. 13 illustrates an example flow diagram showing an example procedure for a MCPTT UE. The procedure for the MCPTT UE may comprise the application client in the MCPTT UE may retrieve the ProSe discovery UE identity (PDUID) and may provide it to the ProSe application server. The ProSe application server allocates a restricted ProSe application UE identity (RPAUID) for that PDUID, may store the binding between the PDUID and the RPAUID and may return the RPAUID to the application client in the MCPTT UE. The MCPTT UE may obtain RPAUIDs of those MCPTT target users from the ProSe application server passed in an application level container. RPAUID instead of PDUID may be used for public safety feature MCPTT.

The discoverer MCPTT UE may establish connection to the MPLMN ProSe function and may construct a discovery request message comprising RPAUID set to what the discoverer MCPTT UE wants to announce, UE identity set to IMSI, command showing this is for ProSe query procedure, discovery type set to "restricted discover", discovery model set to Model B, application ID set to unique identifier for the application that triggered discovery procedure, application level container compromising the target RPAUIDs that the MCPTT UE is to discover, discovery entry ID showing the discovery identity that it is a new discovery or an existing one, and the optional requested discovery timer. The requested discovery timer may be set to zero to indicate HPLMN to delete the discovery filter(s) for that discovery entry ID. The MCPTT UE may send the discovery request message towards HPLMN ProSe Function.

HPLMN ProSe function may check for authorization for the MCPTT application. If there is not any associated MCPTT UE context, the HPLMN ProSe function may check with HSS and if needed may create a new context for the MCPTT UE that contains the subscription parameters for this MCPTT UE. HSS may provide MSISDN of the MCPTT UE and PLMN ID of where the MCPTT UE is registered.

The HPLMN ProSe function may locate the ProSe application server based on the application ID in the discovery request message and may send an authorization request containing RPAUID, request type set to "restricted discovery/query", and application level container towards the ProSe application server.

The ProSe application server may construct an authorization response comprising target PDUIDs and corresponding target RPAUID that the RPAUID in the authorization request may discover, PDUID of the requesting MCPTT UE, and response type set to "restricted discovery/query ack". The ProSe application server may send the authorization response towards the HPLMN ProSe function.

The HPLMN ProSe function may allocate the context for the discoveree UE(s) if the PLMN ID in the target PDUID-target RPAUID corresponds to a valid ProSe response code. The HPLMN ProSe function may allocate the discovery response filter(s) which trigger the MCPTT discoveree UE to transmit the ProSe response code. This procedure has expiration time which is specified by validity timer.

The HPLMN ProSe function may construct a discovery request message comprising RPAUID of discoveree MCPTT UE, UE identity set to IMSI or MSISDN, target PDUID and corresponding target RPAUID, application ID set to unique identifier for application that triggered the discovery procedure, and discovery entry ID to identify the discovery entry being new or an existing one. The HPLMN ProSe function may send the discovery request towards the target PLMN ProSe Function which belongs to the discoveree MCPTT UE. If the discovery entry ID is an existing one, the Target PLMN ProSe function may modify the existing discovery procedure with the parameters included in the discovery request message.

The target ProSe Function has an option to construct an authorization request message comprising RPAUID set to that of the discoverer MCPTT UE, Request Type set to "restricted discovery/query", and target RPAUID set to that of the discoveree MCPTT UE. The target ProSe function may send the authorization request message towards the ProSe application server.

The ProSe application server may acknowledge the target ProSe function by constructing an authorization response message comprising PDUID of the discovery MCPTT UE, response type set to "restricted discovery/query ack", and target PDUID of the discoveree MCPTT UE. The ProSe application server may send the authorization response message towards the target PLMN ProSe function.

The target PLMN ProSe function may allocate the context of the discoveree MCPTT UE based on target PDUEID-target RPAUID and the application ID. The target PLMN ProSe function may respond with a discovery response comprising ProSe query code which will be used by a HPLMN ProSe function to build the discovery query filter so that it may trigger the discoveree UE to send ProSe Response code, the actual ProSe response code, and validity timer to indicate for how long the ProSe Query code and ProSe response code are valid.

The HPLMN ProSe function may construct an announce authorization message comprising RPAUID of the discovery MCPTT UE, application ID, ProSe query code and its associated validity timer, UE identity set to IMSI or MSISDN of discovery MCPTT UE for charging purposes in the visiting domain, and discovery entry ID to identify the discovery entry. The HPLMN ProSe function may send the announce authorization message towards the VPLMN ProSe function.

The VPLMN may acknowledge that it authorizes the discovery MCPTT UE to perform ProSe direct discovery procedure. If the discovery entry ID in the announce authorization message corresponded an already discovery entry, the VPLMN ProSe function may acknowledge the replacement of the existing ProSe query code and its associated validity timer.

The HPLMN ProSe function may construct the discovery response message comprising discovery model set to Model B, ProSe query code, one or multiple discovery response filters which are generated by the HPLMN ProSe function based on ProSe response code, and validity timer for how long the ProSe query code and discovery response filter(s) are valid. The HPLMN ProSe Function may transmit the Discovery Response message to the Discoverer MCPTT UE.

The discoverer MCPTT UE may obtain the information from the discovery response message to discover discoveree MCPTT UE. If the validity timer is expired, the discoverer MCPTT UE may send a new discovery request message towards the HPLMN ProSe function.

Figure 14:
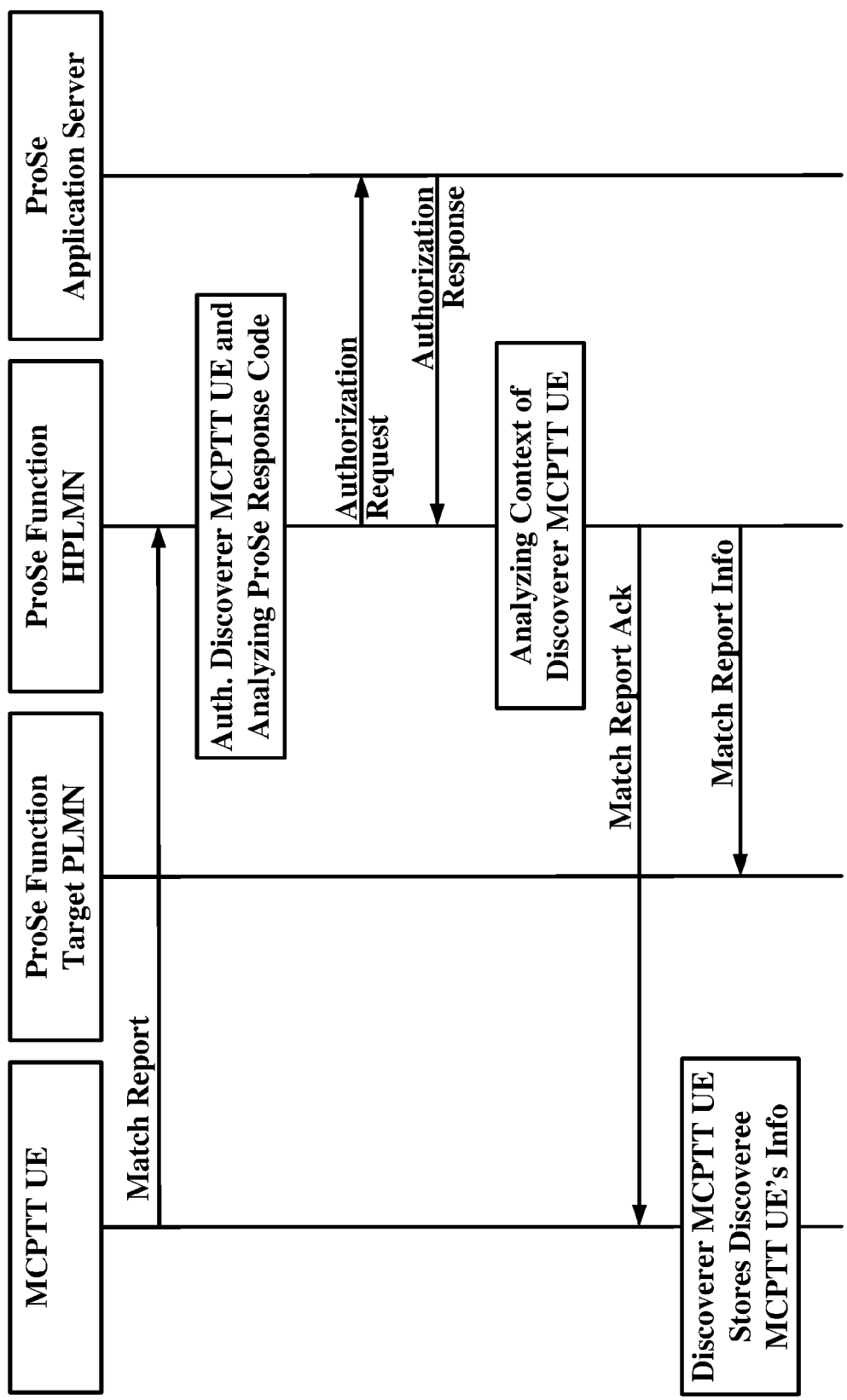
FIG. 14 is a flow diagram illustrating an example procedure for a matched report for a discoveree/discoverer as per an aspect of an embodiment of the present invention.

FIG. 14 illustrates an example flow diagram showing example procedures for the matched report. The procedure for match report for discoveree/discoverer is if the discoverer MCPTT UE may have received over the air a ProSe response code is matching the discovery response filter obtained in the discovery response message from the HPLMN ProSe function but the discoveree MCPTT UE does not have an RPAUID with a valid TTL, the discoverer MCPTT UE may construct a match report message comprising its own RPAUID, its IMSI or MSISDN as UE Identity, discovery type set to "restricted discovery", application ID set to unique identifier for the application that triggered the monitoring request, the over the air received ProSe response code, optional metadata requested, and discoveree PLMN ID of the PLMN where the discoveree MCPTT UE was discovered. The discovere MCPTT UE may transmit the match report message towards the HPLMN ProSe Function.

The HPLMN ProSe function may verify if the discoverer MCPTT UE has performed restricted discovery and may analyze Prose response code. The HPLMN ProSe function may identify the discoveree MCPTT UE's RPAUID in the context of the discoverer MCPTT UE.

If metadata requested was included to the originated match report message by the discoverer MCPTT UE, the HPLMN ProSe function may locate the ProSe application server from the application ID and may construct an authorization request message comprising discoverer MCPTT UE's RPAUID, discoveree MCPTT UE's RPAUID, and request type set to "restricted discovery/match". The HPLMN ProSe function may send the authorization request message towards the ProSe application server. This step is optional if metadata requested was not included into the original match report message.

The ProSe application server may construct an authorization response comprising discoverer MCPTT UE's PDUID, discoveree MCPTT UE's PDUID, response type set to "restricted discovery/match ack", and metadata corresponding to the discoveree MCPTT UE.

The HPLMN ProSe function may verify that the PDUID belongs to the discoverer MCPTT UE and the discoveree MCPTT UE's PDUID are the same as the discoveree MCPTT UE's PDUID that is stored in the context of the discoverer MCPTT UE.

The HPLMN ProSe function may construct a match report ack comprising application ID set to unique identifier for the application that triggered the discovery request, discoveree MCPTT UE's RPAUID, validity timer, and optionally meta data.

The discoverer MCPTT UE may store the mapping between the ProSe response code, discoveree MCPTT UE's PRAUID, the application ID unique identifier of the application that triggered the discovery procedure, and the related validity timer.

The HPLMN ProSe Function may construct a match report info message comprising discoverer MCPTT UE's RPAUID, discoveree MCPTT UE's RPAUID, discoveree MCPTT UE's Identity set to IMSI or MSISDN for charging purposes, ProSe response code, and discovery type set to "restricted discovery". The HPLMN ProSe function may send the match report info message towards the discoveree MCPTT UE's PLMN ProSe function and the ProSe function of the PLMN where the discoveree MCPTT UE may be roaming in.

Figure 15:
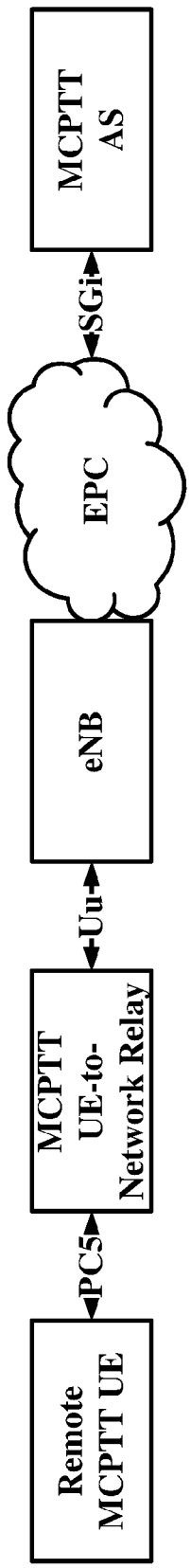
FIG. 15 is a block diagram of an example MCPTT UE-to-network relay as per an aspect of an embodiment.

A public safety ProSe (MCPTT) UE may provide the functionality to support connectivity to the network for a remote MCPTT UE. An MCPTT UE may be considered to be remote if it has established a successful PC5 link connection to a UE-to-Network relay. A remote MCPTT UE may be out of E-UTRAN coverage. An MCPTT UE may be within a coverage of E-UTRAN and may choose not to use E-UTRAN coverage. At the time of discovery ProSe relay service codes for MCPTT services in the MCPTT UE-to-Network relay are recognized by the remote MCPTT UE to identify the MCPTT UE-to-Network relay. Relay service codes are pre-provisioned in the MCPTT UE-to-Network relay and the remote MCPTT UE and are communicated by discovery announcement message for Model A ProSe discovery and by discovery solicitation message/discovery response message for Model B ProSe discovery. The remote MCPTT UE may employ the MCPTT UE-to-Network relay to access E-UTRAN and thereby performing IMS registration and also MCPTT call establishment, as illustrated in example FIG. 15.

The MCPTT UE-to-Network relay may function as a relay for unicast traffic between remote UE and the network by relaying any IP traffic to the UE. The MCPTT UE-to-Network relay may function as a relay for multicast broadband multicast service (MBMS) traffic using one ProSe Direct Communication.

In this context, the MCPTT UE may be represented by a remote MCPTT UE and a UE-to-Network MCPTT UE which have PC5 interface to each other. This may be transparent to the E-UTRAN network and/or IMS network.

To set up an on-network MCPTT call, the MCPTT UEs may register with an IP Multimedia Subsystem (IMS) network. At the time of registration to the IMS network, an MCPTT UE may include its supported IMS communication service identifier (ICSI) values for the IMS communication services it intends to use. The MCPTT UE may register its supported IMS application reference identifier (IARI) values for the IMS applications it intends to use at the time of IMS registration as described here. The UE may include supported ICSI values in a g.3gpp.icsi-ref media feature tag for the IMS communication services it intends to use, and IARI values, for the IMS applications it intends to use in a g.3gpp.iari-ref media feature tag. The UE may include the media feature tags for supported streaming media types.

Figure 16:
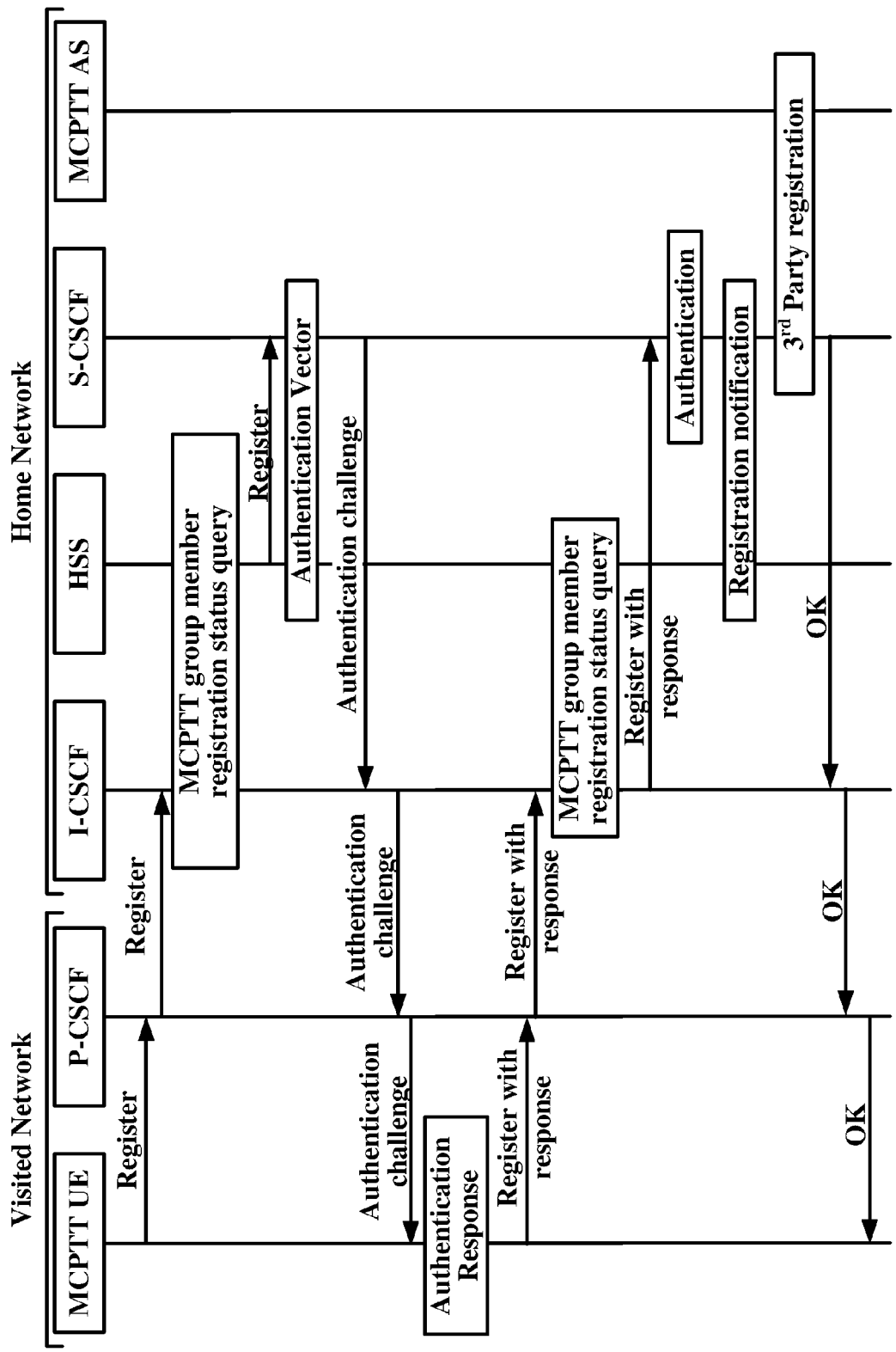
FIG. 16 is a flow diagram showing an example IMS registration procedure of an MCPTT UE as per an aspect of an embodiment.

FIG. 16 illustrates an example flow diagram showing an IMS registration of an MCPTT UE. MCPTT UE may send a SIP REGISTER request containing MCPTT feature tag in contact header field towards the P-CSCF in the visiting network; P-CSCF may use the MCPTT UE's ID to locate the I-CSCF in the home network by DNS query; I-CSCF in the home network may select suitable S-CSCF with help of HSS; S-CSCF may challenge the registration by requesting an authentication. If the authentication information is not valid, S-CSCF may get it from HSS; MCPTT UE may provide authentication response and may send the SIP REGISTER request containing authentication response and the MCPTT feature tag in the contact header towards the P-CSCF in the visiting network; P-CSCF may use the MCPTT UE's ID to locate the I-CSCF in the home network by DNS query; I-CSCF in the home network may select suitable S-CSCF with help of HSS; S-CSCF may authenticate the MCPTT UE and may send registration notification to the HSS and may receive the MCPTT user profile from the HSS; The MCPTT user profile may be used for the 3rd party register to the MCPTT application server (AS); and S-CSCF may respond to OK to the MCPTT UE.

Existing MCPTT calls may include audio. The existing MCPTT may not support various enhanced call capabilities. There MCPTT signaling may be enhanced to support advanced call capabilities. In an example embodiment, enhanced MCPTT calls may include capabilities such as audio, video, data, full duplex, dispatching, and/or administering. To avoid or reduce any possible compatibility issues, new service or application identifiers may be implemented for the additional capabilities. An example embodiment may enhance ICSI to indicate different capabilities for MCPTT e.g. audio, video, data, full duplex, dispatching, and/or administering capabilities. One or more IMS service parameters be communicated during the registration process to indicate at least one MCPTT capability to a network server, e.g. a proxy server, a registrar server.

The wireless device may register one or more IMS communication service identifiers (ICSIs) of push-to-talk (e.g. mission critical PTT) in a wireless network. One of the one or more ICSIs may indicate at least one of audio, video, data, full duplex, dispatching, and/or administering capabilities of the wireless device. ICSI may be in the form of a media feature tag. A feature tag may indicate one or more capability of the wireless device. For example, a specific feature tag, such as 3gpp-service.ims.icsi.mcpttvideo may indicate video capability. This is an example, other features tag names may be used. One or more ICSI may indicate a combination of at least two of audio, video, data, full duplex, dispatching, and/or administering capabilities of the wireless device. For example, a feature tag 3gpp-service.ims.icsi.mcpttmedia, may indicate capability for both audio and video.

In another example, one or more additional parameters may be included in the registration message along with a feature tag to indicate the wireless device capability or a combination of one or more capabilities of the wireless device.

According to an embodiment, a wireless device may transmit the registration message to a UE relay which relays to message to a network node. The wireless device may discover the UE relay using discovery model A or model B. In an example, the UE relay may decode the registration message and may update the message headers before retransmitting the message. The UE relay may update the source and destination address in the registration message.

In an example, the registration message may further register one or more IMS application reference identifiers (IARIs). One of the one or more IARIs may indicate at least one of audio, video, data, full duplex, dispatching, and/or administering capabilities of the wireless device. IARI may be in the form of a media feature tag. A feature tag may indicate one or more capability of the wireless device. For example, a specific feature tag, such as 3gpp-application-.ims.iari.mcpttvideo may indicate video capability. This is an example, other features tag names may be used. One or more IARI may indicate a combination of at least two of audio, video, data, full duplex, dispatching, and/or administering capabilities of the wireless device. For example, a feature tag 3gpp-application.ims.iari.mcpttmedia, may indicate capability for both audio and video.

In an example embodiment, the wireless device may register one or more IMS application reference identifiers (IARIs) of push-to-talk in a wireless network. One of the one or more IARIs may indicate at least one of audio, video, data, full duplex, dispatching, and/or administering capabilities of the wireless device. In an example, the one or more IARIs may indicate a combination of at least two of audio, video, data, full duplex, dispatching, and/or administering capabilities of the wireless device. The wireless device may further register one or more IMS communication service identifiers (ICSIs. One of the one or more ICSIs may indicate at least one of video and data capabilities of the wireless device.

In an example, the wireless device may register one or more IMS service parameters of push-to-talk in a wireless network. The one or more IMS service parameters may indicate a combination of at least two of audio, video, data, full duplex, dispatching, and/or administering capabilities of the wireless device. The one or more IMS service parameters indicate at least one of audio, video, data, full duplex, dispatching, and/or administering capabilities of the wireless device.

In an example, the embodiments may include enhanced service identifiers representing new services such as 3gpp-service.ims.icsi.mcpttaudio; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminiter.

In an example, the embodiments may include enhanced application identifiers that represent applications for the MCPTT service 3gpp-service.ims.icsi.mcptt; 3gpp-application.ims.iari.mcpttaudio; 3gpp-application.ims.iari.mcpttvideo; 3gpp-application.ims.iari.mcpttdata; 3gpp-application.ims.iari.mcpttfullduplex; 3gpp-application.ims.iari.mcpttdispatcher; and 3gpp-application.ims.iari.mcpttadminister.

Release 13 of MCPTT supports audio with service identifier 3gpp-service.ims.icsi.mcptt. In an example embodiment, in order to maintain interoperability with release 13, release 14 may create three enhanced service identifiers for MCPTT, MCPTT video, and MCPTT data, such as 3gpp-service.ims.icsi.mcpttdefault; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminiter.

In an example, two enhanced application identifier for MCPTT video and MCPTT data and a service identifier for default MCPTT may be employed 3gpp-service.ims.icsi.mcpttdefault; 3gpp-application.ims.iari.mcpttvideo; 3gpp-application.ims.iari.mcpttdata; 3gpp-application.ims.iari.mcpttfullduplex; 3gpp-application.ims.iari.mcpttdatadispatcher; and 3gpp-application.ims.iari.mcpttadminister.

Figure 17:
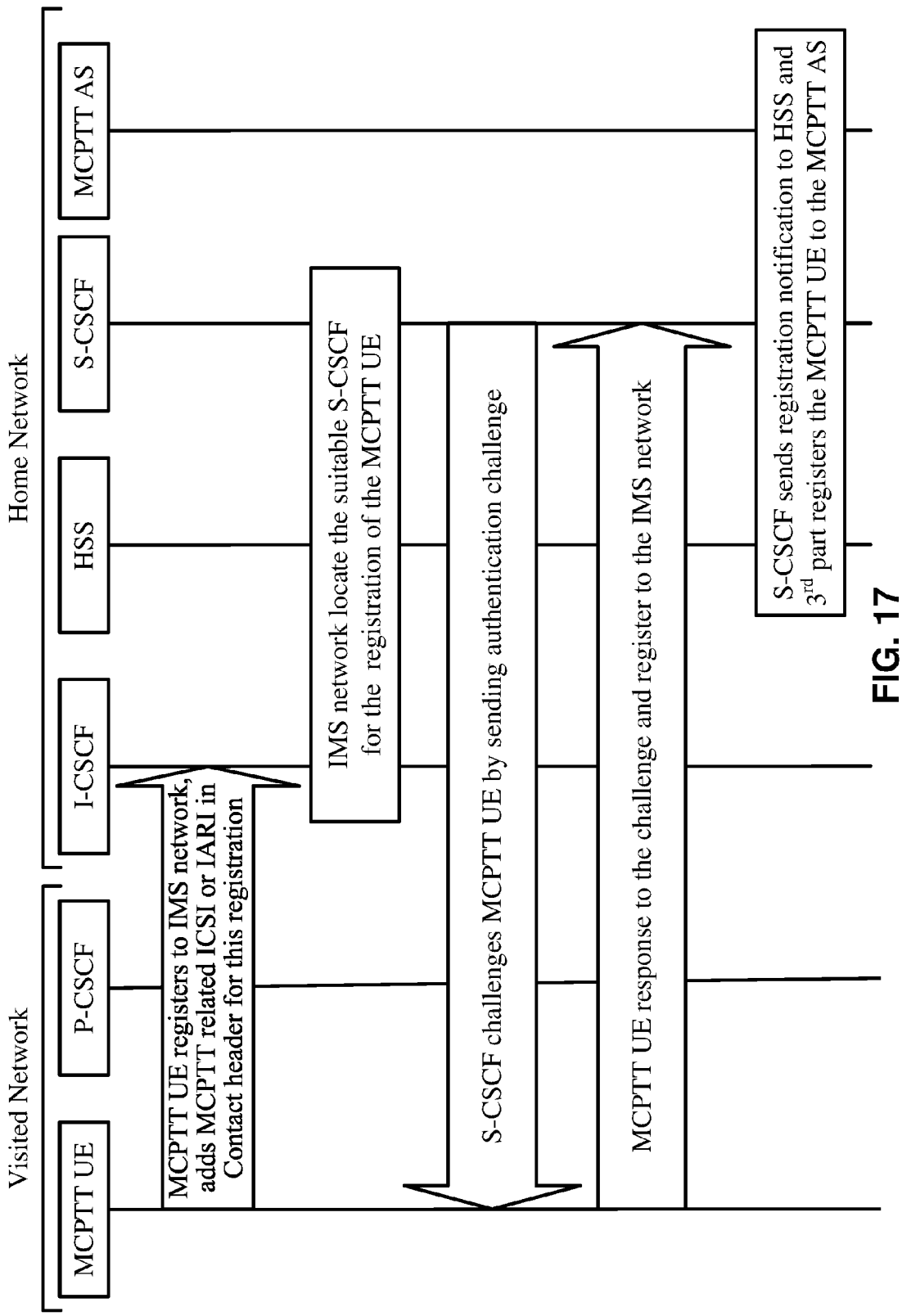
FIG. 17 is a flow diagram of an example IMS registration of an MCPTT UE as per an aspect of an embodiment.

FIG. 17 is a flow diagram for an example IMS registration of an MCPTT UE. The MCPTT UE may include the MCPTT related ICSI and IARI which it may intent to use to its contact header field of the register message when registering to the IMS network; IMS network may locate the most suitable S-CSCF for this registration and may forward the registration request to that S-CSCF; S-CSCF may challenge the MCPTT UE by sending authentication request to the UE; MCPTT UE may respond to the authentication request; and S-CSCF 3rd part may register the UE to the MCPTT AS.

A wireless device may register one or more IMS communication service identifiers (ICSIs) of push-to-talk in a wireless network. One of the one or more ICSIs may indicate at least one of video and data capabilities of the wireless device.

3GPP has defined mission critical push to talk (MCPTT) for release 13 to be limited to audio calls for MCPTT group calls and MCPTT private calls, however in release 14 the MCPTT group calls and MCPTT private calls will also include new capabilities i.e. video and data. For release 14, 3GPP WG SA1's current plan is to modify the requirement specification for MCPTT, 3GPP TS 22.179 by removing all audio related requirements and only keeping the generic requirements for MCPTT. Release 14 will also have new specifications for MCPTT audio group and private calls, MCPTT video group and private calls, and MCPTT data group and private calls. These new capabilities may result in compatibility issue at the time of session setup if the UEs are from different release or from the same release but having different capabilities. New methods disclosed herein may avoid incompatibilities.

In some example cases, network (e.g. the registrar or application servers, and/or third-party application servers, and/or other network entities) may need to know the MCPTT UE's capabilities in terms of supported services and applications.

A network node may transmit a request to a registrar and/or network node storing MCPTT UE capability and request for MCPTT UE capabilities. The network node may transmit a response message to the requester (directly or indirectly) indicating the MCPTT UE capabilities of the UE. The network nodes may communicate (transmit/receive) the MCPTT user's capabilities by exchanging SIP message(s) (e.g. INVITE, MESSAGE).

The network node may transmit a SIP message (e.g. SIP INVITE request) to the UE to set up a session to stream a video clip to the MCPTT UE. Thus, the network may need to know if the MCPTT UE has the capability to receive it.

The network node may transmit a SIP message (e.g. SIP MESSAGE request) to the UE to set up a session to send information about multicast bearer and the related ports for media reception. Thus, the network may need to know about the MCPTT UE's capabilities to receive the multicast media.

A third-party entity may like to get a MCPTT UE's capabilities from the operator's network where MCPTT UE has registered to, in order to e.g. provide a service or application. A third-party entity may transmit a SIP message (e.g. SIP INVITE request) to the UE to set up a session. Therefore, the network must know the MCPTT UE's capabilities to provide this information to the third-party entity.

The UE may response to the SIP message. The network/third-party may subsequently start communicating and transmitting/receiving data, audio, and/or video to/from the MCPTT UE.

Once the MCPTT UEs are all registered to the IMS network and if an MCPTT UE may like to establish an MCPTT call, the MCPTT UE may include all its supported ICSI values for the IMS communication services it may intend to use to all other SIP methods than the SIP REGISTER method. The MCPTT UE may include all its supported IARI values for the IMS applications it may intend to use to those methods.

If this is a request for a new dialog, the Contact header field may be populated as a contact header value which may be a public GRUU value, a temporary GRUU value, or SIP URI containing the contact address of the MCPTT UE; an "ob" SIP URI parameter; an ICSI that the MCPTT UE may include in a g.3gpp.icsi-ref media feature tag; and an IARI that the MCPTT UE may include in a g.3gpp.iari-ref media feature tag.

When MCPTT UE receives ICSI values corresponding to the IMS communication services that the network provides to the user, if the MCPTT UE constructs a request for a new dialog or standalone transaction and the request is related to one of the ICSI values, the MCPTT UE may populate a P-Preferred-Service header field with one of the ICSI values.

In construction of the same request for a new dialog and standalone transaction, the MCPTT UE may populate an Accept-Contact header field comprising an ICSI value which may differ from the one added to P-Preferred-Service header field. In construction of a request for a new dialog or standalone transaction, the MCPTT UE may populate an Accept-Contact header field comprising an IARI value if an IMS application may indicate that an IARI is to be included in a request The MCPTT UE may modify the established dialog capabilities by e.g. adding a media or requesting a supplementary service if the modification is defined for the IMS communication service. If the modification is not defined for that IMS communication service, the MCPTT UE may initiate a new dialog.

Figure 18:
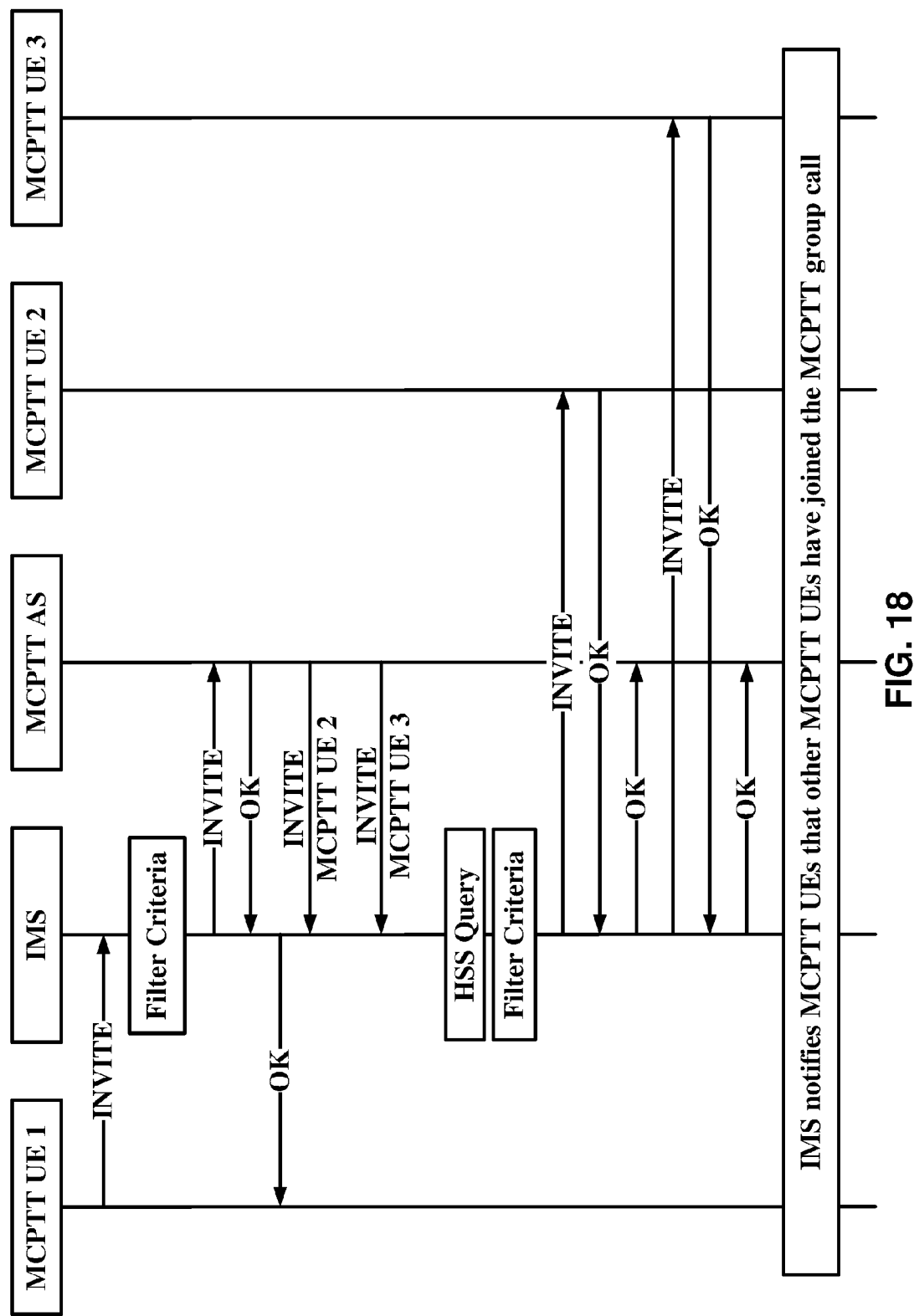
FIG. 18 is a flow diagram of an example MCPTT group session setup by an MCPTT UE as per an aspect of an embodiment.

FIG. 18 illustrates a flow diagram showing an example MCPTT group call setup by MCPTT UE 1. MCPTT UE 1 may initiate an MCPTT group call with MCPTT UE 2 and MCPTT UE 3 by sending an SIP INVITE request which may comprise MCPTT feature tag in Contact header field. The Accept-Contact header field may also comprise the MCPTT feature tag which may indicate that MCPTT service may be required for the MCPTT group call; IMS may validate the service profile of the MCPTT UE 1 and evaluates the filter criteria. It may thereafter forward the invite towards MCPTT AS; MCPTT AS may accept the MCPTT group call and may invite MCPTT UE 2 and MCPTT UE 3 by sending an SIP INVITE request which may comprise MCPTT feature tag in Contact header field. The Accept-Contact header field may also contain the MCPTT feature tag which may indicate that MCPTT service may be required for the MCPTT group call; HSS may be queried to locate MCPTT UE 2 and MCPTT UE 3 and IMS may validate their service profile and may evaluate the filter criteria; MCPTT UE 2 and MCPTT UE 3 may accept the invitation for the MCPTT group call; and IMS may notify the MCPTT UEs that other MCPTT UEs have now joined the on-network MCPTT group call.

Existing MCPTT calls may include audio. The existing MCPTT does not support various enhanced call capabilities. MCPTT signaling may be enhanced to support advanced call capabilities. In an example embodiment, enhanced MCPTT calls may include capabilities such as audio, video and/or data. To avoid or reduce any possible compatibility issues, new service or application identifiers may be implemented for the additional capabilities. An example embodiment, enhances ICSI to indicate different capabilities for MCPTT e.g. audio, video, and/or data capabilities. One or more IMS service parameters be communicated during the new dialog establishment procedure and/standalone transaction process to indicate at least one MCPTT capability to a network server, e.g. a proxy server, a registrar server.

The wireless device may employ one or more IMS communication service identifiers (ICSIs) of push-to-talk (e.g. mission critical PTT) for new dialogs establishment or standalone transactions in a wireless network. One of the one or more ICSIs may indicate at least one of audio, video, data, full duplex, dispatching, and administering capabilities of the wireless device. ICSI may be in the form of a media feature tag. A feature tag may indicate one or more capability of the wireless device. For example, a specific feature tag, such as 3gpp-service.ims.icsi.mcpttvideo may indicate video capability. This is an example, other features tag names may be used. One or more ICSI may indicate a combination of at least two of audio, video, data, full duplex, dispatching, and administering capabilities of the wireless device. For example, a feature tag 3gpp-service.ims.icsi.mcpttmedia, may indicate capability for both audio and video.

In another example, one or more additional parameters may be included in the new dialog establishment or a standalone transaction along with a feature tag to indicate the wireless device capability or a combination of one or more capabilities of the wireless device.

According to an embodiment, a wireless device may transmit the message to establish a new dialog or as a standalone transaction to a UE relay which relays to message to a network node. The wireless device may discover the UE relay using discovery model A or model B. In an example, the UE relay may decode the message for new dialog establishment or for the standalone transition and may update the message headers before retransmitting the message. The UE relay may update the source and destination address in the registration message.

In an example, the message for the new dialog and the standalone transaction may further employ one or more IMS application reference identifiers (IARIs). One of the one or more IARIs may indicate at least one of audio, video, data, full duplex, dispatching, and administering capabilities of the wireless device. IARI may be in the form of a media feature tag. A feature tag may indicate one or more capability of the wireless device. For example, a specific feature tag, such as 3gpp-application.ims.iari.mcpttvideo may indicate video capability. This is an example, other features tag names may be used. One or more IARI may indicate a combination of at least two of audio, video, and data capabilities of the wireless device. For example, a feature tag 3gpp-application.ims.iari.mcpttmedia, may indicate capability for both audio and video.

In an example embodiment, the wireless device may employ one or more IMS application reference identifiers (IARIs) of push-to-talk in a wireless network for establishment of a new dialog or for standalone message. One of the one or more IARIs indicates at least one of audio, video, data, full duplex, dispatching, and administering capabilities of the wireless device. In an example, the one or more IARIs may indicate a combination of at least two of audio, video, data, full duplex, dispatching, and administering capabilities of the wireless device. The wireless device may further employing one or more IMS communication service identifiers (ICSIs) for establishing new dialog or standalone message. One of the one or more ICSIs may indicate at least one of audio, video, data, full duplex, dispatching, and administering capabilities of the wireless device.

In an example, the wireless device may employ one or more IMS service parameters of push-to-talk in a wireless network for establishing a new dialog or a standalone message. The one or more IMS service parameters may indicate a combination of at least two of audio, video, data, full duplex, dispatching, and administering capabilities of the wireless device. The one or more IMS service parameters indicate at least one of audio, video, data, full duplex, dispatching, and administering capabilities of the wireless device.

In an example, the embodiments may include enhanced service identifiers representing new services such as 3gpp-service.ims.icsi.mcpttaudio; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminiter.

In an example, the embodiments may include enhanced application identifiers that represent applications for the MCPTT service 3gpp-service.ims.icsi.mcptt; 3gpp-application.ims.iari.mcpttaudio; 3gpp-application.ims.iari.mcpttvideo; 3gpp-application.ims.iari.mcpttdata; 3gpp-application.ims.iari.mcpttfullduplex; 3gpp-application.ims.iari.mcpttdispatcher and gpp-application.ims.iari.mcpttadminister.

Release 13 of MCPTT supports audio with service identifier 3gpp-service.ims.icsi.mcptt. In an example embodiment, in order to maintain interoperability with release 13, release 14, may create three enhanced service identifiers for MCPTT, MCPTT video, and MCPTT data, such as 3gpp-service.ims.icsi.mcpttdefault; 3gpp-service.ims.icsi.mcpttvideo; 3gpp-service.ims.icsi.mcpttdata; 3gpp-service.ims.icsi.mcpttfullduplex; 3gpp-service.ims.icsi.mcpttdispatcher; and 3gpp-service.ims.icsi.mcpttadminister.

In an example, two enhanced application identifier for MCPTT video and MCPTT data and a service identifier for default MCPTT may be employed 3gpp-service.ims.icsi.mcpttdefault; 3gpp-application.ims.iari.mcpttvideo; 3gpp-application.ims.iari.mcpttdata; 3gpp-application.ims.iari.mcpttfullduplex; 3gpp-application.ims.iari.mcpttdatadispatcher; and 3gpp-application.ims.iari.mcpttadminister.

Figure 19:
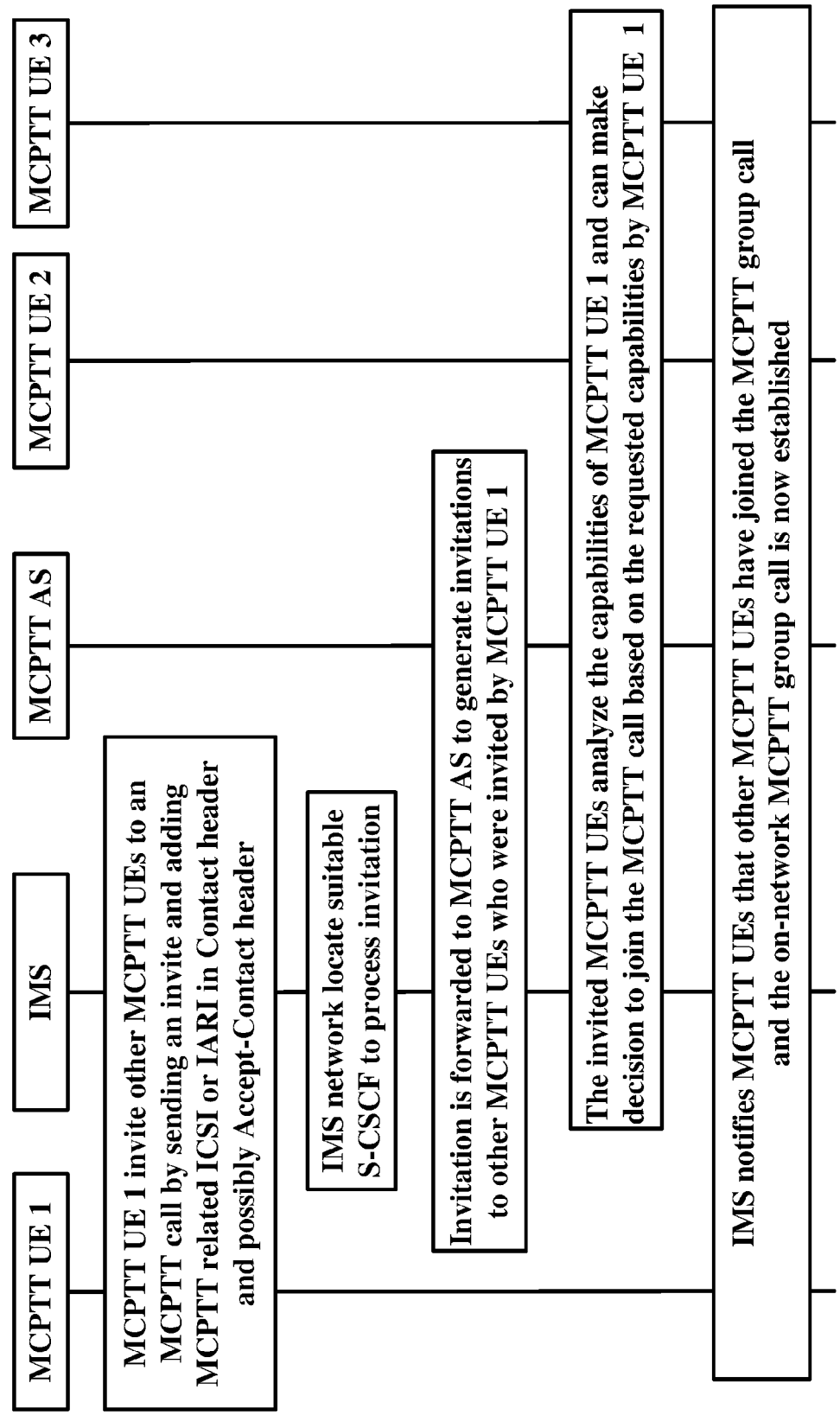
FIG. 19 is a flow diagram of an example MCPTT call setup by MCPTT UE A as per an aspect of an embodiment.

FIG. 19 is a flow diagram for an example MCPTT call setup by MCPTT UE A. MCPTT UE 1 may initiate an MCPTT call with other MCPTT UEs by sending an SIP INVITE request which may comprise MCPTT related ICSI and IARI in the Contact header field. The Accept-Contact header field may also comprise the MCPTT related ICSI and IARI which may indicate that the MCPTT service or the MCPTT application which may be required for the MCPTT call; IMS may validate the service profile of the MCPTT UE 1 and may locate the suitable S-CSCF to process the MCPTT call invitation; S-CSCF may forward the invitation to the MCPTT AS which may generate separate invitations towards other MCPTT UEs who were originally invited by MCPTT UE 1; the invited MCPTT UEs may analyze the capabilities of MCPTT UE 1 who invited them to the MCPTT call and may make decision to join the MCPTT call based on the requested capabilities by MCPTT UE 1; and IMS may notify MCPTT UEs that other MCPTT UEs have joined the MCPTT group call and the on-network MCPTT group call is now established.

In other case an MCPTT UE may need to identify its capabilities for new dialogs or a standalone transaction. For instance an MCPTT UE may like to inform the end MCPTT UE that it is capable of voice session while using packet switch; an MCPTT UE may like to share information that it is capable of audio emergency call and not video emergency call; MCPTT UE A may like to setup a video capable MCPTT group call with MCPTT UE B, MCPTT UE C, and MCPTT UE D. MCPTT UE A sends a SIP INVITE request message to MCPTT Application Server (AS) indicating the video capabilities for this MCPTT group call; and MCPTT UE A is a legacy MCPTT UE which does not support video or data. MCPTT UE B with video capabilities realizes that MCPT UE A is a legacy MCPTT UE at the time of session setup. Thus, there may not be any backward incompatibility issue.

An MCPTT UE (in IMS) may transmit (e.g. share) its capabilities with the network and the end MCPTT UE by adding service feature tags and application feature tags to the SIP requests.

MCVideo/MCData is mentioned as the application throughout this context, example embodiments may be applicable on mission critical data and/or video. Some of the example features are described as MCVideo/MCData, and it implies that the feature may be applicable to MCVideo and/or MCData.

In an example embodiment, an MCVideo/MCData UE may be capable to discover, negotiate service, controlling parameters and capabilities, and to start receiving, storing and displaying video transmitted from another MCVideo/MCData UE. An MCVideo/MCData UE may be discoverable subject to permissions and authorizations, capable of negotiating service, controlling parameters and capabilities, and remotely controlling another MCVideo/MCData UE. The MCVideo/MCData service may allow an MCVideo/MCData User to discover, determine the status, working parameters and capabilities and to negotiate service of MCVideo/MCData UEs within sets authorized to the MCVideo/MCData User. The MCVideo/MCData service may allow an MCVideo/MCData user to discover an MCVideo/MCData UE based on specified categories to which the MCVideo/MCData UE belongs.

These features enable use cases that authorized MCVideo/MCData users that may want to discover and establish communication with remotely located cameras for special purposes such as a surveillance, medical cases or traffic watch. Thus, the MCVideo/MCData cameras may have categories such as surveillance camera, medical usage (located in the ambulance), and traffic. The MCVideo/MCData cameras may have capabilities for the camera such as presence, location, storage and playback, recording angles, and coverage area.

The above requirements are listed for both on-network and off-network functionalities of the MCVideo/MCData. The MCVideo/MCData is based on ProSe principle that the UEs are at each other's proximities, and some of the use cases may be implemented by an authorized person such a dispatcher from the distance such as central station.

On-network MCVideo/MCData may rely on internet protocol multimedia subsystem (IMS) feature and may thereby rely on IMS registration. IETF RFC 3840 defines a mechanism for a UE such as MCVideo/MCData UE to convey its capabilities and characteristics to other MCVideo/MCData UEs and to the serving-call session control function (S-CSCF). IETF RFC 5196 specifies an extension to IETF RFC 3840 creating presence information data format (PIDF) for defining presence format for the presence protocols.

Using the format in IETF RFC 5196 and the procedure in IETF 3840, the above requirements for MCVideo/MCData may be implemented by extending the Contact header field in a session initiated protocol (SIP) message to convey the MCVideo/MCData UE to other UEs as well as to the network. An MCVideo/MCData UE may need to know about other MCVideo/MCData UEs before starting a dialog or sending a standalone message, and the MCVideo/MCData UE may inform the network about its capabilities and characteristics at the time of IMS registration. Some of the capabilities and characteristics such as location of the MCVideo/MCData may change after the registration, that information may thus be updated by the MCVideo/MCData.

In one example embodiment, to set up an on-network MCVideo/MCData call, the MCVideo/MCData UEs may register with IP Multimedia Subsystem (IMS) network. At the time of registration to the IMS network, an MCVideo/MCData UE may include its supported IMS communication service identifier (ICSI) values for the IMS communication services the UE intends to use. The MCVideo/MCData UE may register its supported IMS application reference identifier (IARI) values for the IMS applications it intends to use at the time of IMS registration as described here. The UE may include supported ICSI values in a g.3gpp.icsi-ref media feature tag for the IMS communication services it intends to use, and IARI values, for the IMS applications it intends to use in a g.3gpp.iari-ref media feature tag. The UE may include the media feature tags for supported streaming media types.

The flow diagram in FIG. 16 shows an example embodiment for IMS registration of an MCVideo/MCData UE, if MCPTT is replaced by the MC Video/Data in FIG. 16. MCVideo/MCData UE may send a SIP REGISTER request containing MCVideo/MCData feature tag in contact header field towards the P-CSCF in the visiting network; P-CSCF may use the MCVideo/MCData UE's ID to locate the I-CSCF in the home network by DNS query; I-CSCF in the home network may select suitable S-CSCF with help of HSS; S-CSCF may challenge the registration by requesting an authentication. If the authentication information is not valid, S-CSCF may get it from HSS; MCVideo/MCData UE may provide authentication response and may send the SIP REGISTER request containing authentication response and the MCVideo/MCData feature tag in the contact header towards the P-CSCF in the visiting network; P-CSCF may use the MCPTT UE's ID to locate the I-CSCF in the home network by DNS query; I-CSCF in the home network may select suitable S-CSCF with help of HSS; S-CSCF may authenticate the MCVideo/MCData UE and may send registration notification to the HSS and may receive the MCVideo/MCData user profile from the HSS; the MCVideo/MCData user profile may be used for the 3rd party register to the MCVideo/MCData application server (AS); and S-CSCF may respond to OK to the MCVideo/MCData UE.

In an example embodiment, MCVideo/MCData calls may have capabilities for certain medias. The MCVideo/MCData service may also have some related application such as application for traffic view, surveillance, and/or ambulance. To avoid or reduce any possible compatibility issues, the MCVideo/MCData UE may IMS register it MCVideo/MCData service identifier by employing ICSI and related application identifiers by employing IARI. The ICSI registration may indicate the existing capabilities for MCVideo/MCData such as audio, video, data, full duplex, dispatching, and/or administering capabilities, and the IARI to indicate the related application for MCVideo/MCData.

In an example embodiment, the IMS communication service identifiers (ICSIs) for MCVideo/MCData may comprise, 3gpp-service.ims.icsi.MCVideo/MCData-controller which may indicate MC video and controller capabilities of an MCVideo/MCData UE. This is an example, other ICSI names may be used. In an example embodiment, the IMS communication service identifiers (ICSIs) for MCVideo/MCData may comprise 3gpp-service.ims.icsi.MCVideo/MCData-controllee which may indicate MC video and controllee capabilities of an MCVideo/MCData UE. This is an example, other ICSI names may be used.

In the inter UE transfer, the concept of the controller and controllee may be limited to the media distribution. A mission critical controller UE may be operated by an authorized mission critical user such as dispatcher to operate a mission critical controllee UE from distance in terms of movement, operations, electrical and/or mechanical operations. The MCVideo/MCData controller UE may be used by e.g. a dispatcher to control the MCVideo/MCData controllee UEs which are operating as traffic camera, ambulance camera, and/or surveillance camera. The dispatcher may control the mission critical camera movements, resolutions, and/or recordings. The MCVideo/MCData controller UE may be used by an operator to control a drone for e.g. mechanical operations such as flying and movements and/or electrical instructions such as taking picture and data from the area the drone is.

In an example, the registration message may register a controller MCVideo/MCData UE with the ICSI 3gpp-service.ims.icsi.MCVideo/MCData and further register one or more IMS application reference identifiers (IARIs) for application such as traffic watch, surveillance, and/or ambulance camera, such as 3gpp-application.ims.iari.MCVideo/MCData-traffic, 3gpp-application.ims.iari.MCVideo/MCData-survalliance, and/or 3gpp-application.ims.iari.MCVideo/MCData-ambulance to indicate video and controllee capabilities for traffic watch, surveillance, and/or ambulance. These are examples, other features tag names may be used.

In an example, the registration message may register a controller MCVideo/MCData UE with the ICSI 3gpp-service.ims.icsi.MCVideo/MCData and the mission critical video and the controllee capabilities of applications for traffic watch, surveillance, and/or ambulance may be registered by ICSI by the MCVideo/MCData UE at the time of registration. The MCVideo/MCData UE may register 3gpp-service.ims.icsi.MCVideo/MCData-survelliance, 3gpp-service.ims.icsi.MCVideo/MCData-ambulance, and/or 3gpp-service.ims.icsi.MCVideo/MCData-traffic. Thus, many combinations for the registration of the service and application capabilities of the MCVideo/MCData UE are possible.

Once the MCVideo/MCData UEs are registered to the IMS network and if a MCVideo/MCData UE may like to request a new dialog or standalone transaction, the MCVideo/MCData UE may include its supported ICSI values for the IMS communication services it may intend to use to other SIP methods than the SIP REGISTER method. The MCVideo/MCData UE may include its supported IARI values for the IMS applications it may intend to use to those methods.

If this is a request for a new dialog, the Contact header field may be populated as a contact header value which may be a public GRUU value, a temporary GRUU value, or SIP URI containing the contact address of the MCVideo/MCData UE; an "ob" (outbound) SIP URI parameter; an ICSI that the MCVideo/MCData UE may include in a g.3gpp.icsi-ref media feature tag; and an IARI that the MCVideo/MCData UE may include in a g.3gpp.iari-ref media feature tag.

If a MCVideo/MCData UE receives ICSI values corresponding to the IMS communication services that the network provides to the user, if the MCVideo/MCData UE constructs a request for a new dialog or standalone transaction and the request is related to one of the ICSI values, the MCVideo/MCData UE may populate a P-Preferred-Service header field with one of the ICSI values.

In construction of the same request for a new dialog and standalone transaction, the MCVideo/MCData UE may populate an Accept-Contact header field comprising an ICSI value which may differ from the one added to P-Preferred-Service header field. In construction of a request for a new dialog or standalone transaction, the MCVideo/MCData UE may populate an Accept-Contact header field comprising an IARI value if an IMS application may indicate that an IARI is to be included in a request.

The MCVideo/MCData UE may modify the established dialog capabilities by e.g. adding a media or requesting a supplementary service if the modification is defined for the IMS communication service. If the modification is not defined for that IMS communication service, the MCVideo/MCData UE may initiate a new dialog.

In one example embodiment, a trusted application server may insert P-Asserted-Service header field in a request for a new dialog or standalone transaction and may include ICSI value for the related IMS communication service to that header field. In one example embodiment, an untrusted application server may insert P-Preferred-Service header field in a request for a new dialog or standalone transaction and may include ICSI value for the related IMS communication service to that header field.

In one example embodiment if an AS may act as an initiating back-to-back user agent (B2BUA) or a routing B2BUA and may be sending a request for a dialog or a standalone transaction by including an ICSI value and one or more IARI values in the Accept-Contact header field, if there are ICSI value and IARI value(s) for the IMS communication service and IMS applications.

Figure 20:
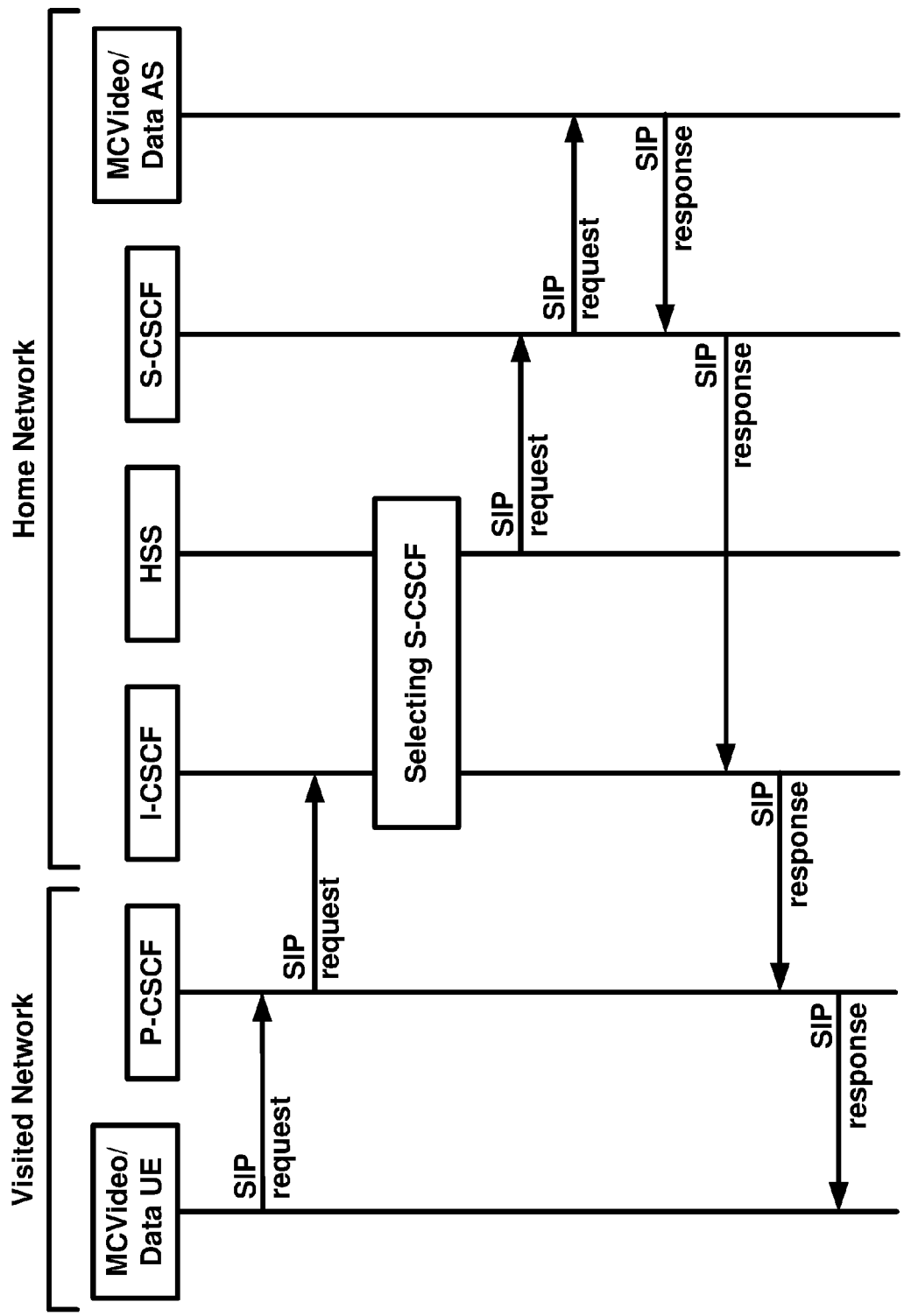
FIG. 20 is an example flow diagram as per an aspect of an embodiment of the present disclosure.

The flow diagram of the example embodiment in FIG. 20 shows a MCVideo/MCData UE sends a request to MCVideo/MCData AS. The MCVideo/MCData UE may initiate a SIP request towards the MCVideo/MCData AS for a certain service or information. In one example embodiment, the SIP request comprises MCVideo/MCData feature tag in the Contact header field. In one example embodiment, the SIP request comprises MCVideo/MCData feature tag in the Contact header field and the Accept-Contact header field indicating the MCVideo/MCData service may be required for that SIP request; P-CSCF may use the MCVideo/MCData UE's ID to locate I-CSCF in the home network by DNS query; I-CSCF in the home network may select suitable S-CSCF with help of HSS; S-CSCF may validate the service profile of the MCVideo/MCData UE and may evaluate the filter criteria. It may thereafter forward the invite towards MCVideo/MCData AS; MCVideo/MCData AS may analyze the feature tag and may send an appropriate response back towards the MCVideo/MCData UE.

In an example embodiment, MCVideo/MCData communication messages may comprise capabilities. To avoid or reduce any possible compatibility issues, new service or application identifiers for surveillance, traffic watch, ambulance may be implemented for the additional capabilities. In an example embodiment, ICSIs may be employed at the time of establishing new dialog or standalone transaction to indicate MCVideo/MCData and controllee/controller capabilities and/or different applications for MCVideo/MCData. One or more IMS service and application parameters may be communicated during the new dialog establishment procedure and/or standalone transaction process to indicate at least the MVCideo and controllee/controller capabilities and one MCVideo/MCData and controllee/controller application to a network server, e.g. a proxy server, a registrar server. The MCVideo/MCData UE may employ 3gpp-service.ims.icsi.MCVideo/MCData to indicate its service and controller capabilities and 3gpp-application.ims.iari.MCVideo/MCData-traffic, 3gpp-application.ims.iari.MCVideo/MCData-survalliance, and/or 3gpp-application.ims.iari.MCVideo/MCData-ambulance to indicate its video application and controllee capabilities for traffic watch, surveillance, and/or ambulance at the time of establishing new dialog or standalone transaction.

In an example embodiment, ICSIs may be employed at the time of establishing new dialog or standalone transaction to indicate different capabilities for MCVideo/MCData e.g. surveillance, traffic watch, ambulance, controller and/or controllee. One or more IMS service parameters may be communicated during the new dialog establishment procedure and/or standalone transaction process to indicate at least one MCVideo/MCData and controller/controllee capability to a network server, e.g. a proxy server, a registrar server. The MCVideo/MCData UE may employ 3gpp-service.ims.icsi.MCVideo/MCData-survelliance, 3gpp-service.ims.icsi.MCVideo/MCData-ambulance, and/or 3gpp-service.ims.icsi.MCVideo/MCData-traffic to indicate its service and controllee capabilities at the time of establishing new dialog or standalone transaction. Thus, many combinations of the service and application capabilities of the MCVideo/MCData UE may be possible and may be employed at the time of establishing new dialog or standalone transaction.

In an example embodiment, an MCVideo/MCData user may register as a dispatcher to the IMS network and thereby to the MCVideo/MCData service. At the time of registration, dialog, and standalone transaction, the MCVideo/MCData UE may employ ICSI and IARI to indicate the dispatcher capabilities with certain authorities. The other MCVideo/MCData UE which may be a surveillance camera and may register the associated ICSI and IARI at the time of registration to the IMS network. It has furthermore, presence parameters which may detail its properties such as location, the angle of camera, type, etc. The dispatcher may be able to get access to the MCVideo/MCData camera's detailed properties and therefore may want to setup a data connection.

Figure 21:
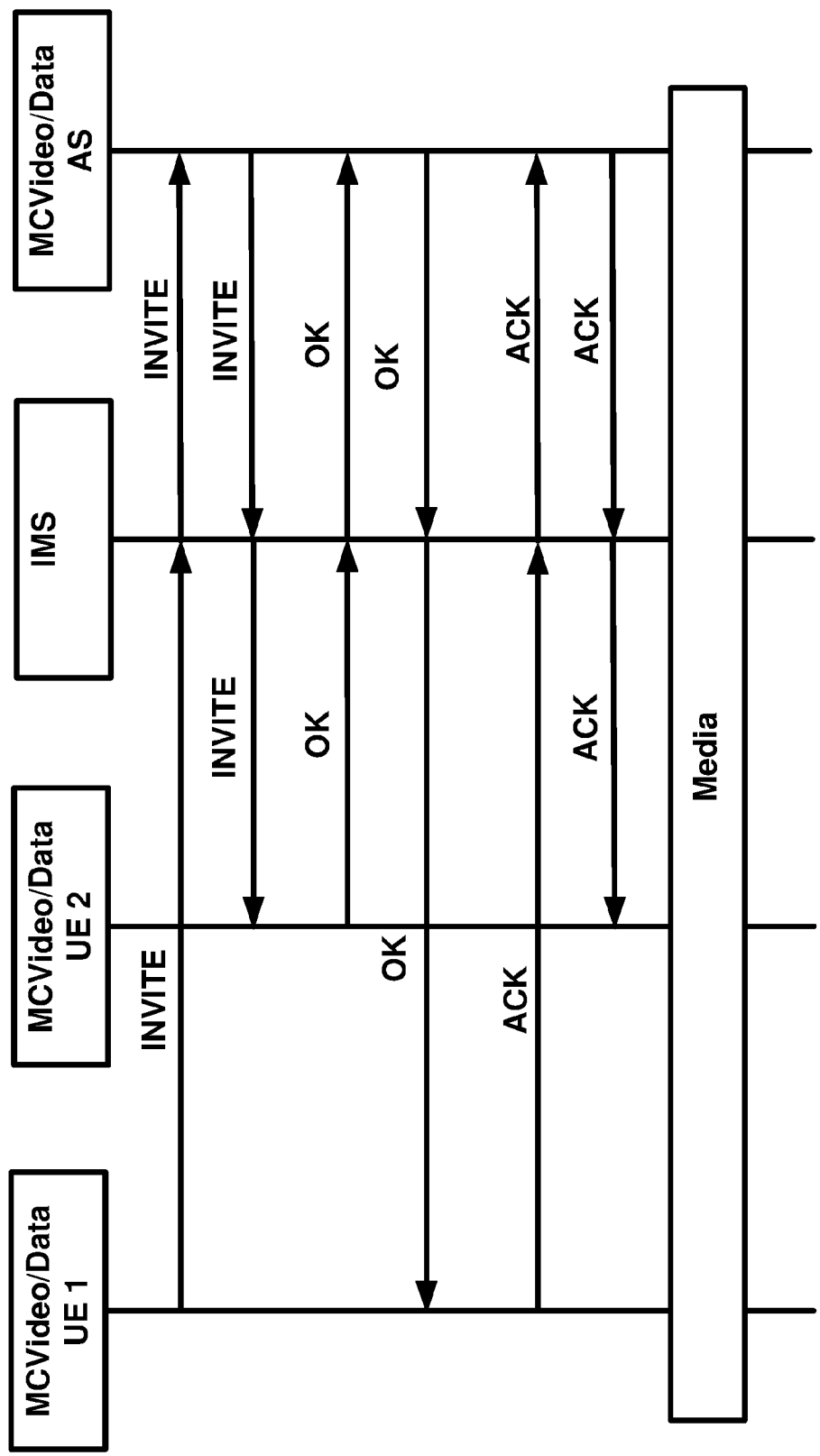
FIG. 21 is an example flow diagram as per an aspect of an embodiment of the present disclosure.

Example FIG. 21 shows MCVideo/MCData UE 1 sending a session invitation towards MCVideo/MCData UE2 via IMS network and the MCVideo/MCData AS; MCVideo/MCData UE 2 may accept the imitation by sending an "OK" towards MCVideo/MCData UE 1 via IMS network and the MCVideo/MCData AS; and MCVideo/MCData UE 1 may acknowledge the acceptance by sending an "ACK" towards MCVideo/MCData UE 2 via IMS network and the MCVideo/MCData AS.

A media session may now be established between the MCVideo/MCData UE 1 and MCVideo/MCData UE 2. Within that media session the video packets are transmitted between the MCVideo/MCData UEs. The established media may convey mechanical and operational instructions from one MCVideo/MCData UE to another. In order to setup the media for mechanical and operational instructions, MCVideo/MCData UE 1 may include a session description protocol (SDP) with an m-line for media type, <media>, which is "application". It may also create and internet assigned numbers authority (IANA) register a new multi-purpose internet mail extension (MIME) type for that m-line such as media burst operation protocol (MBOP). The m-line may look like as m=application <port> <proto> mbop, where <port> may indicate port number and number of ports for this media and <proto> may represent transport protocol e.g. user datagram protocol (UDP). The m-line may have attributes allowing parameters of specific formats for mbop, that SDP may not need to understand them however they may still be conveyed, a=fmtp:mbop <format specific parameters>.

In one example embodiment, the media burst operation protocol (MBOP) may be based on real-time transport control protocol (RTCP) application packet (RTCP: APP) as specified in IETF RFC3350. The MBOP message may not conform to the rules for compound RTCP packet transmission. One or more MBOP messages may be in a single IP packet.

Figure 22:
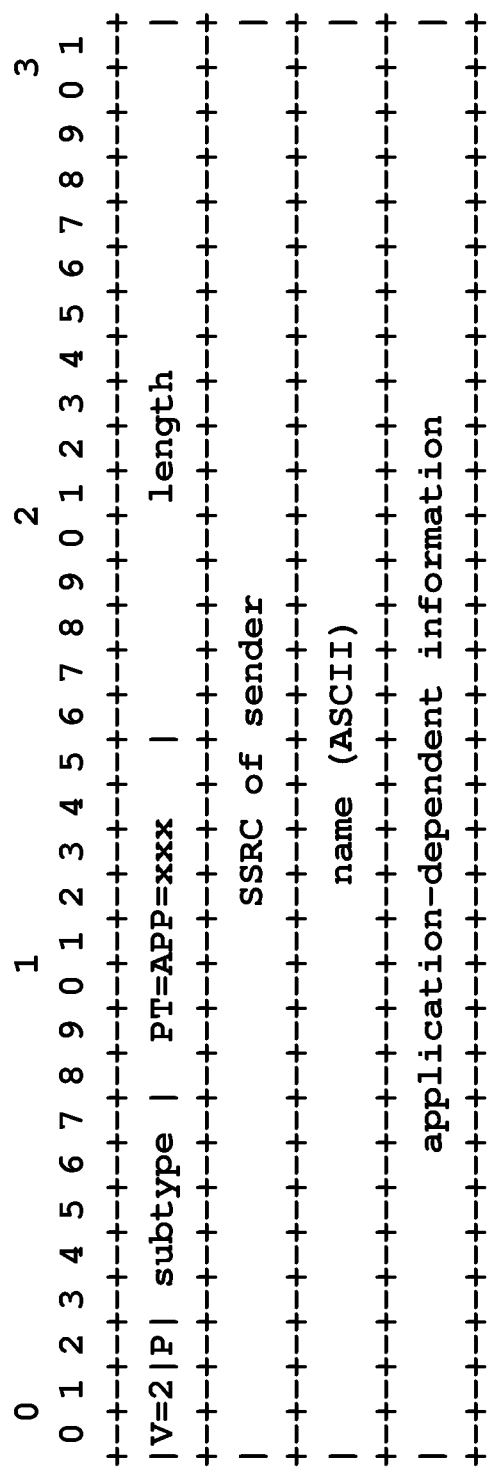
FIG. 22 is a diagram illustrating an example packet format as per an aspect of an embodiment of the present disclosure.

In the example embodiment in FIG. 22, P may be set to zero; subtype may identify the MBOP message referring to a certain operational or mechanical instruction e.g., 00000=switch on, 00001=Switch off, 00011=Right turn, 00100=Left turn, 00101=Up-ward, 00110=Down-ward, 00111=Camera right turn, 01000=Camera left turn, 01001=Camera upward, 01010=Camera downward, 01011=Zoom in, 01100=Zoom out, 01101=Increase Resolution, and 01110=Decrease resolution. These values are only an example and may be expanded. PT may identify the payload type which is MBOP messages. A unique identifier of 8 bits may be chosen for this payload type; length field comprises the length of the packet in 32-bit words; synchronization source (SSRC) identifier may carry the SSRC of the controller MCVideo/MCData UE controlling the MCVideo/MCData UE with camera; name may be 4 byte ASCII string which may be used to define a unique name for the set of MBOP messages for application MCVideo/MCData e.g. mission critical operational commend (MCOC); and application-dependent information may be to specify the MBOP messages. Examples of MBOP messages are shown in the example table of FIG. 23B. Table 23B is an example and may be expanded. The example embodiment in FIG. 23A shows the application-dependent data.

Figure 24:
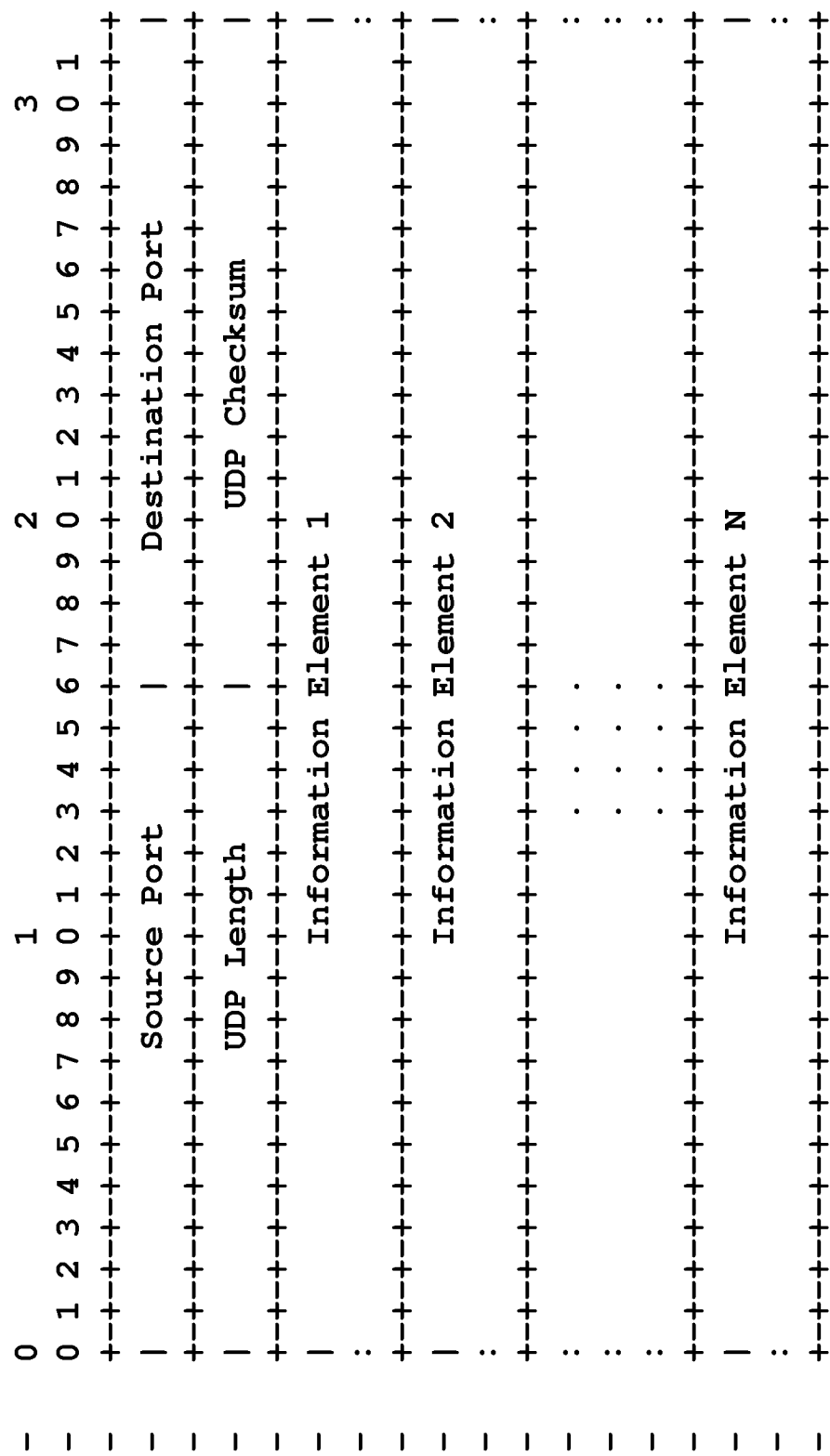
FIG. 24 is a diagram illustrating an example information element of a user diagram protocol as per an aspect of an embodiment of the present disclosure.
Figure 25:
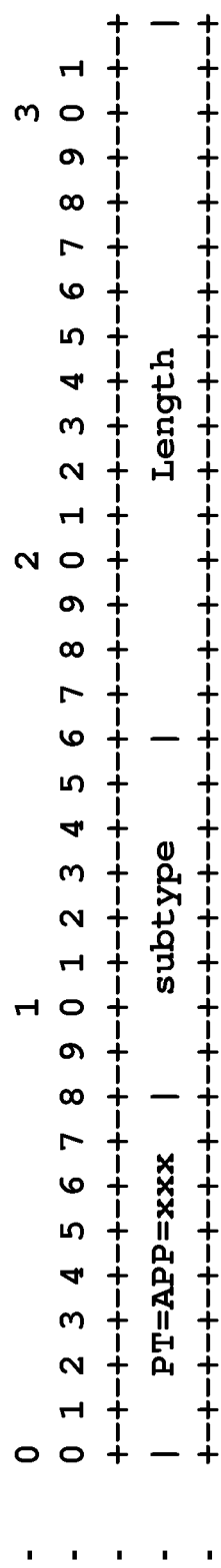
FIG. 25 is a diagram illustrating an example packet format as per an aspect of an embodiment of the present disclosure.

In one example embodiment, the media burst operation protocol (MBOP) may be based on user datagram protocol (UDP) as defined in IETF RFC768 and as shown in FIG. 24. In the example embodiment in FIG. 25, an information element e.g. the first one may be PT may identify the payload type which is mission critical operational commend (MCOC) messages. A unique identifier of 8 bits may be chosen for this payload type; subtype may identify the MBOP message referring to a certain operational or mechanical instruction e.g., 00000000=Switch on, 00000001=Switch off, 00000011=Right turn, 00000100=Left turn, 00000101=Up-ward, 00000110=Down-ward, 00000111=Camera right turn, 00001000=Camera left turn, 00001001=Camera upward, 00001010=Camera downward, 00001011=Zoom in, 00001100=Zoom out, 00001101=Increase Resolution, and 00001110=Decrease resolution. These values are an example and may be expanded. Length field in FIG. 25 comprises the length of the packet comprising the information elements within the IP packet in 32-bit words.

In the example embodiment, an information element may comprise, for example, application-dependent data as illustrated in the table of FIG. 23B. It is anticipated that this example table may be modified and/or expanded.

Figure 26:
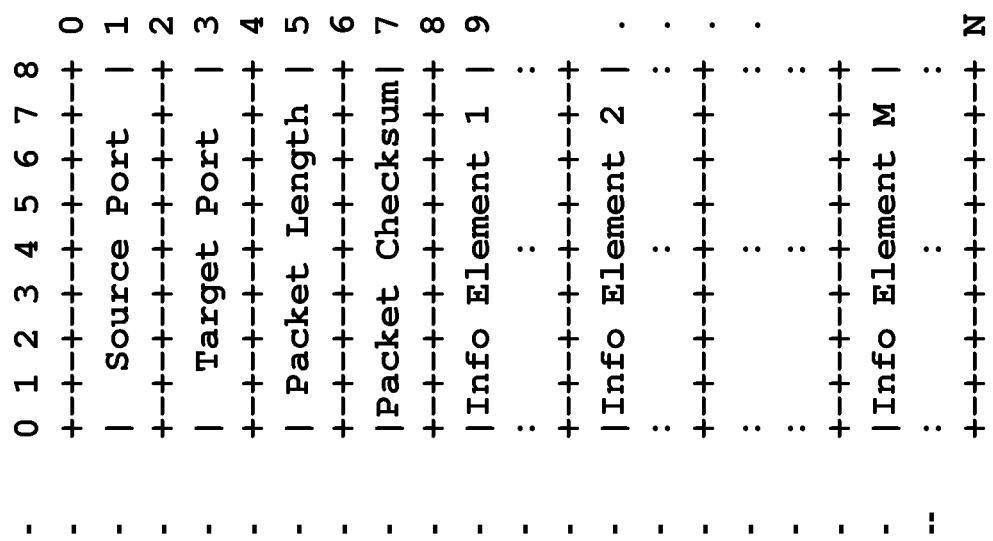
FIG. 26 is a diagram illustrating an example media burst operation protocol as per an aspect of an embodiment of the present disclosure.

In the example embodiment in FIG. 26, the media burst operation protocol (MBOP) may be based on one-byte representation. The first information element may be according to FIG. 27A. PT may identify the payload type which is mission critical operational commend (MCOC) messages. A unique identifier of 8 bits may be chosen for this payload type. Subtype may identify the MBOP message referring to a certain operational or mechanical instruction e.g., 00000000=Switch on, 00000001=Switch off, 00000011=Right turn, 00000100=Left turn, 00000101=Up-ward, 00000110=Down-ward, 00000111=Camera right turn, 00001000=Camera left turn, 00001001=Camera upward, 00001010=Camera downward, 00001011=Zoom in, 00001100=Zoom out, 00001101=Increase Resolution, and 00001110=Decrease resolution.

The table is an example and may be expanded. The length field comprises the length of the packet comprising the information elements within the IP packet in 32-bit words. Other information elements than the first one may be according to example FIG. 27B, where application-dependent data may be the same or similar to the example information elements shown in FIG. 23B. FIG. 23B is presented as an example only an may be expanded and/or otherwise modified within the scope of the present embodiments.

The controller UE may modify the QoS of the data transmitted by the controllee UE sending a SIP message such as SIP INVITE request message or SIP UPDATE message towards the controllee UE. The body of the SIP INVITE request message or SIP UPDATE request message may comprise the indications for the new QoS in form of higher resolutions for audio, video, and/or a media. Once the controller and the controllee UE modified the session description with this higher resolution, the UEs may request the network a modified QoS for the dedicated EPS bearer. The network may acknowledge that due to the subscription of the users.

A faster and more efficient method to change the QoS of the dedicated EPS bearer, may be to hint (e.g. provide information to) the application function (AF) which resides in the P-CSCF when having an agreed request for the QoS modification. The AF may thereafter may send a commend to the PCRF to request for the new QoS for the dedicated EPS bearer. Once it is allowed due to the users' subscriptions, the network may indicate the change to the controller and controllee UE. The hint to the AF for such a change request for the QoS may be performed by an IMS service identifier (ICSI) or and IMS application reference identifier (IARI) or a combination of ICSI and IARI indicating an IMS application reference of an IMS service. This ICSI, IARI, and/or combination of ICSI and IARI may be in the Contact header and/or Accept-contact header if the SIP message e.g. SIP INVITE or SIP UPDATE. Once the AF realizes the combinations of ICSI, IARI, and/or ICSI and IARI in combination with the agreed session modification in terms of e.g. SIP 200 OK, the network may initiate the procedure for the QoS modification for the dedicated EPS bearer.

Figure 28:
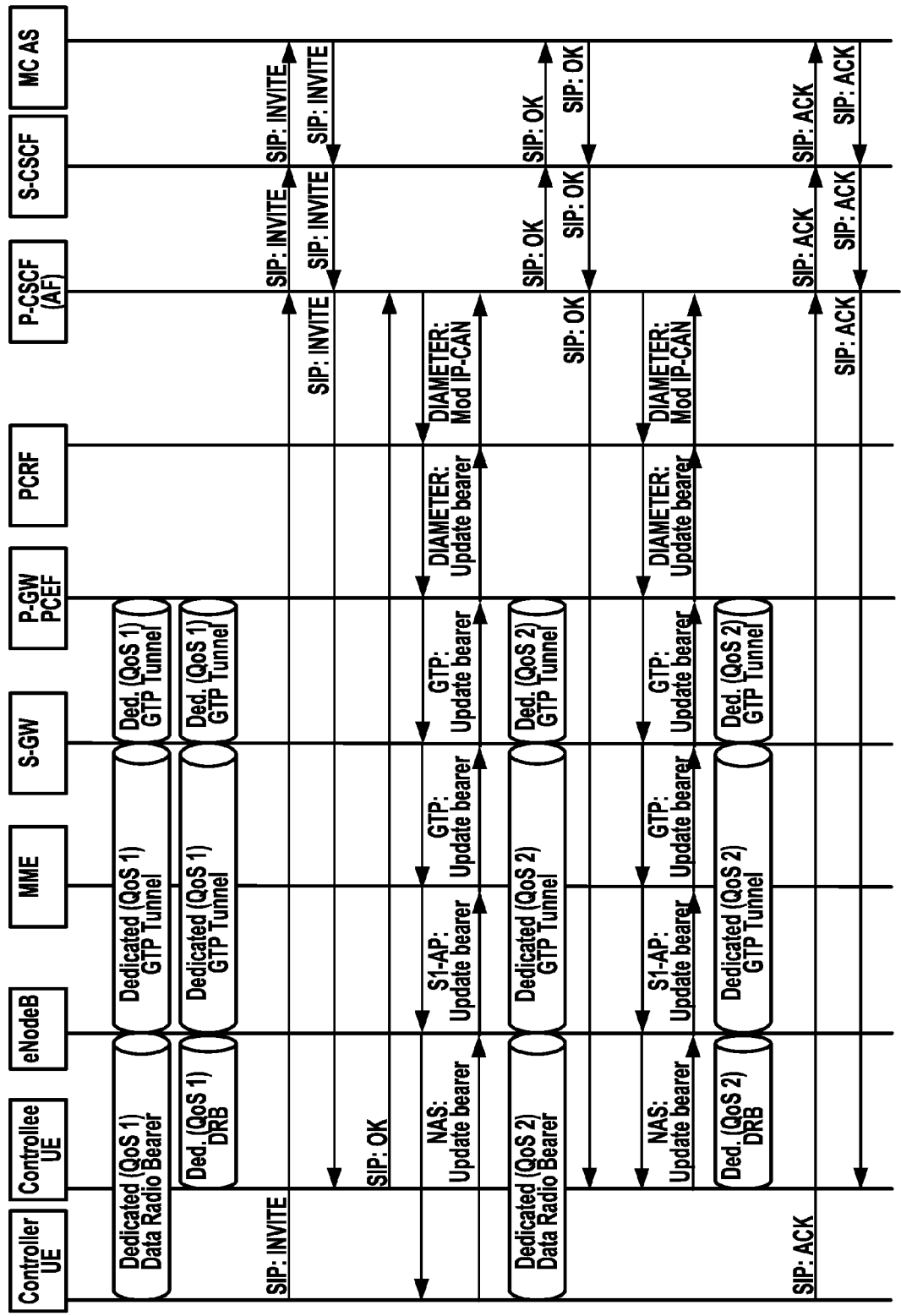
FIG. 28 is an example flow diagram as per an aspect of an embodiment of the present disclosure.

In the example embodiment in FIG. 28, SIP INVITE request message may be employed for the QoS medication. FIG. 28 shows that an established dedicated bearer may exist between the controller UE and the controllee UE that the controllee UE may employ to transmit data towards the controller UE; controller UE may send an invite request to modify the QoS of the existing dedicated bearer towards the controllee UE; controller UE may generate the INVITE request message by including a media feature tag to show it is a mission critical controller UE requesting change of QoS, in the Contact header field; controller UE may generate the INVITE request message by including a media feature to show it is a mission critical controller UE requesting change of QoS, in the Accept-Contact header field; controller UE may generate the INVITE request message with session description protocol (SDP) for the requested QoS; the application function (AF) which may reside in the proxy-call session control function (P-CSCF) may send a DIAMETER AA-request (AAR) command comprising a modification bearer message an MCVideo/MCData application identifier attribute-value pairs (AVP) towards the PCRF for bearer modification; In an example embodiment, to convey the information from the application function (AF) which may reside in the P-CSCF when the application is an IMS application, or may reside in the application server when the application is not an IMS application, an application specific AVP may be required to identify the application. This new AVP may be assigned to the mission critical video or mission critical data or a combination of mission critical video and mission critical data and may be employed in DIAMETRE AAR command indicating the level or the class of the requested QoS. The MCVideo/MCData application identifier AVP may also be in combination with other AVPs identifying the class and/or the level of the requested QoS. The DIAMETER AAR command may be constructed by the AF and sent towards the PCRF. If PCRF receives the MCVideo/MCData identifier AVP, then it may relate the AVP and the requested QoS into consideration and may take necessary action upon the dedicated EPS bearer to evaluate whether the subscription allows for the QoS changes. The QoS change may then be communicated with the PCEF and the network and finally with the controller and controllee UEs; upon of approval of the mission critical user subscription, the PCRF may communicate with the PCEF for the bearer modification which is furthermore transferred towards the MC controller UE and MC controllee UE; and the bearer may be modified and the controller UE and the controllee UE may adopt to the modified bearer and related QoS.

Figure 29:
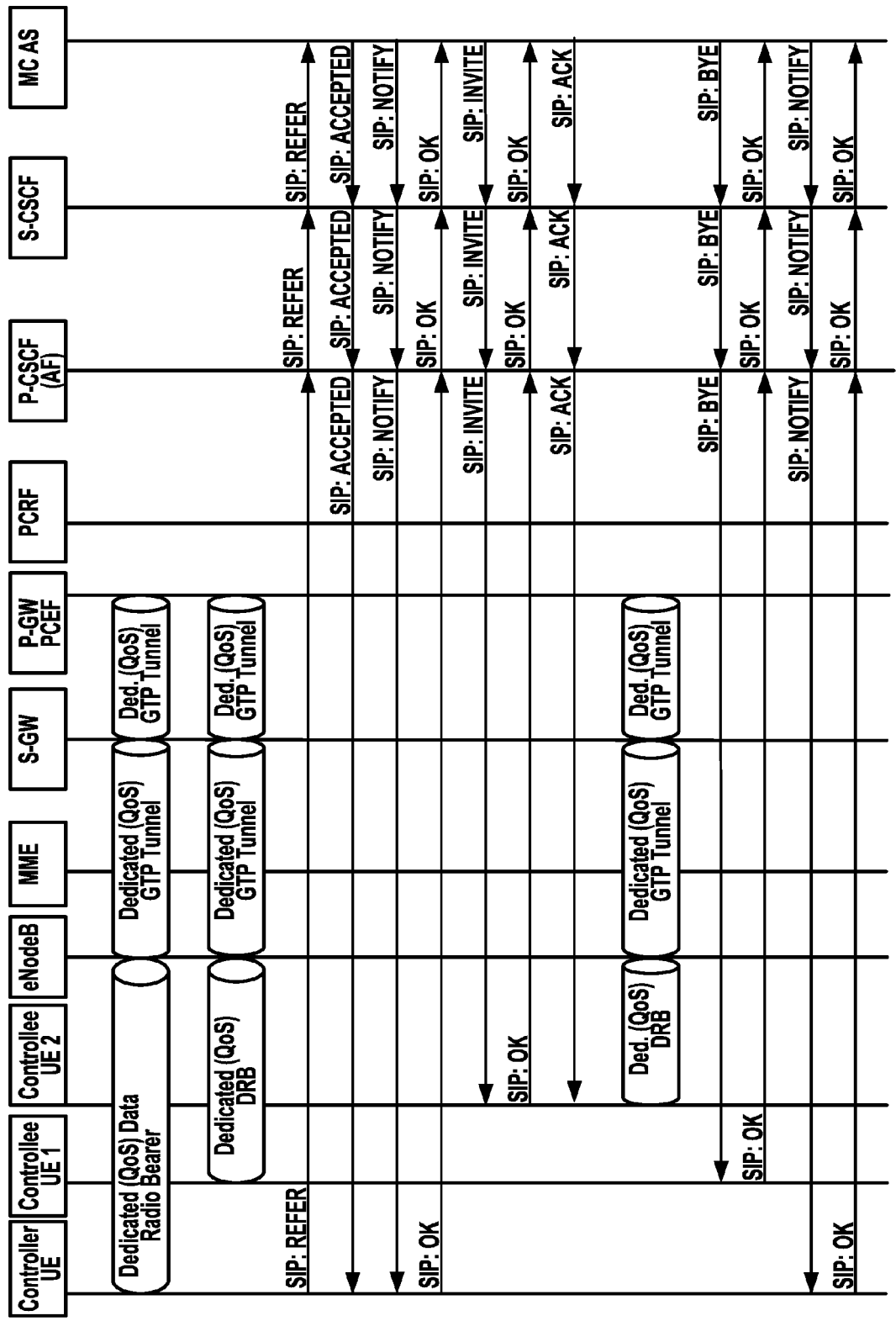
FIG. 29 is an example flow diagram showing as per an aspect of an embodiment of the present disclosure.

In the example embodiment in FIG. 29, the controller UE may transfer the data transmitted from mission critical controllee UE1 to mission critical controllee UE 2 by sending a SIP message such as SIP REFER request message or SIP INVITE request message towards the mission critical AS. Example FIG. 29 shows that an established dedicated bearer may exist between the controller UE and the controllee UE 1 that the controllee UE 1 may employ to transmit data towards the controller UE; controller UE may send a REFER request to transfer the existing dedicated bearer towards the controllee UE 2; controller UE may generate the REFER request message by including a media feature tag for the mission critical controller UE in the Contact header field; controller UE may generate the REFER request message by including a media feature tag for the mission critical controller UE in the Accept-Contact header field; controller UE may generate the REFER request message by identifying the target dialog and with Refer-To header field targeted the controllee UE 2; controller UE may send the REFER request towards the mission critical application server; the mission critical application server may generate an INVITE request towards the controllee UE 2 to setup a session and may transfer the mission critical dialog towards that UE; the mission critical application server may send a BYE request towards the controllee UE 1 to terminate the IMS session towards that UE; the dedicated bearer is now established with the controllee UE 2; and the mission critical application server may notify the controller UE.

According to various embodiments, a device such as, for example, a wireless device, a base station, a V2X network entity, an IMS network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
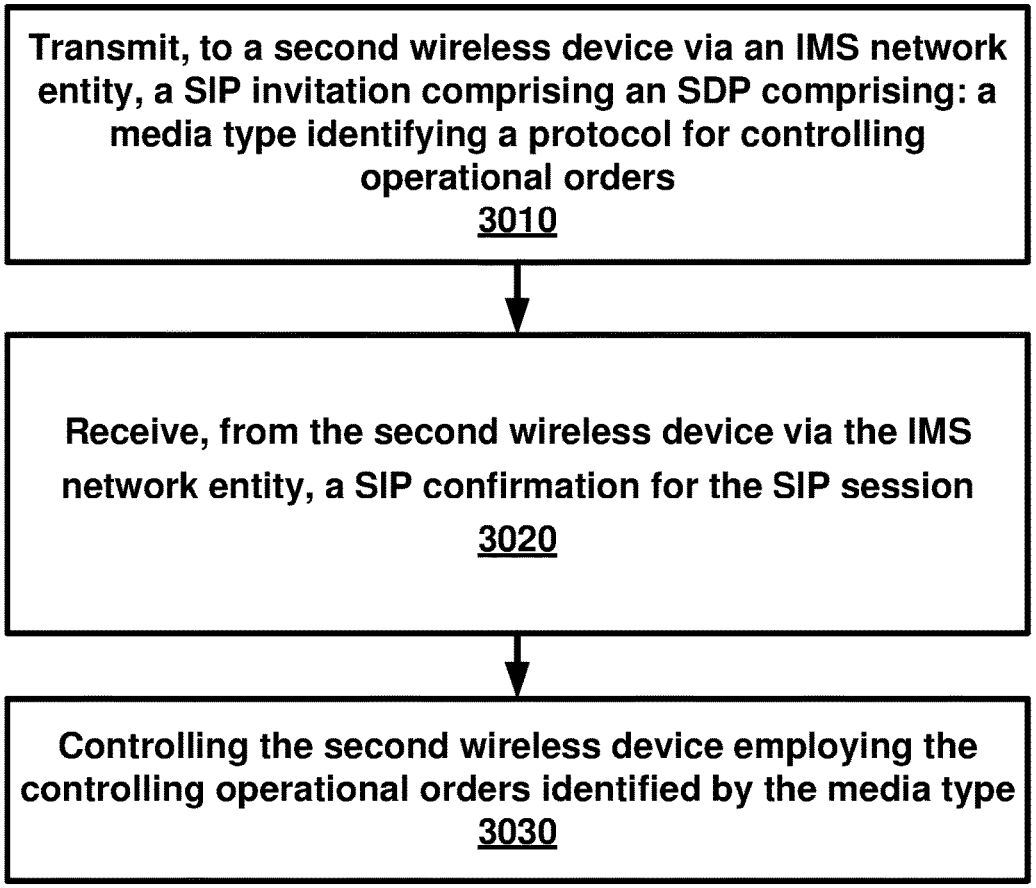
FIG. 30 is an example flow diagram as per an aspect of an embodiment of the present disclosure.

FIG. 30 is an example flow diagram as per an aspect of an embodiment of the present disclosure. At 3010 a wireless device transmits, to a second wireless device via an internet protocol multimedia subsystem (IMS) network entity, a session initiation protocol (SIP) invitation. The SIP invitation may comprise a session description protocol (SDP). The SDP may comprise a media type and one or more attributes. The media type may identify a protocol for controlling operational orders. The controlling operational orders may comprise at least: mechanical operational orders; and electrical operational orders. The one or more attributes may identify a format of the protocol to establish a SIP session. At 3020, the wireless device may receive, from the second wireless device via the IMS network entity, a SIP confirmation for the SIP session. At 3030, the wireless device may control the second wireless device employing the controlling operational orders identified by the media type.

According to an embodiment, the media type may be an application media type. According to an embodiment, an internet assigned number authority (IANA) may register a multipurpose internet mail extension (MIME) type for the media type. According to an embodiment, the SDP may convey the media type by not knowing the format. According to an embodiment, the SDP may identify at least: one or more port numbers identifying one or more ports for the media type; and a transport protocol identifying a protocol for transportation of the media type. According to an embodiment, the transport protocol may comprise a user datagram protocol (UDP). According to an embodiment, the SIP session may comprise a mission critical video session, or a mission critical data session.

According to an embodiment, the wireless device and the second wireless device may comprise mission critical video wireless devices; or mission critical data wireless devices. According to an embodiment, the wireless device may be registered to the IMS network entity as a dispatcher. According to an embodiment, the second wireless device may be registered to the IMS network entity as a surveillance camera.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method comprising:
   transmitting, by a first wireless device to a second wireless device via an internet protocol multimedia subsystem (IMS) network entity, a session initiation protocol (SIP) invitation to establish a SIP session, the SIP invitation comprising a session description protocol (SDP) comprising an application media type identifying a protocol for controlling operational orders, wherein:
     a multipurpose internet mail extension (MIME) type for the application media type is registered by an internet assigned number authority (IANA) and is a media burst operation protocol; and
     the controlling operational orders comprise:
       mechanical operational orders;
       electrical operational orders; and
       one or more attributes identifying a format of the protocol;
   receiving, by the first wireless device from the second wireless device via the IMS network entity, a SIP confirmation for the SIP session; and
   controlling, by the first wireless device, the second wireless device employing the controlling operational orders identified by the application media type.

2. The method according to claim 1, wherein the SDP conveys the application media type by not knowing the format.

3. The method according to claim 1, wherein the SDP identifies at least:
   one or more port numbers identifying one or more ports for the application media type; and
   a transport protocol identifying an employed protocol for transportation of the application media type.

4. The method according to claim 3, wherein the transport protocol is a user datagram protocol (UDP).

5. The method according to claim 1, wherein the SIP session comprises
   a mission critical video session; or
   a mission critical data session.

6. The method according to claim 1, wherein the first wireless device and the second wireless device are:
   mission critical video wireless devices; or
   mission critical data wireless devices.

7. The method according to claim 1, wherein the first wireless device is registered to the IMS network entity as a dispatcher.

8. The method according to claim 1, wherein the second wireless device is registered to the IMS network entity as a surveillance camera.

9. A wireless device comprising:
one or more processors; and
memory storing instructions that, when executed by the one or more processors,
cause the wireless device to:
transmit, to a second wireless device via an internet protocol multimedia subsystem (IMS) network entity, a session initiation protocol (SIP) invitation to establish a SIP session, the SIP invitation comprising a session description protocol (SDP) comprising an application media type identifying a protocol for controlling operational orders, wherein:
a multipurpose internet mail extension (MIME) type for the application media type is registered by an internet assigned number authority (IANA) and is a media burst operation protocol; and
the controlling operational orders comprise:
mechanical operational orders;
electrical operational orders; and
one or more attributes identifying a format of the protocol;
receive, from the second wireless device via the IMS network entity, a SIP confirmation for the SIP session; and
controlling the second wireless device employing the controlling operational orders identified by the application media type.

10. The wireless device according to claim 9, wherein the SDP conveys the application media type by not knowing the format.

11. The wireless device according to claim 9, wherein the SDP identifies at least:
one or more port numbers identifying one or more ports for the application media type; and
a transport protocol identifying a protocol for transportation of the application media type.

12. The wireless device according to claim 11, wherein the transport protocol is user datagram protocol (UDP).

13. The wireless device according to claim 9, wherein the SIP session comprises
a mission critical video session; or
a mission critical data session.

14. The wireless device according to claim 9, wherein the wireless device and the second wireless device are
mission critical video wireless devices; or
mission critical data wireless devices.

15. The wireless device according to claim 9, wherein the wireless device is registered to the IMS network entity as a dispatcher.

16. The wireless device according to claim 9, wherein the second wireless device is registered to the IMS network entity as a surveillance camera.

* * * * *